US011635965B2

(12) United States Patent
Brandt et al.

(10) Patent No.: US 11,635,965 B2
(45) Date of Patent: Apr. 25, 2023

(54) APPARATUSES AND METHODS FOR SPECULATIVE EXECUTION SIDE CHANNEL MITIGATION

(71) Applicant: Intel Corporation, Santa Clara, CA (US)

(72) Inventors: Jason W. Brandt, Austin, TX (US); Deepak K. Gupta, Portland, OR (US); Rodrigo Branco, Hillsboro, OR (US); Joseph Nuzman, Haifa (IL); Robert S. Chappell, Portland, OR (US); Sergiu D. Ghetie, Hillsboro, OR (US); Wojciech Powiertowski, Beaverton, OR (US); Jared W. Stark, IV, Portland, OR (US); Ariel Sabba, Karmiel (IL); Scott J. Cape, Portland, OR (US); Hisham Shafi, Akko (IL); Lihu Rappoport, Haifa (IL); Yair Berger, Pardes-Hanna Karkur (IL); Scott P. Bobholz, Bolton, MA (US); Gilad Holzstein, Haifa (IL); Sagar V. Dalvi, Hillsboro, OR (US); Yogesh Bijlani, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/177,028

(22) Filed: Oct. 31, 2018

(65) Prior Publication Data

US 2020/0133679 A1 Apr. 30, 2020

(51) Int. Cl.
*G06F 9/38* (2018.01)
*G06F 9/30* (2018.01)

(52) U.S. Cl.
CPC ........ *G06F 9/3844* (2013.01); *G06F 9/30101* (2013.01)

(58) Field of Classification Search
CPC ......... G06F 2207/7219; G06F 9/30189; G06F 9/30101; G06F 9/3844
See application file for complete search history.

(56) References Cited

U.S. PATENT DOCUMENTS

| | | |
|---|---|---|
| 5,721,855 A | 2/1998 | Hinton et al. |
| 6,158,676 A | 12/2000 | Hughes et al. |

(Continued)

FOREIGN PATENT DOCUMENTS

| | | |
|---|---|---|
| GB | 2574270 A | 12/2019 |
| WO | 2019/212579 A1 | 11/2019 |

OTHER PUBLICATIONS

Valles et al. "Performance Insights to Intel Hyper-Threading Technology"; 2009; 14 pages; Accessed on Oct. 27, 2015 at: https://software.intel.com/en-us/articles/performance-insights-to-intel-hyper-threading-technology (Year: 2009).*

(Continued)

*Primary Examiner* — Keith E Vicary
(74) *Attorney, Agent, or Firm* — Nicholson De Vos Webster & Elliott LLP

(57) ABSTRACT

Methods and apparatuses relating to mitigations for speculative execution side channels are described. Speculative execution hardware and environments that utilize the mitigations are also described. For example, three indirect branch control mechanisms and their associated hardware are discussed herein: (i) indirect branch restricted speculation (IBRS) to restrict speculation of indirect branches, (ii) single thread indirect branch predictors (STIBP) to prevent indirect branch predictions from being controlled by a sibling thread, and (iii) indirect branch predictor barrier (IBPB) to prevent indirect branch predictions after the barrier from being controlled by software executed before the barrier.

24 Claims, 23 Drawing Sheets

(56) References Cited

U.S. PATENT DOCUMENTS

| | | | | |
|---|---|---|---|---|
| 6,185,676 | B1 | 2/2001 | Poplingher et al. | |
| 7,272,831 | B2 | 9/2007 | Cota-Robles et al. | |
| 7,769,964 | B2 | 8/2010 | Newburn et al. | |
| 10,394,716 | B1 | 8/2019 | Piry et al. | |
| 10,642,744 | B2 | 5/2020 | Boggs et al. | |
| 10,909,046 | B2 | 2/2021 | Murphy | |
| 11,010,067 | B2 | 5/2021 | Durham | |
| 11,403,394 | B2 | 8/2022 | O'Farrell | |
| 2003/0009692 | A1* | 1/2003 | Smith | H04L 63/04 726/4 |
| 2003/0033510 | A1 | 2/2003 | Dice | |
| 2006/0143485 | A1* | 6/2006 | Naveh | G06F 1/3296 713/320 |
| 2008/0046668 | A1 | 2/2008 | Newburn et al. | |
| 2008/0052499 | A1* | 2/2008 | Koc | G06F 9/3806 712/238 |
| 2008/0109625 | A1* | 5/2008 | Erlingsson | G06F 12/0802 711/163 |
| 2008/0155679 | A1* | 6/2008 | Sebot | G06F 21/74 726/16 |
| 2009/0089564 | A1 | 4/2009 | Brickell et al. | |
| 2014/0189302 | A1 | 7/2014 | Subbareddy et al. | |
| 2015/0178513 | A1 | 6/2015 | Conti et al. | |
| 2016/0170769 | A1* | 6/2016 | LeMay | G06F 9/35 713/190 |
| 2016/0285896 | A1* | 9/2016 | Caprioli | G06F 21/72 |
| 2019/0004961 | A1 | 1/2019 | Boggs et al. | |
| 2019/0042263 | A1* | 2/2019 | Sukhomlinov | G06F 21/556 |
| 2019/0050230 | A1* | 2/2019 | Branco | G06F 9/3806 |
| 2019/0114422 | A1* | 4/2019 | Johnson | G06F 9/3865 |
| 2019/0205142 | A1 | 7/2019 | Ghosh | |
| 2019/0227804 | A1* | 7/2019 | Mukherjee | G06F 9/3806 |
| 2019/0272239 | A1* | 9/2019 | Hagersten | G06F 12/1475 |
| 2019/0303161 | A1* | 10/2019 | Nassi | G06F 9/3844 |
| 2019/0324756 | A1* | 10/2019 | Chappell | G06F 9/30076 |
| 2019/0339977 | A1* | 11/2019 | Wallach | G06F 9/30058 |
| 2019/0347102 | A1 | 11/2019 | Okazaki | |
| 2019/0354368 | A1 | 11/2019 | Okazaki | |
| 2019/0377677 | A1 | 12/2019 | Kamikubo et al. | |
| 2019/0384726 | A1 | 12/2019 | Murphy | |
| 2020/0210070 | A1 | 7/2020 | Durham | |
| 2020/0372129 | A1 | 11/2020 | Gupta | |
| 2021/0081530 | A1 | 3/2021 | O'Farrell | |
| 2021/0349634 | A1 | 11/2021 | Durham | |

OTHER PUBLICATIONS

Paolo Bonzini, "Reading privileged memory with a side-channel | Hacker News", Jan. 4, 2018 (Jan. 4, 2018), Retrieved from the Internet: URL:https://news.ycombinator.com/item?id=16065845 [retrieved on May 13, 2020], 23 pages. (Year: 2018).*

S. Lee, M. Shih, P. Gera, T. Kim, H. Kim, and M. Peinado, "Inferring Fine-grained Control Flow Inside SGX Enclaves with Branch Shadowing," in USENIX Security Symposium, 19 pages; Aug. 16-18, 2017 (Year: 2017).*

Anonymous, "Disabling Indirect Branch Prediction (and thus speculation after indirect branch . . . Hacker News", Jan. 4, 2018 (Jan. 4, 2018), XP055677873, Retrieved from the Internet URL:https://news.ycombinator.com/item?id=I6069950 [retrieved on Mar. 19, 2020], 1 page.

European Search Report and Search Opinion, EP App. No 19183503.2, dated Apr. 3, 2020, 9 pages.

AMD, "Software Techniques for Managing Speculation on AMD Processors," White Paper, Revision Jul. 10, 2018, Retrieved from https://developer.amd.com/wp-content/resources/90343-B_SoftwareTechniquesforManagingSpeculation_WP_7-18Update_FNL.pdf, Jul. 10, 2018, 8 pages.

AMD, "Software Techniques for Managing Speculation on AMD Processors," White Paper, Revision Jan. 24, 2018, Retrieved from: https://developer.amd.com/wp-content/resources/Managing-Speculation-on-AMD-Processors.pdf, Jan. 24, 2018, 8 pages.

Arm, "Arm V8.5-A CPU Updates," Version 1.1, Oct. 23, 2018, pp. 1-12.

Arm, "Whitepaper—Addressing Spectre Variant 1 (CVE-2017-5753) in Software," Version 1.0, Oct. 12, 2018, pp. 1-14.

Arm, "Whitepaper—Cache Speculation Side-channels," Version 2.4, Oct. 12, 2018, pp. 1-21.

"Intel Analysis of Speculative Execution Side Channels," White paper, Revision 1.0, Jan. 2018, 12 pages.

Intel, "Control-Flow Enforcement Technology Preview," Revision 2.0, Jun. 2017, 145 pages.

Intel, "Speculative Execution Side Channel Mitigations," Revision 2.0, May 2018, 21 pages.

Intel, "Speculative Execution Side Channel Mitigations," Revision 3.0, May 2018, 23 pages.

Intel® Architecture, "Instruction Set Extensions and Future Features Programming Reference," 319433-034, May 2018, 145 pages.

Intel, "Intel® 64 and IA-32 Architectures Software Developer Manuals," Oct. 12, 2016, Updated—May 18, 2018, 19 pages.

Intel, "Speculative Execution Side Channel Mitigations," Revision 1.0, Jan. 2018, 15 pages.

Intel, "Deep Dive: Managed Runtime Speculative Execution Side Channel Mitigations", Developer Zone, Available Online at <https://web.archive.org/web/20190514204814/https://software.intel.com/security-software-guidance/insights/deep-dive-managed-runtime-speculative-execution-side-channel-mitigations>, May 2019, 11 pages.

Intel, "Intel(registered) 64 and IA-32 Architectures Software Developer's Manual", Order No. 325462-071US, Available Online at <https://software.intel.com/sites/default/files/managed/39/c5/325462-sdm-vol-1-2abcd-3abcd.pdf>, Oct. 2019, 5038 pages.

Intel, "Intel(registered) Software Guard Extensions (Intel(registered) SGX) ", Developer Guide, Available Online at <https://software.intel.com/sites/default/files/managed/33/70/intel-sgx-developer-guide.pdf>, 2020, pp. 1-52.

Notice of Allowance, U.S. Appl. No. 16/833,478, dated Feb. 3, 2021, 9 pages.

Office Action, EP App. No. 19183503.2, dated Dec. 22, 2020, 9 pages.

Swiat, "Mitigating speculative execution side channel hardware vulnerabilities", Microsoft Security Response Center, Security Research & Defense, Mar. 15, 2018, pp. 1-14.

European Search Report and Search Opinion, EP App. No 20208101.4, dated May 17, 2021, 08 pages.

Notice of Allowance, U.S. Appl. No. 16/833,478, dated Mar. 26, 2021, 5 pages.

Intel, "Intel® Architecture Instruction Set Extensions and Future Features Programming Reference", Reference No. 319433-032, Jan. 2018, 137 pages.

Intention to grant, EP App. No. 19183503.2, dated May 17, 2022, 6 pages.

Intention to grant, EP App. No. 20208101.4, dated Jun. 1, 2022, 7 pages.

Notice of Allowance, U.S. Appl. No. 17/341,068, dated Sep. 1, 2022, 10 pages.

Notice of Allowance, U.S. Appl. No. 17/341,068, dated Sep. 14, 2022, 5 pages.

European Search Report and Search Opinion, EP App. No. 22203480.3, dated Feb. 1, 2023, 9 pages.

* cited by examiner

601

| BRANCH TYPE 610 | TARGET (E.G., ADDRESS) 612 |
|---|---|
| | |
| ⋮ | ⋮ |
| | |

| BRANCH IP 610 | BRANCH TYPE 614 | TARGET (E.G., ADDRESS) 612 |
|---|---|---|
| | | |
| ⋮ | ⋮ | ⋮ |
| | | |

| VALID 616 | BRANCH IP 610 | BRANCH TYPE 614 | TARGET (E.G., ADDRESS) 612 |
|---|---|---|---|
| | | | |
| ⋮ | ⋮ | ⋮ | ⋮ |
| | | | |

| BRANCH IP 610 | TARGET 612 | THREAD ID 616 | APP VS. OS 618 | VM VS. VMM 620 |
|---|---|---|---|---|
| | | | | |
| ⋮ | ⋮ | ⋮ | ⋮ | ⋮ |
| | | | | |

| BRANCH IP 610 | TARGET 612 | THREAD ID 616 | APP VS. OS 618 |
|---|---|---|---|
| | | | |
| ⋮ | ⋮ | ⋮ | ⋮ |
| | | | |

| BRANCH IP 610 | TARGET 612 | THREAD ID 616 | VM VS. VMM 620 |
|---|---|---|---|
| | | | |
| ⋮ | ⋮ | ⋮ | ⋮ |
| | | | |

| INDIRECT BRANCH IP 622 | TARGET (E.G., ADDRESS) 612 |
|---|---|
| | |
| ⋮ | ⋮ |
| | |

608

| DIRECT BRANCH IP 624 | TARGET (E.G., ADDRESS) 612 |
|---|---|
| | |
| ⋮ | ⋮ |
| | |

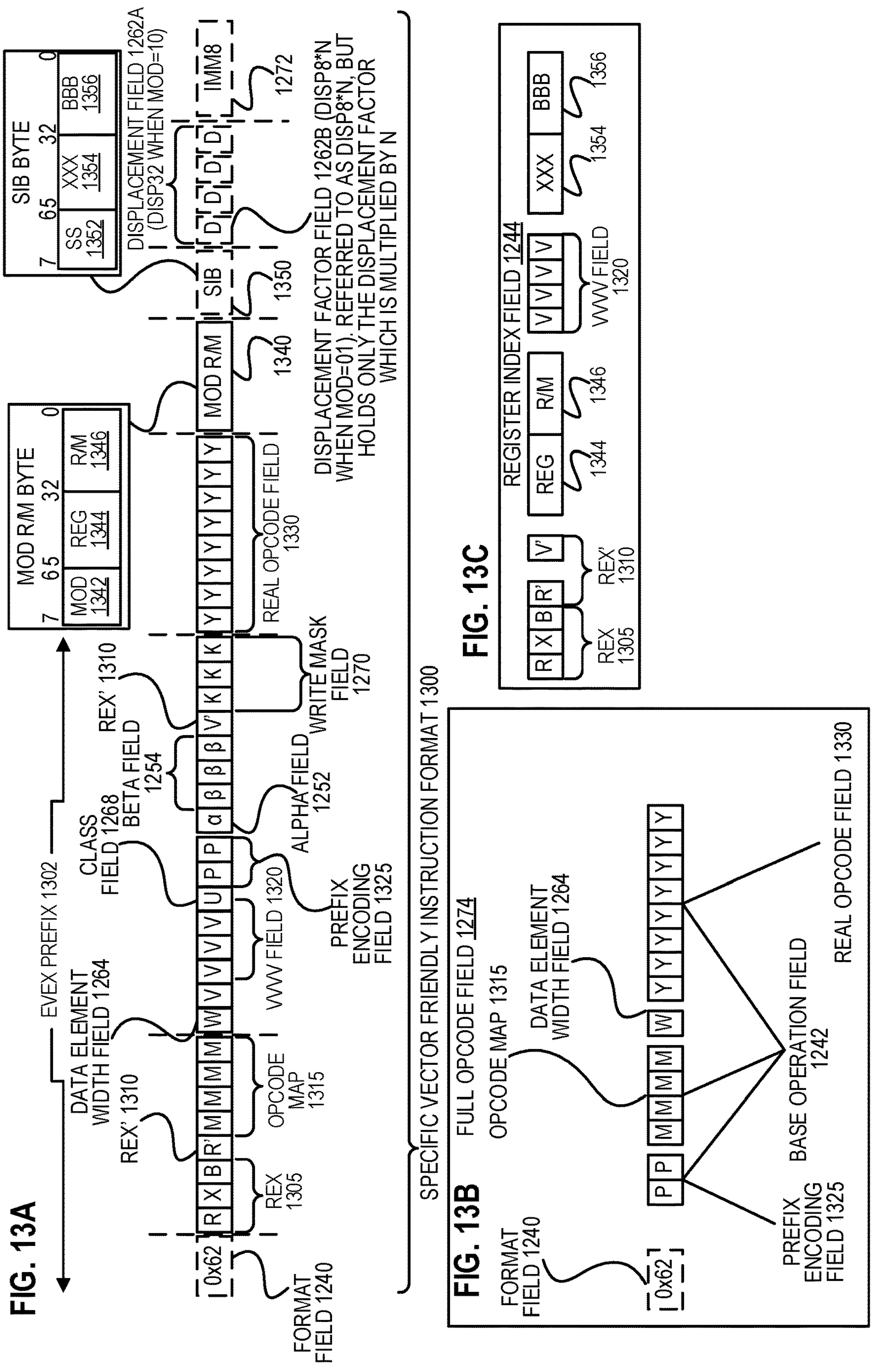

FIG. 13A
EVEX PREFIX 1302
SPECIFIC VECTOR FRIENDLY INSTRUCTION FORMAT 1300
FORMAT FIELD 1240
REX 1305
REX' 1310
OPCODE MAP 1315
DATA ELEMENT WIDTH FIELD 1264
VVVV FIELD 1320
CLASS FIELD 1268
PREFIX ENCODING FIELD 1325
BETA FIELD 1254
ALPHA FIELD 1252
WRITE MASK FIELD 1270
REAL OPCODE FIELD 1330
MOD R/M BYTE
MOD 1342
REG 1344
R/M 1346
1340
SIB BYTE
SS 1352
XXX 1354
BBB 1356
1350
DISPLACEMENT FIELD 1262A (DISP32 WHEN MOD=10)
DISPLACEMENT FACTOR FIELD 1262B (DISP8*N WHEN MOD=01), REFERRED TO AS DISP8*N, BUT HOLDS ONLY THE DISPLACEMENT FACTOR WHICH IS MULTIPLIED BY N
IMM8
1272
FIG. 13B
FULL OPCODE FIELD 1274
OPCODE MAP 1315
DATA ELEMENT WIDTH FIELD 1264
BASE OPERATION FIELD 1242
REAL OPCODE FIELD 1330
FIG. 13C
REGISTER INDEX FIELD 1244
REX 1305
REX' 1310
VVVV FIELD 1320

FIG. 15A
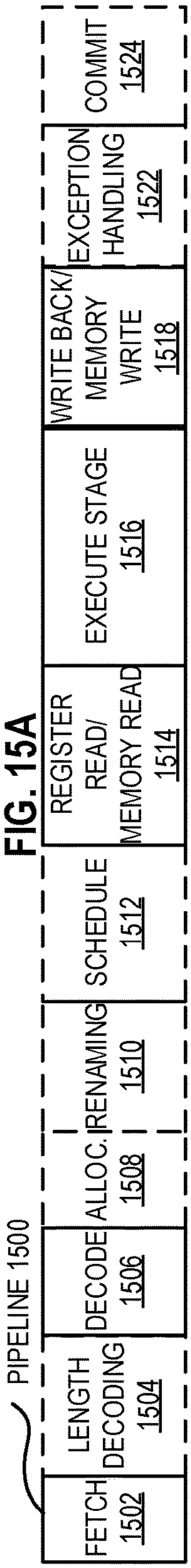
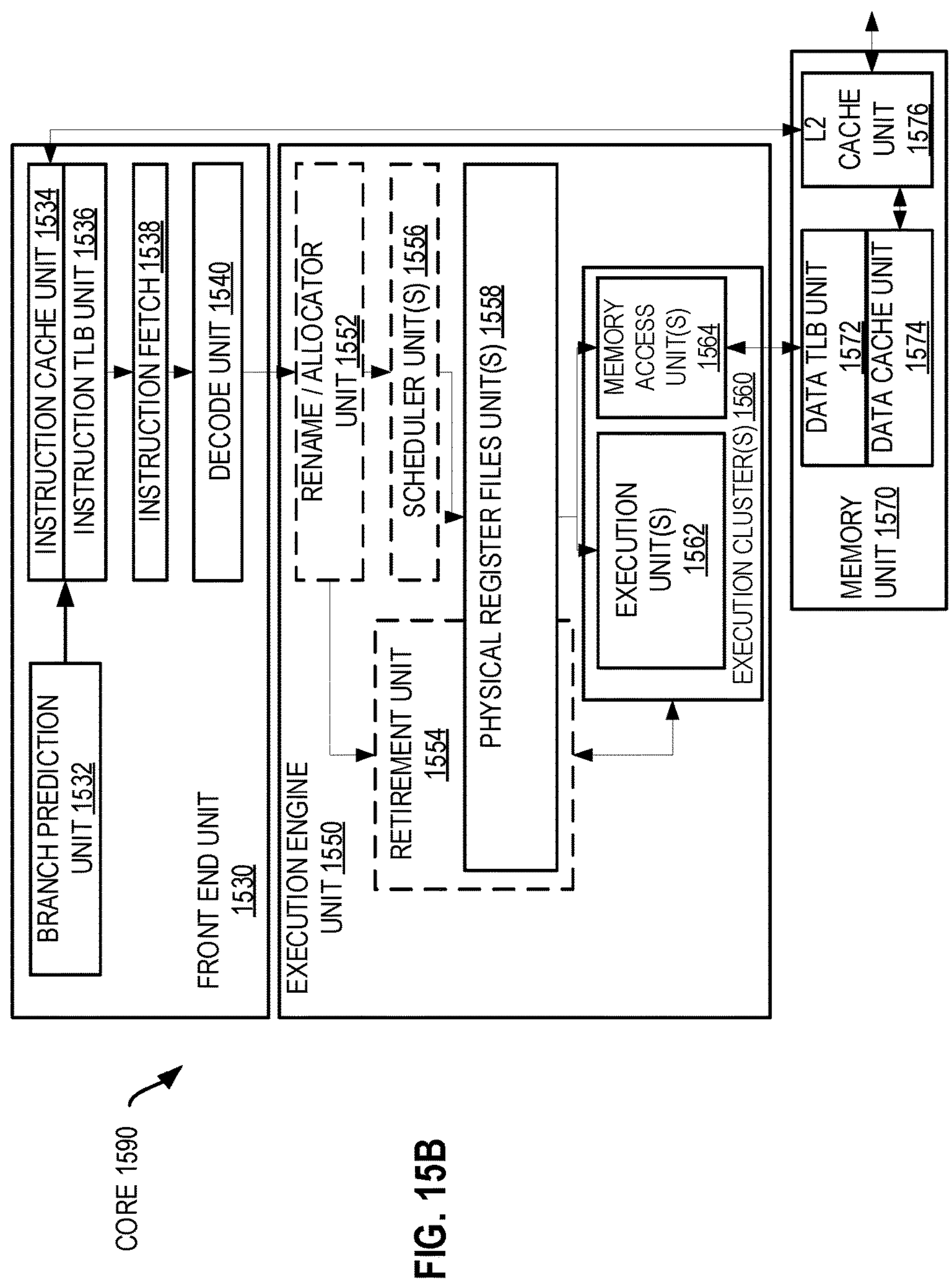
FIG. 15B

APPARATUSES AND METHODS FOR SPECULATIVE EXECUTION SIDE CHANNEL MITIGATION

TECHNICAL FIELD

The disclosure relates generally to electronics, and, more specifically, an embodiment of the disclosure relates to hardware that mitigates speculative execution side channels.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIGS. 6A-6H illustrate formats of branch target buffers (BTBs) according to embodiments of the disclosure.

FIG. 7 illustrates a format of a return stack buffer (RSB) according to embodiments of the disclosure.

FIG. 13A is a block diagram illustrating fields for the generic vector friendly instruction formats in FIGS. 12A and 12B according to embodiments of the disclosure.

FIG. 13B is a block diagram illustrating the fields of the specific vector friendly instruction format in FIG. 13A that make up a full opcode field according to one embodiment of the disclosure.

FIG. 13C is a block diagram illustrating the fields of the specific vector friendly instruction format in FIG. 13A that make up a register index field according to one embodiment of the disclosure.

FIG. 15A is a block diagram illustrating both an exemplary in-order pipeline and an exemplary register renaming, out-of-order issue/execution pipeline according to embodiments of the disclosure.

FIG. 15B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request.

Side channel methods are techniques that may allow an attacker to gain information through observing a processor (e.g., of a computing system), such as measuring micro-architectural properties about the processor. Examples of side channel methods are branch target injection, bounds check bypass, and speculative store bypass. Section I below describes examples of speculative execution hardware and environments, section II below describes branch target injection and mitigation techniques and hardware based on indirect branch control mechanisms (e.g., new interfaces between the processor and system software), section III describes bounds check bypass as well as mitigation techniques based on software modification, section IV below describes speculative store bypass as well as mitigation techniques through speculative store bypass disable or through software modification, and section V below describes capabilities enumeration and architectural registers (e.g., model specific registers (MSRs) that are available for use in certain mitigations. The mitigations herein improve the performance and/or security of a processor (e.g., of a computer) by mitigating side channel attacks from attackers.

I. Speculative Execution Hardware and Environments

Figure 1:
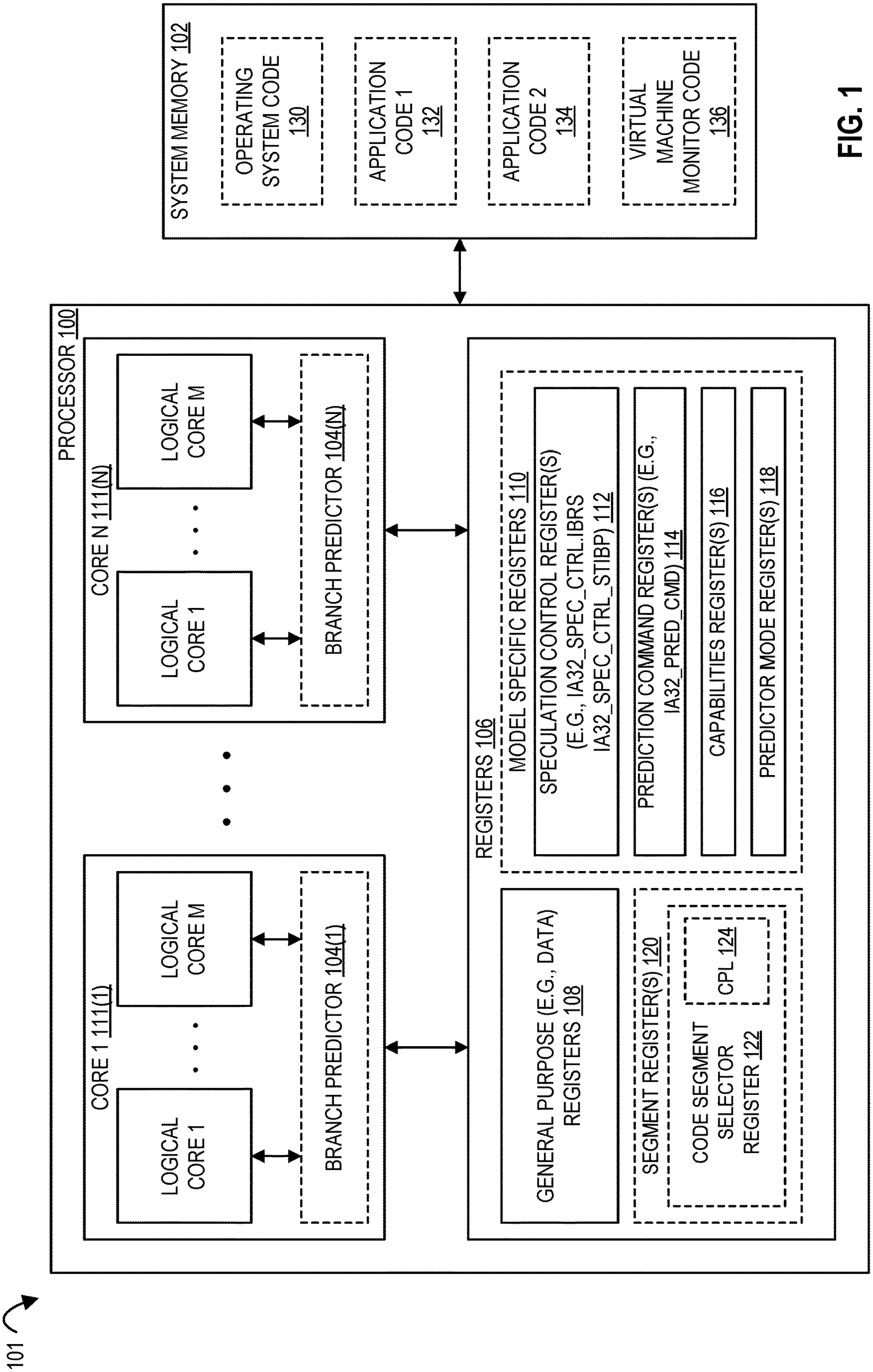
FIG. 1 illustrates a hardware processor including a plurality of cores including a branch predictor according to embodiments of the disclosure.

FIG. 1 illustrates a hardware processor 100 including a plurality of cores 111(1) to 111(N) including a branch predictor 104(1)-104(N), respectively, according to embodiments of the disclosure. In one embodiment, N is any integer 1 or greater. Hardware processor 100 is depicted as coupled to a system memory 102, e.g., forming a computing system 101. In the depicted embodiment, a core of (e.g., each core of) hardware processor 100 includes a plurality of logical cores (e.g., logical processing elements or logical processors), for example, where M is any integer 1 or greater. In certain embodiments, each of physical core 111(1) to physical core 111(N) supports multithreading (e.g., executing two or more parallel sets of operations or threads on a first and second logical core), and may do so in a variety of ways including time sliced multithreading, simultaneous multithreading (e.g., where a single physical core provides a respective logical core for each of the threads (e.g., hardware threads) that physical core is simultaneously multithreading), or a combination thereof (e.g., time sliced fetching and decoding and simultaneous multithreading thereafter). In certain embodiments, each logical core appears to software (e.g., the operating system (OS)) as a distinct processing unit, for example, so that the software (e.g., OS) can schedule two processes (e.g., two threads) for concurrent execution.

Depicted hardware processor 100 includes registers 106. Registers 106 may include one or more general purpose (e.g., data) registers 108 to perform (e.g., logic or arithmetic) operations in, for example, additionally or alternatively to access (e.g., load or store) data in memory 102. Registers 106 may include one or more model specific registers 110. In one embodiment, model specific registers 110 are configuration and/or control registers. In certain embodiments, each physical core has its own respective set of registers 106. In certain embodiments, each logical core (e.g., of multiple logical cores of a single physical core) has its own respective set of registers 106. In certain embodiments, each logical core has its own respective configuration and/or control registers. In one embodiment, one or more (e.g., model specific) registers are (e.g., only) written to at the request of the OS running on the processor, e.g., where the OS operates in privilege (e.g., system) mode but does not operate in non-privilege (e.g., user) mode. In one embodiment, a model specific register can only be written to by software running in supervisor mode, and not by software running in user mode.

Registers 106 (e.g., model specific registers 110) may include one or more of speculation control register(s) 112, prediction command registers(s) 114, capabilities register(s) 116, or predictor mode register(s) 118, e.g., in addition to other control registers. In one embodiment, each logical core has its own respective speculation control register 112, prediction command register 114, capabilities register 116, predictor mode register 118, or any combination thereof. In one embodiment, a plurality of logical cores share a single register, e.g., share one or more general purpose (e.g., data) registers 108. An example format of a capabilities register 116 (e.g., IA32_ARCH_CAPABILITIES MSR) is discussed in reference to FIG. 8, an example format of a speculation control register 112 (e.g., IA32_SPEC_CTRL MSR) is discussed in reference to FIG. 9, and an example format of a prediction command register 114 (e.g., IA32_PRED_CMD MSR) is discussed in reference to FIG. 10. In one embodiment, predictor mode register 118 stores a value that identifies the predictor mode for a core (e.g., a logical core). Example predictor modes are discussed below in section II.

In certain embodiments, each logical core includes its own (e.g., not shared with other logical cores) speculation control register 112, prediction command register 114, capabilities register 116, and/or predictor mode register 118, e.g., separate from the data registers 108. In one embodiment, command register 114 is a write only register (e.g., it can only be written by software, and not read by software). In one embodiment, the speculation control register 112, prediction command register 114, capabilities register 116, predictor mode register 118, or any combination thereof are each read and write registers, e.g., with a write allowed when the write requestor (e.g., software) has an appropriate (e.g., permitted) privilege level (and/or predictor mode) and/or a read allowed for any privilege level. Predictor modes are further discussed in section II below. Each register may be read only (e.g., by a logical core operating in a privilege level below a threshold) or read and write (e.g., writable by a logical core operating in a privilege level above the threshold). In certain embodiments, read and write registers (e.g. IA32_SPEC_CTL register 112) are readable and writeable only in supervisor privilege level. In certain embodiments, write-only registers (e.g. IA32_PRED_CMD register 114) are writeable only in supervisor privilege level and not readable for any privilege level. In certain embodiments, read-only registers (e.g. IA32_ARCH_CAPABILITIES register 116) are readable only in supervisor privilege level and not writeable for any privilege level.

In one embodiment, registers 106 store data indicating a current privilege level of software operating on a logical core, e.g., separately for each logical core. In one embodiment, current privilege level is stored in a current privilege level (CPL) field 124 of a code segment selector register 122 of a segment register(s) 120. In certain embodiments, processor 100 requires a certain level of privilege to perform certain actions, for example, actions requested by a particular logical core (e.g., actions requested by software running on that particular logical core).

System memory 102 may include (e.g., store) one or more of (e.g., any combination of) the following software: operating system (OS) code 130, first application code 132, second (or more) application code 134, virtual machine monitor code 136, or any combination thereof. One example of a virtual machine monitor is discussed herein in reference to FIG. 5. First application code 132 or second application code 134 may be a respective user program.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein. In one embodiment, processor 100 has a single core. In certain embodiments, computing system 101 and/or processor 100 includes one or more of the features and/or components discussed below, e.g., in reference to any Figure herein.

In the depicted embodiment, each physical core includes a respective branch predictor (e.g., branch predictor circuit), for example, such that each logical core of that single physical core shares the same branch predictor. In another embodiment, each physical core of a plurality of physical cores shares a single branch predictor (e.g., branch predictor circuit). In one embodiment, there are a plurality of logical cores within a single physical core and the plurality of logical cores share some (or all) branch predictor(s) and/or branch prediction(s). In one embodiment, a single physical core only has a single logical core, and that single logical core has a dedicated branch predictor and/or branch predictions to itself. In one embodiment, there are a plurality of logical cores within a single physical core and some (or all) branch predictor(s) (and/or prediction(s)) are per logical core instead of being shared.

Figure 2:
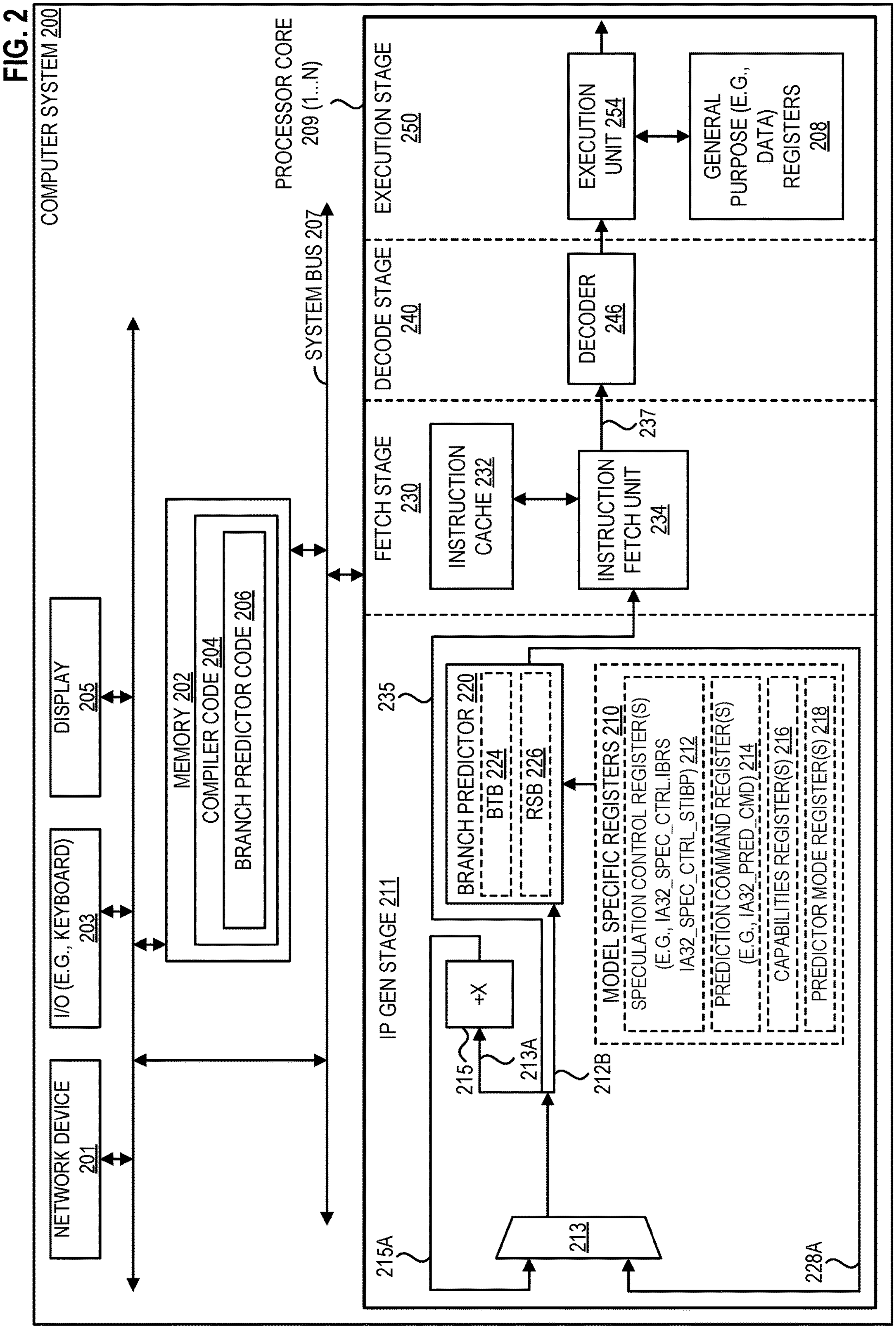
FIG. 2 illustrates a computer system including a branch predictor in a pipelined processor core according to embodiments of the disclosure.
Figure 4:
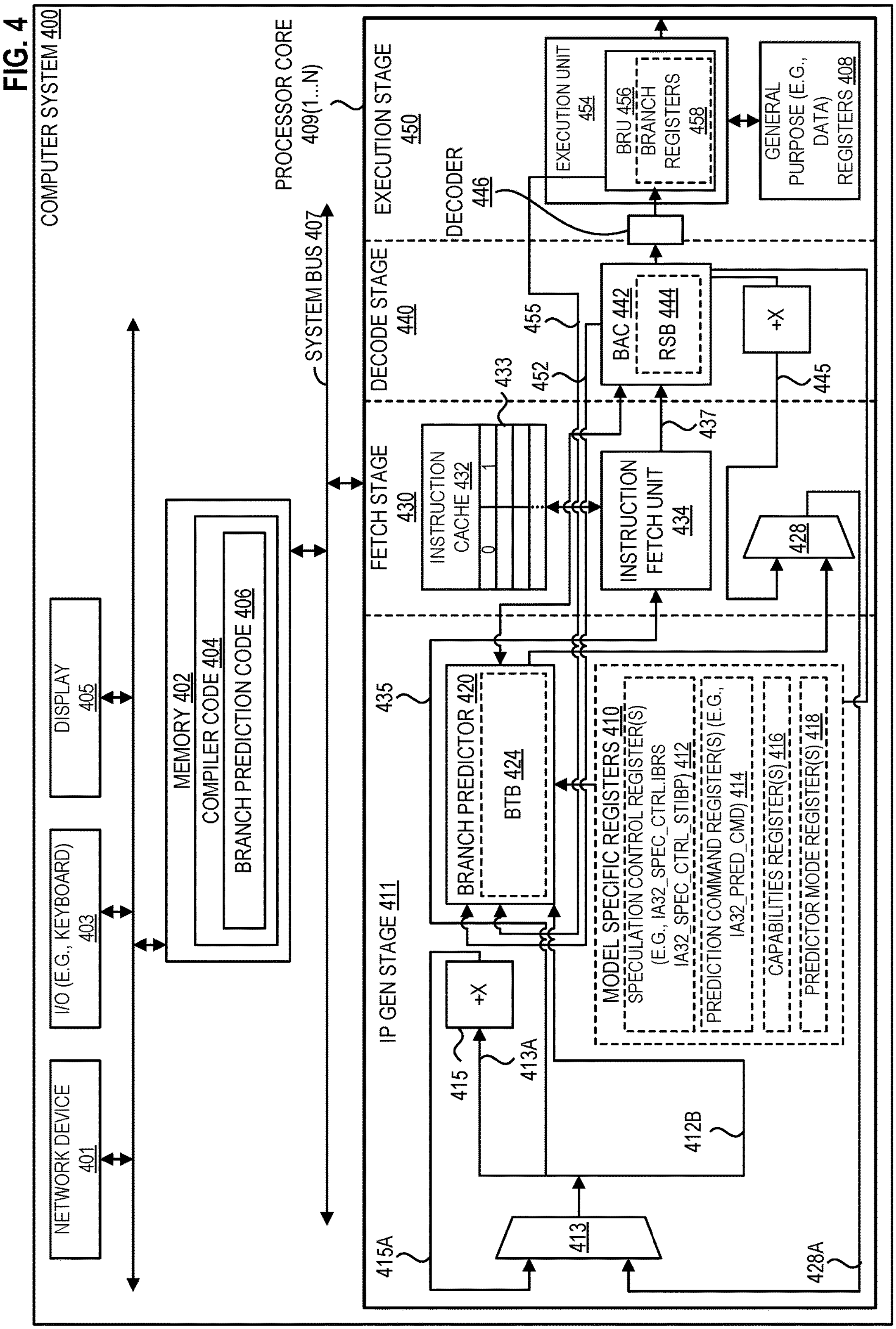
FIG. 4 illustrates a computer system including a branch predictor and a branch address calculator in a pipelined processor core according to embodiments of the disclosure.

In certain embodiments, a branch predictor (e.g., circuit) is to predict a next instruction (e.g., predict a pointer to that next instruction) that is to be executed after a branch type of instruction. The predicted next instruction may be referred to as the target instruction, and the prediction process may be referred to as branch target prediction. Certain branch instructions are referred to as indirect branching instructions. In one embodiment, indirect branch instructions have their branch target (e.g., IP) stored in branch predictor storage (e.g., a branch register(s)). In one embodiment, the branch predictor storage (e.g., register(s)) is within a branch predictor (e.g., branch predictor circuit), for example, as shown in FIG. 2 or FIG. 4. In one embodiment, the branch predictor register is one of registers 106. Additionally or alternatively, conditional branch prediction may be used to predict whether a conditional instruction (e.g., a conditional jump) will be taken (e.g., where the condition is true) or not taken (e.g., where the condition is false).

In certain embodiments, branch instructions are referred to as indirect branch instructions when they can address more than two targets (e.g. whatever target is specified in a register or in an indicated memory location). In one embodiment, a branch instruction is a conditional branch instruction when the target could be either the next sequential instruction (e.g., depending on a condition) or a specified target. Certain processors (e.g., architectures) allow for direct conditional and indirect conditional branches. Certain processors (e.g., architectures) only allow for direct conditional branches. In one embodiment, a direct unconditional branch only has a single target (e.g. as part of the code bytes of the instruction). In one embodiment, direct conditional and/or direct unconditional branches (e.g., IPs) are stored in the branch predictor so that the next address is known before the branch address calculator (BAC) stage of a pipeline. In certain embodiments, indirect branches have target addresses (e.g., IPs) in the branch predictor(s), for example, along with direct branches having target addresses (e.g., IPs) in the branch predictor(s).

As one example, a branch predictor improves the functioning of a pipelined processor. A processor (e.g., microprocessor) may employ the use of pipelining to enhance performance. Within certain embodiments of a pipelined processor, the functional units (e.g., fetch, decode, execute, retire, etc.) for executing different stages of an instruction operate simultaneously on multiple instructions to achieve a degree of parallelism leading to performance increases over non-pipelined processors. In one embodiment, an instruction fetch unit (e.g., circuit), an instruction decoder (e.g., decode unit or decode circuit), and an instruction execution unit (e.g., execution circuit) operate simultaneously. During one clock cycle, the instruction execution unit executes a first instruction while the instruction decoder decodes a second instruction and the fetch unit fetches a third instruction in certain embodiments. During a next clock cycle, the execution unit executes the newly decoded instruction while the instruction decoder decodes the newly fetched instruction and the fetch unit fetches yet another instruction in certain embodiments. In this manner, neither the fetch unit nor the decoder need to wait for the instruction execution unit to execute the last instruction before processing new instructions.

In some instances, instructions are executed in the sequence in which the instructions appear in program order. However, some processors allow for out-of-program-order execution of instructions. For example, a computer program may include a plurality of branch instructions (e.g., CALL, JUMP, or RETURN), which, upon execution, cause (e.g., target) instructions to be executed. More specifically, when a branch instruction is encountered in the program flow, execution continues either with the next sequential instruction or execution jumps to an instruction specified as the branch target (e.g., target instruction). Generally, the branch instruction is said to be “taken” if execution jumps to an instruction other than the next sequential instruction, and “not taken” if execution continues with the next sequential instruction. In one embodiment, instructions may be executed in a sequence other than as set forth in the program order.

Figure 3:
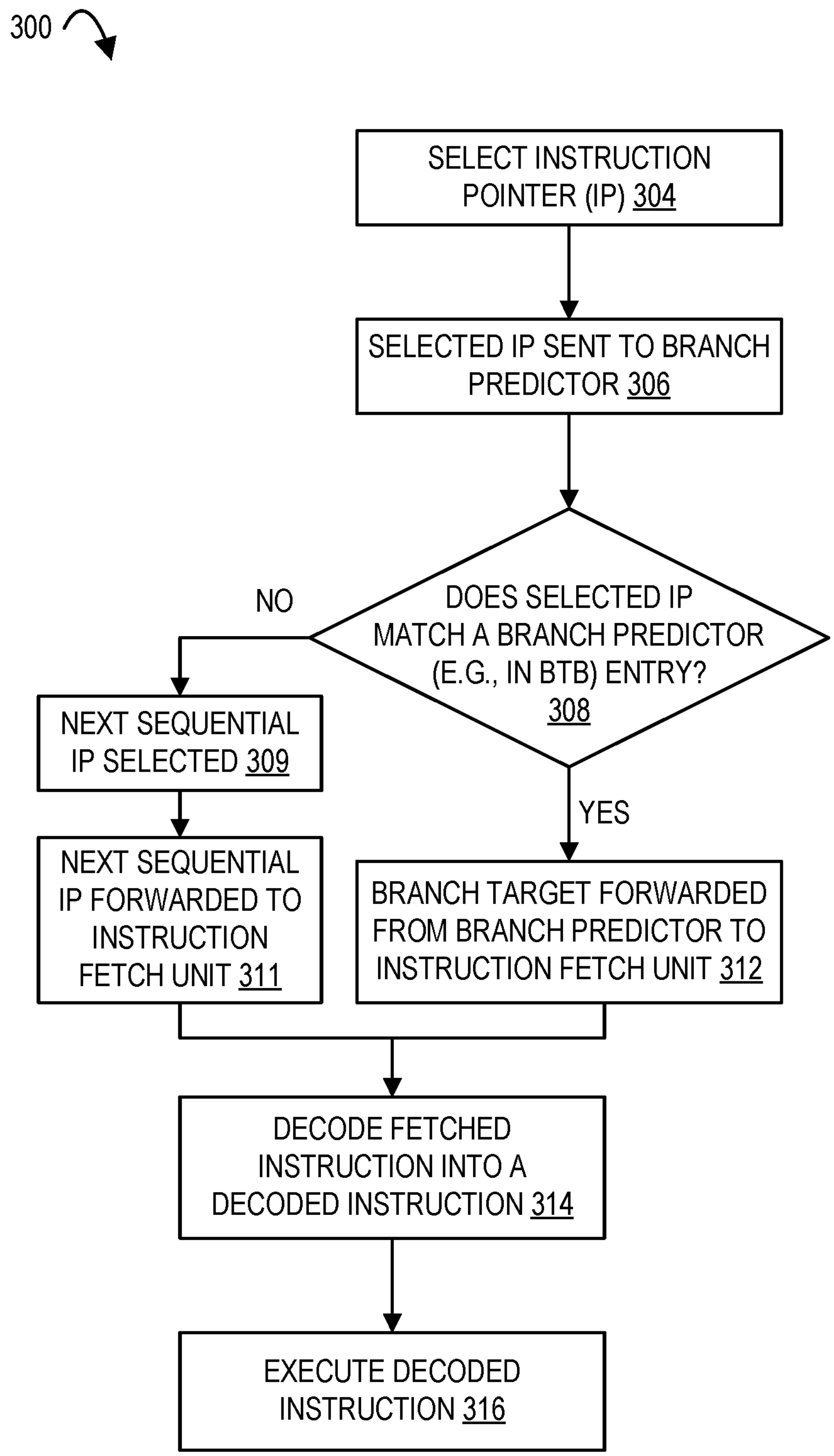
FIG. 3 illustrates a flow diagram for predicting whether a branch instruction will be taken according to embodiments of the disclosure.

In certain embodiments, branch instructions are either unconditional (e.g., the branch is taken every time the instruction is executed) or conditional (e.g., the branch is dependent upon a condition), for example, where instructions to be executed following a conditional branch are not known with certainty until the condition upon which the branch depends is resolved. Here, rather than wait until the condition is resolved, a processor may perform a branch prediction to predict whether the branch will be taken or not taken, and if taken, predicts the target instruction (e.g., target address) for the branch. In one embodiment, if the branch is predicted to be taken, the processor fetches and speculatively executes the instruction(s) found at the predicted branch target address. The instructions executed following the branch prediction are speculative in certain embodiments where the processor has not yet determined whether the prediction is correct. In certain embodiments, a processor resolves branch instructions at the back-end of the pipeline (e.g., in a retirement unit). In one embodiment, if a branch instruction is determined to not be taken by the processor (e.g., back-end), then all instructions (e.g., and their data) presently in the pipeline behind the not taken branch instruction are flushed (e.g., discarded). In one embodiment, a flush is performed if a prediction does not match the determined direction. FIGS. 2-4 below describe embodiments of branch prediction.

FIG. 2 illustrates a computer system 200 including a branch predictor 220 in a pipelined processor core 209(1-N) according to embodiments of the disclosure. In one embodiment, each core of processor 100 in FIG. 1 is an instance of processor core 209(1-N), where N is any positive integer. In certain embodiments, each processor core 209(1-N) instance supports multithreading (e.g., executing two or more parallel sets of operations or threads on a first and second logical core), and may do so in a variety of ways including time sliced multithreading, simultaneous multithreading (e.g., where a single physical core provides a logical core for each of the threads that physical core is simultaneously multithreading), or a combination thereof (e.g., time sliced fetching and decoding and simultaneous multithreading thereafter). In the depicted embodiment, each single processor core 209(1) to 200(N) includes an instance of branch predictor 220. Branch predictor 220 may include a branch target buffer (BTB) 224 and/or a return stack buffer 226 (RSB). In certain embodiments, branch target buffer 224 stores (e.g., in a branch predictor array) the predicted target instruction corresponding to each of a plurality of branch instructions (e.g., branch instructions of a section of code that has been executed multiple times). In certain embodiments, return stack buffer 226 is to store (e.g., in a stack data structure of last data in is the first data out (LIFO)) the return addresses of any CALL instructions (e.g., that push their return address on the stack).

FIG. 3 illustrates a flow diagram 300 for predicting whether a branch instruction will be taken according to embodiments of the disclosure.

Referring to FIGS. 2 and 3, a pipelined processor core (e.g., 209(1)) includes an instruction pointer generation (IP Gen) stage 211, a fetch stage 230, a decode stage 240, and an execution stage 250. Each of the pipelined stages shown in processor core 209(1)-(N) may include varying levels of circuitry. Alternatively, the pipeline stages may be subdivided into a larger number of stages. Moreover, additional pipeline stages, such as a write back stage as discussed further below in reference to FIG. 15A, may also be included.

The IP Gen stage 211, as depicted in FIG. 2, selects instruction pointers (e.g., memory addresses) which identify the next instruction in a program sequence that is to be fetched and executed by the core (e.g., logical core). In one embodiment, the IP Gen stage 211 increments the memory address of the most recently fetched instruction by a predetermined amount X (e.g., 1), each clock cycle.

However, in the case of an exception, or when a branch instruction is taken, the IP Gen stage 211 may select an instruction pointer identifying an instruction that is not the next sequential instruction in the program order. In certain embodiments, the IP Gen stage also predicts whether a branch instruction is taken, for example, to decrease branch penalties.

The fetch stage 230, as depicted in FIG. 2, accepts instruction pointers from the IP Gen stage 211 and fetches the respective instruction from memory 202 or instruction cache 232. The decode stage 240 performs decode operations to decode an instruction into a decoded instruction. The execution stage 250 performs an operation as specified by a decoded instruction. In alternative embodiments, the pipelined stages described above may also include additional operations.

FIG. 3 provides a flow diagram 300 describing the computer system in FIG. 2 performing early branch prediction, according to embodiments of the disclosure. The following is one example in reference to FIG. 2, but flow diagram 300 may also be used with other circuitry (e.g., in FIG. 4). At 304, the IP Gen Stage 211 of the core (e.g., IP Gen mux 213) selects an instruction pointer from a set of inputs, each of which are configured to provide an instruction pointer to the core (e.g., IP Gen mux 213). The inputs of the core (e.g., IP Gen mux 213) may be pre-assigned with respective priorities to assist the IP Gen Stage 211 (e.g., IP Gen mux 213) in selecting which input will pass through the IP Gen Stage 211 (e.g., mux 213) onto the fetch stage 230 (e.g., instruction fetch unit 234).

As shown in FIG. 2, the IP Gen mux 213 receives an instruction pointer from line 215A. The instruction pointer provided via line 215A is generated by the incrementer circuit 215, which receives a copy of the most recent instruction pointer from the path 213A. The incrementer circuit 215 may increment the present instruction pointer by a predetermined amount (e.g., which may be different for different instructions), to obtain the next sequential instruction from a program sequence presently being executed by the core.

The IP Gen mux 213 is also shown to be receiving an instruction pointer from the branch prediction line 228A. The instruction pointer provided via the branch prediction line 228A is generated by the Branch Predictor 220 (e.g., Branch Predictor Unit (BPU)) of the core, which is discussed in more detail below. In certain embodiments, the branch prediction line 228A provides the IP Gen mux 213 with the branch target (e.g., target instruction) for a branch instruction which the branch predictor has predicted. Additional input lines may be received by the IP Gen mux 213, for example, lines to account for detecting exceptions and for correcting branch predictions may also be received by the IP Gen mux 213.

At 306, an indicator of the instruction pointer (IP) (e.g., copy of the instruction pointer) selected by the IP Gen mux 213 is forwarded to the branch predictor 220 via line 212B. (Hereinafter for this section, the instruction pointer selected by the IP Gen mux will be referred to as "the IP".) In certain embodiments, the branch predictor 220 includes or accesses storage having one or more entries, with each entry capable of storing data identifying a branch instruction and corresponding data identifying the branch target of the branch instruction (e.g., as discussed in reference to FIGS. 6A-6H below).

In one embodiment, the branch instructions stored in the branch predictor 220 are pre-selected by a compiler as branch instructions that will be taken. In certain embodiments, the compiler code 204, as shown stored in the memory 202 of FIG. 2, includes a sequence of code that, when executed, translates source code of a program written in a high-level language into executable machine code. In one embodiment, the compiler code 204 further includes additional branch predictor code 206 that predicts a target instruction for branch instructions (for example, branch instructions that are likely to be taken (e.g., pre-selected branch instructions)). The branch predictor 220 (e.g., BTB 224 thereof) is thereafter updated with target instruction for a branch instruction. As discussed in section II below, depicted core (e.g., branch predictor 220 thereof) includes access to one or more registers (e.g., registers 106 from FIG. 1). In certain embodiments, core include one or more of general purpose register(s) 208, speculation control register(s) 212, prediction command registers(s) 214, capabilities register(s) 216, or predictor mode register(s) 218, e.g., as model specific registers 210. In one embodiment, each logical core has its own respective speculation control register 212, prediction command register 214, capabilities register 216, predictor mode register 218, or any combination thereof.

In certain embodiments, each entry for the branch predictor 220 (e.g., in BTB 224 thereof) includes a tag field and a target field, for example, as shown in FIGS. 6A-6H. In one embodiment, the tag field of each entry in the BTB stores at least a portion of an instruction pointer (e.g., memory address) identifying a branch instruction. In one embodiment, the tag field of each entry in the BTB stores an instruction pointer (e.g., memory address) identifying a branch instruction in code. In one embodiment, the target field stores at least a portion of the instruction pointer for the target of the branch instruction identified in the tag field of the same entry. Moreover, in other embodiment, the entries for the branch predictor 220 (e.g., in BTB 224 thereof) includes one or more other fields, e.g., as discussed in reference to FIGS. 6A-6H. In certain embodiments, an entry does not include a separate field to assist in the prediction of whether the branch instruction is taken, e.g., if a branch instruction is present (e.g., in the BTB), it is considered to be taken.

In certain embodiments, the IP selected by the IP Gen mux is sixty-four bits (e.g., 63:0, with 0 being the least significant bit, and 63 being the most significant bit), forty-nine bits, or forty-eight bits. In one embodiment, a first portion of the IP bits (e.g., [4:0]) specify the address of the respective instruction within a line of memory (e.g., the location within a cache line) and the remaining bits of the instruction pointer are used to identify the line of memory storing the respective instruction.

In one embodiment, the tag fields of the entries for branch predictor 220 (e.g., in BTB 224 thereof) include a portion (e.g., twenty-two bits) of a branch instruction's memory address (e.g., bits [62:61] and [24:5] of the instruction pointer). In one embodiment, the target field of each entry includes a different portion (e.g., forty bits) of the branch instruction's target. In alternative embodiments, the size of the tag and target fields of an entry vary and/or the actual size of the instruction pointer may also vary in other embodiments. In certain embodiments of branch predictors that hold a target, an index and/or tag are used as an entry identifier that identifies the corresponding target entry in the branch target buffer for a branch IP. In one embodiment, the index and/or tag for the branch IP comes from previous branch history (e.g., location, targets, direction of previous branches). In one embodiment, the index and/or tag are formed from the previous branch history or from that previous branch history combined with the IP of this branch. In one embodiment, a smaller target field (e.g., branch field 610 in FIGS. 6A-6F, indirect branch field 622 in FIG. 6G, or direct branch field 624 in FIG. 6H) than the entire IP is used in the branch predictor. For example, a branch predictor may store only the bottom section (e.g., 32 bits) of the target's IP in the BTB and assumes that the upper section (e.g., 32 bits) of the target's IP matches the upper section (e.g., 32 bits) of the branch's IP.

Once the branch predictor 220 receives the IP (e.g., from the IP Gen mux) at 308, the branch predictor 220 compares the received IP (e.g., a portion of the IP) with the (e.g., corresponding portion of the) tag field of each entry (e.g., in BTB 224 thereof). As depicted in FIG. 3, the branch predictor 220 performs the comparison to determine if the received IP corresponds (e.g., matches) to a branch instruction therein that includes a target value (e.g., target instruction), e.g., in BTB 224. In one embodiment, the IP gen mux selects the IP and the branch predictor 220 performs the compare operation within the same clock cycle. Alternatively, the compare operation of the branch predictor 220 may occur in a clock cycle following the selection of the IP.

If no match is found between the IP and the tag fields (e.g., in BTB 224), at 309 the next sequential IP is selected (e.g., by the IP Gen mux) as the next instruction to be fetched. However, if the branch predictor 220 detects a match between the IP and a tag field (e.g., in BTB 224), at 312, an indicator (e.g., or copy of) for the branch target corresponding to the matching tag field is sent to fetch unit 234. In one embodiment, the indicator (e.g., or copy of) for the branch target corresponding to the matching tag field is forwarded to the IP Gen mux, via the branch prediction line 228A. Assuming the branch prediction line 228A has the highest priority among the asserted lines received by the IP Gen mux, at 312, the branch target is passed onto the instruction fetch unit 234 via line 235 to begin fetching instruction(s) at the respective address of the branch target. After the next sequential IP is forwarded to the instruction fetch unit at 311 or the branch target corresponding to the matching tag field is sent to the instruction fetch unit at 312, that fetched instruction is sent to the decoder 246 (e.g., via line 237) to be decoded at 314, and the decoded instruction is sent to the execution unit 254 to be executed at 316.

Depicted computer system 200 further includes a network device 201, input/output (I/O) circuit 203 (e.g., keyboard), display 205, and a system bus (e.g., interconnect) 207.

Figures 6G, 6H, 7:
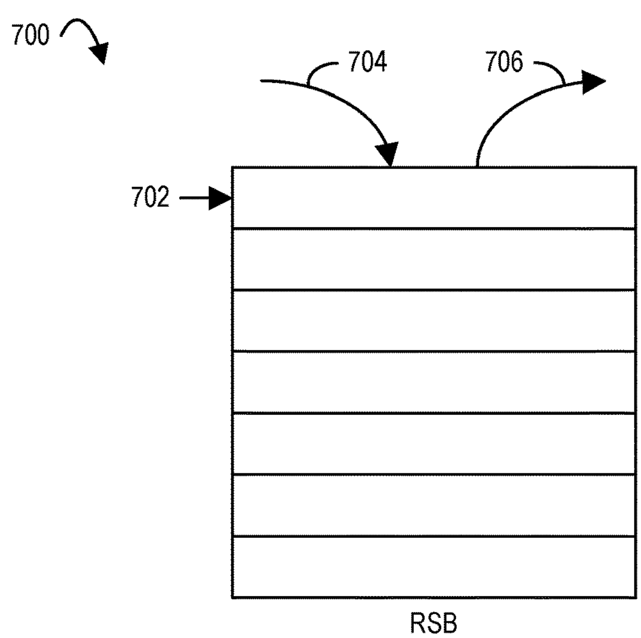

FIG. 4 illustrates a computer system 400 including a branch predictor 420 and a branch address calculator 442 (BAC) in a pipelined processor core 409(1)-400(N) according to embodiments of the disclosure. Referring to FIG. 4, a pipelined processor core (e.g., 409(1)) includes an instruction pointer generation (IP Gen) stage 411, a fetch stage 430, a decode stage 440, and an execution stage 450. In one embodiment, each core of processor 100 in FIG. 1 is an instance of processor core 409(1-N), where N is any positive integer. In certain embodiments, each processor core 409(1-N) instance supports multithreading (e.g., executing two or more parallel sets of operations or threads on a first and second logical core), and may do so in a variety of ways including time sliced multithreading, simultaneous multithreading (e.g., where a single physical core provides a logical core for each of the threads that physical core is simultaneously multithreading), or a combination thereof (e.g., time sliced fetching and decoding and simultaneous multithreading thereafter). In the depicted embodiment, each single processor core 409(1) to 400(N) includes an instance of branch predictor 420. Branch predictor 420 may include a branch target buffer (BTB) 424. In certain embodiments, branch target buffer 424 stores (e.g., in a branch predictor array) the predicted target instruction corresponding to each of a plurality of branch instructions (e.g., branch instructions of a section of code that has been executed multiple times). In the depicted embodiment, a branch address calculator (BAC) 442 is included which accesses (e.g., includes) a return stack buffer 444 (RSB), e.g., RSB as shown in FIG. 7. In certain embodiments, return stack buffer 444 is to store (e.g., in a stack data structure of last data in is the first data out (LIFO)) the return addresses of any CALL instructions (e.g., that push their return address on the stack).

In comparison to FIG. 2, branch address calculator (BAC) 442 in FIG. 4 is included. In certain embodiments, a branch address calculator is to calculate addresses for certain types of branch instructions and/or to verify branch predictions made by a branch predictor (e.g., BTB). In certain embodiments, the branch address calculator performs branch target and/or next sequential linear address computations. In certain embodiments, the branch address calculator performs static predictions on branches based on the address calculations.

In certain embodiments, the branch address calculator 442 contains a return stack buffer 444 to keep track of the return addresses of the CALL instructions. In one embodiment, the branch address calculator attempts to correct any improper prediction made by the branch predictor 420 to reduce branch misprediction penalties. As one example, the branch address calculator verifies branch prediction for those branches whose target can be determined solely from the branch instruction and instruction pointer.

In certain embodiments, the branch address calculator 442 maintains the return stack buffer 444 utilized as a branch prediction mechanism for determining the target address of return instructions, e.g., where the return stack buffer operates by monitoring all "call subroutine" and "return from subroutine" branch instructions. In one embodiment, when the branch address calculator detects a "call subroutine" branch instruction, the branch address calculator pushes the address of the next instruction onto the return stack buffer, e.g., with a top of stack pointer marking the top of the return stack buffer. By pushing the address immediately following each "call subroutine" instruction onto the return stack buffer, the return stack buffer contains a stack of return addresses in this embodiment. When the branch address calculator later detects a "return from subroutine" branch instruction, the branch address calculator pops the top return address off of the return stack buffer, e.g., to verify the return address predicted by the branch predictor 420. In one embodiment, for a direct branch type, the branch address calculator is to (e.g., always) predict taken for a conditional branch, for example, and if the branch predictor does not predict taken for the direct branch, the branch address calculator overrides the branch predictor's missed prediction or improper prediction.

Turning to the specific circuitry in FIG. 4, the additional features relative to FIG. 2 are provided to validate branch predictions made by the branch predictor 420. Each branch predictor 420 entry (e.g., in BTB 424) may further includes a valid field and a bundle address (BA) field which are used to increase the accuracy and validate branch predictions performed by the branch predictor 420, as is discussed in more detail below. In one embodiment, the valid field and the BA field each consist of one bit fields. In other embodiments, however, the size of the valid and BA fields may vary. In one embodiment, a fetched instruction is sent (e.g., by BAC 442 from line 437) to the decoder 446 to be decoded, and the decoded instruction is sent to the execution unit 454 to be executed.

Depicted computer system 400 includes a network device 401, input/output (I/O) circuit 403 (e.g., keyboard), display 405, and a system bus (e.g., interconnect) 407.

In one embodiment, the branch instructions stored in the branch predictor 420 are pre-selected by a compiler as branch instructions that will be taken. In certain embodiments, the compiler code 404, as shown stored in the memory 402 of FIG. 4, includes a sequence of code that, when executed, translates source code of a program written in a high-level language into executable machine code. In one embodiment, the compiler code 404 further includes additional branch prediction code 406 that predicts a target instruction for branch instructions (for example, branch instructions that are likely to be taken (e.g., pre-selected branch instructions)). The branch predictor 420 (e.g., BTB 424 thereof) is thereafter updated with target instruction for a branch instruction. In one embodiment, software manages a hardware BTB, e.g., with the software specifying the prediction mode or with the prediction mode defined implicitly by the mode of the instruction that writes the BTB also setting a mode bit in the entry.

As discussed in section II below, depicted core (e.g., branch predictor 420 thereof) includes access to one or more registers (e.g., registers 106 from FIG. 1). In certain embodiments, core include one or more of general purpose register(s) 408, speculation control register(s) 412, prediction command registers(s) 414, capabilities register(s) 416, or predictor mode register(s) 418, e.g., as model specific registers 410. In one embodiment, each logical core has its own respective speculation control register 412, prediction command register 414, capabilities register 416, predictor mode register 418, or any combination thereof.

In certain embodiments, each entry for the branch predictor 420 (e.g., in BTB 424 thereof) includes a tag field and a target field, for example, as shown in FIGS. 6A-6H. In one embodiment, the tag field of each entry in the BTB stores at least a portion of an instruction pointer (e.g., memory address) identifying a branch instruction. In one embodiment, the tag field of each entry in the BTB stores an instruction pointer (e.g., memory address) identifying a branch instruction in code. In one embodiment, the target field stores at least a portion of the instruction pointer for the target of the branch instruction identified in the tag field of the same entry. Moreover, in other embodiment, the entries for the branch predictor 420 (e.g., in BTB 424 thereof) includes one or more other fields, e.g., as discussed in reference to FIGS. 6A-6H. In certain embodiments, an entry does not include a separate field to assist in the prediction of whether the branch instruction is taken, e.g., if a branch instruction is present (e.g., in the BTB), it is considered to be taken.

As shown in FIG. 4, the IP Gen mux 413 of IP generation stage 411 receives an instruction pointer from line 415A. The instruction pointer provided via line 415A is generated by the incrementer circuit 415, which receives a copy of the most recent instruction pointer from the path 413A. The incrementer circuit 415 may increment the present instruction pointer by a predetermined amount, to obtain the next sequential instruction from a program sequence presently being executed by the core.

In one embodiment, upon receipt of the IP from IP Gen mux 413, the branch predictor 420 compares a portion of the IP with the tag field of each entry in the branch predictor 420 (e.g., BTB 424). If no match is found between the IP and the tag fields of the branch predictor 420, the IP Gen mux will proceed to select the next sequential IP as the next instruction to be fetched in this embodiment. Conversely, if a match is detected, the branch predictor 420 reads the valid field of the branch predictor entry which matches with the IP. If the valid field is not set (e.g., has logical value of 0) the branch predictor 420 considers the respective entry to be "invalid" and will disregard the match between the IP and the tag of the respective entry in this embodiment, e.g., and the branch target of the respective entry will not be forwarded to the IP Gen Mux. On the other hand, if the valid field of the matching entry is set (e.g., has a logical value of 1), the branch predictor 420 proceeds to perform a logical comparison between a predetermined portion of the instruction pointer (IP) and the branch address (BA) field of the matching branch predictor entry in this embodiment. If an “allowable condition” is present, the branch target of the matching entry will be forwarded to the IP Gen mux, and otherwise, the branch predictor 420 disregards the match between the IP and the tag of the branch predictor entry. In some embodiment, the entry indicator is formed from not only the current branch IP, but also at least a portion of the global history.

More specifically, in one embodiment, the BA field indicates where the respective branch instruction is stored within a line of cache memory 432. In certain embodiments, a processor is able to initiate the execution of multiple instructions per clock cycle, wherein the instructions are not interdependent and do not use the same execution resources.

For example, each line of the instruction cache 432 shown in FIG. 4 includes multiple instructions (e.g., six instructions). Moreover, in response to a fetch operation by the fetch unit 434, the instruction cache 432 responds (e.g., in the case of a “hit”) by providing a full line of cache to the fetch unit 434 in this embodiment. The instructions within a line of cache may be grouped as separate “bundles.” For example, as shown in FIG. 4, the first three instructions in a cache line 433 may be addressed as bundle 0, and the second three instructions may be address as bundle 1. Each of the instructions within a bundle are independent of each other (e.g., can be simultaneously issued for execution). The BA field provided in the branch predictor 420 entries is used to identify the bundle address of the branch instruction which corresponds to the respective entry in certain embodiments. For example, in one embodiment, the BA identifies whether the branch instruction is stored in the first or second bundle of a particular cache line.

In one embodiment, the branch predictor 420 performs a logical comparison between the BA field of a matching entry and a predetermined portion of the IP to determine if an “allowable condition” is present. For example, in one embodiment, the fifth bit position of the IP (e.g. IP[4]) is compared with the BA field of a matching (e.g., BTB) entry. In one embodiment, an allowable condition is present when IP [4] is not greater than the BA. Such an allowable condition helps prevent the apparent unnecessary prediction of a branch instruction, which may not be executed. That is, when less than all of the IP is considered when doing a comparison against the tags of the branch predictor 420, it is possible to have a match with a tag, which may not be a true match. Nevertheless, a match between the IP and a tag of the branch predictor indicates a particular line of cache, which includes a branch instruction corresponding to the respective branch predictor entry, may about to be executed. Specifically, if the bundle address of the IP is not greater than the BA field of the matching branch predictor entry, then the branch instruction in the respective cache line is soon to be executed. Hence, a performance benefit can be achieved by proceeding to fetch the target of the branch instruction in certain embodiments.

As discussed above, if an “allowable condition” is present, the branch target of the matching entry will be forwarded to the IP Gen mux in this example. Otherwise, the branch predictor will disregard the match between the IP and the tag. In one embodiment, the branch target forwarded from the branch predictor is initially sent to a Branch Prediction (BP) resteer mux 428, before it is sent to the IP Gen mux. The BP resteer mux 428, as shown in FIG. 4, may also receive instruction pointers from other branch prediction devices. In one embodiment, the input lines received by the BP resteer mux will be prioritized to determine which input line will be allowed to pass through the BP resteer mux onto the IP Gen mux.

In addition to forwarding a branch target to the BP resteer mux, upon detecting a match between the IP and a tag of the branch predictor, the BA of the matching branch predictor entry is forwarded to the Branch Address Calculator (BAC) 442. The BAC 442 is shown in FIG. 4 to be located in the decode stage 440, but may be located in other stage(s). The BAC of may also receive a cache line from the fetch unit 434 via line 437.

The IP selected by the IP Gen mux is also forwarded to the fetch unit 434, via data line 435 in this example. Once the IP is received by the fetch unit 434, the cache line corresponding to the IP is fetched from the instruction cache 432. The cache line received from the instruction cache is forwarded to the BAC, via data line 437.

Upon receipt of the BA in this example, the BAC will read the BA to determine where the pre-selected branch instruction (e.g., identified in the matching branch predictor entry) is located in the next cache line to be received by the BAC (e.g., the first or second bundle of the cache line). In one embodiment, it is predetermined where the branch instruction is located within a bundle of a cache line (e.g., in a bundle of three instructions, the branch instruction will be stored as the second instruction).

In alternative embodiments, the BA includes additional bits to more specifically identify the address of the branch instruction within a cache line. Therefore, the branch instruction would not be limited to a specific instruction position within a bundle.

After the BAC determines the address of the pre-selected branch instruction within the cache line, and has received the respective cache line from the fetch unit 434, the BAC will decode the respective instruction to verify the IP truly corresponds to a branch instruction. If the instruction addressed by BA in the received cache line is a branch instruction, no correction for the branch prediction is necessary. Conversely, if the respective instruction in the cache line is not a branch instruction (i.e., the IP does not correspond to a branch instruction), the BAC will send a message to the branch predictor to invalidate the respective branch predictor entry, to prevent similar mispredictions on the same branch predictor entry. Thereafter, the invalidated branch predictor entry will be overwritten by a new branch predictor entry.

In addition, in one embodiment, the BAC will increment the IP by a predetermined amount and forward the incremented IP to the BP resteer mux 428, via data line 445, e.g., the data line 445 coming from the BAC will take priority over the data line from the branch predictor. As a result, the incremented IP will be forwarded to the IP Gen mux and passed to the fetch unit in order to correct the branch misprediction by fetching the instructions that sequentially follow the IP.

Updating the Branch Predictor Entries

In one embodiment, the branch predictor is updated by the BAC and the Branch Resolution Unit (BRU) 456. For example, when the compiler translates a “high-level” branch instruction into a machine level instruction for execution, the compiler will provide a “predict instruction” to be executed prior to the respective branch instruction. The predict instruction can be used to update the branch predictor.

In one embodiment, the predict instruction includes two immediate operands. The first immediate operand is an offset of the respective branch instruction's memory address. The second immediate operand is an offset of the branch instruction's target address. Alternatively, the predict instruction may identify a branch register (BR) 458 (or a general purpose register (GPR) 408) storing the address of the branch instruction and/or the branch target.

The predict instruction may also include an "important hint" (ih) field, which when set by the branch predictor of the compiler, indicates the respective branch instruction is likely to be taken. The branch prediction of the compiler may statically set the ih field of a predict instruction based on the operation (op) code of the respective branch instruction (e.g., unconditional branch, return branch, conditional branch, etc.). Alternatively, the branch predictor may generate a profile for the respective branch instruction, and set the ih field of the predict instruction, according to the history of the respective branch instruction.

As a result, in one embodiment, when the BAC receives a predict instruction which has an ih field that is set, the BAC will forward, via data path 452, at least part of the branch instruction's memory address and the target of the branch instruction to branch predictor, as shown in FIG. 4. Upon receipt of the data, the branch predictor will proceed to update an entry of the branch predictor, with the data received from the BAC in this example.

In addition, the branch predictor entries can also be updated by the Branch Resolution Unit (BRU) 456, which is shown in FIG. 4 to be included in the execution unit 454. More specifically, certain branch instructions are referred to as indirect branching instructions, e.g., where the branch target is stored in a branch register(s) 458. In one embodiment, the branch registers are provided in the BRU 456 as shown in FIG. 4. In one embodiment, indirect branch instructions have a target that is not implicit in the instruction bytes, for example, the target is stored in a register (e.g., branch register) or memory.

Registers in computer system 400 (e.g., model specific registers 410) may include one or more of speculation control register(s) 412, prediction command registers(s) 414, capabilities register(s) 416, or predictor mode register(s) 418, e.g., in addition to other control registers. In one embodiment, each logical core has its own respective speculation control register 412, prediction command register 414, capabilities register 416, predictor mode register 418, or any combination thereof. In one embodiment, a plurality of logical cores share a single register, e.g., share one or more general purpose (e.g., data) registers 408 and/or share one or more control registers. An example format of a capabilities register 416 (e.g., IA32_ARCH_CAPABILITIES MSR) is discussed in reference to FIG. 8, an example format of a speculation control register 412 (e.g., IA32_SPEC_CTRL MSR) is discussed in reference to FIG. 9, and an example format of a prediction command register 414 (e.g., IA32_PRED_CMD MSR) is discussed in reference to FIG. 10. In one embodiment, predictor mode register 418 stores a value that identifies the predictor mode for a core (e.g., a logical core). In certain embodiments, the predictor mode is derived from other state (e.g. other control registers) and does not require a physical register or direct software accessibility. Example predictor modes are discussed below in section II.

In certain embodiments, special instructions, prior to the indirect branch instructions, are used to store the branch targets in the branch registers (and/or other memory). That is, when the compiler is translating a higher level indirect branch instruction into a machine level instruction, the compiler generates a set branch register (set_BR) instruction, that is to be executed prior the actual indirect branch instruction. When executed, the set_BR instructions will write the target address of an indirect branch instruction into a branch register.

For example, the set_BR instruction may transfer the value of the branch target value from a register (e.g., GPR) 408 to a branch register 458. Alternatively, the branch target may be included in the set_BR instruction as an offset, which could be added to the memory address of the set_BR instruction to obtain the address of the respective branch target. The address of the branch target could then be written into the BR to be used by the indirect branch instruction which follows.

In one embodiment, the set_BR instruction further identifies the address of the respective indirect branch instruction. For example, the address may be included as an offset which, once again, can be added to the memory address of the respective set_BR instruction to obtain the address of the indirect branch instruction. In one embodiment, the set_BR instruction includes the "important hint" (ih) field, as described above.

In one embodiment, when the BRU receives a set_BR instruction, the BRU sends to the branch predictor, via data path 455, at least part of the respective branch instruction's memory address and at least part of the branch instruction's target. In one embodiment, the BRU also sends the ih field of the set_BR instruction. If the ih field is set, the branch predictor will proceed to update an entry of the branch predictor with the data received from the BRU in this example. Otherwise, the branch predictor will disregard the data received from the BRU. Alternatively, the BRU may read the ih field of the set_BR instruction to determine whether to transmit the data to the branch predictor.

In addition to running user applications and an operating system, a processor (e.g., core) may run a virtual machine monitor (VMM) which in turn manages multiple virtual machines (VMs) running on the processor.

Figure 5:
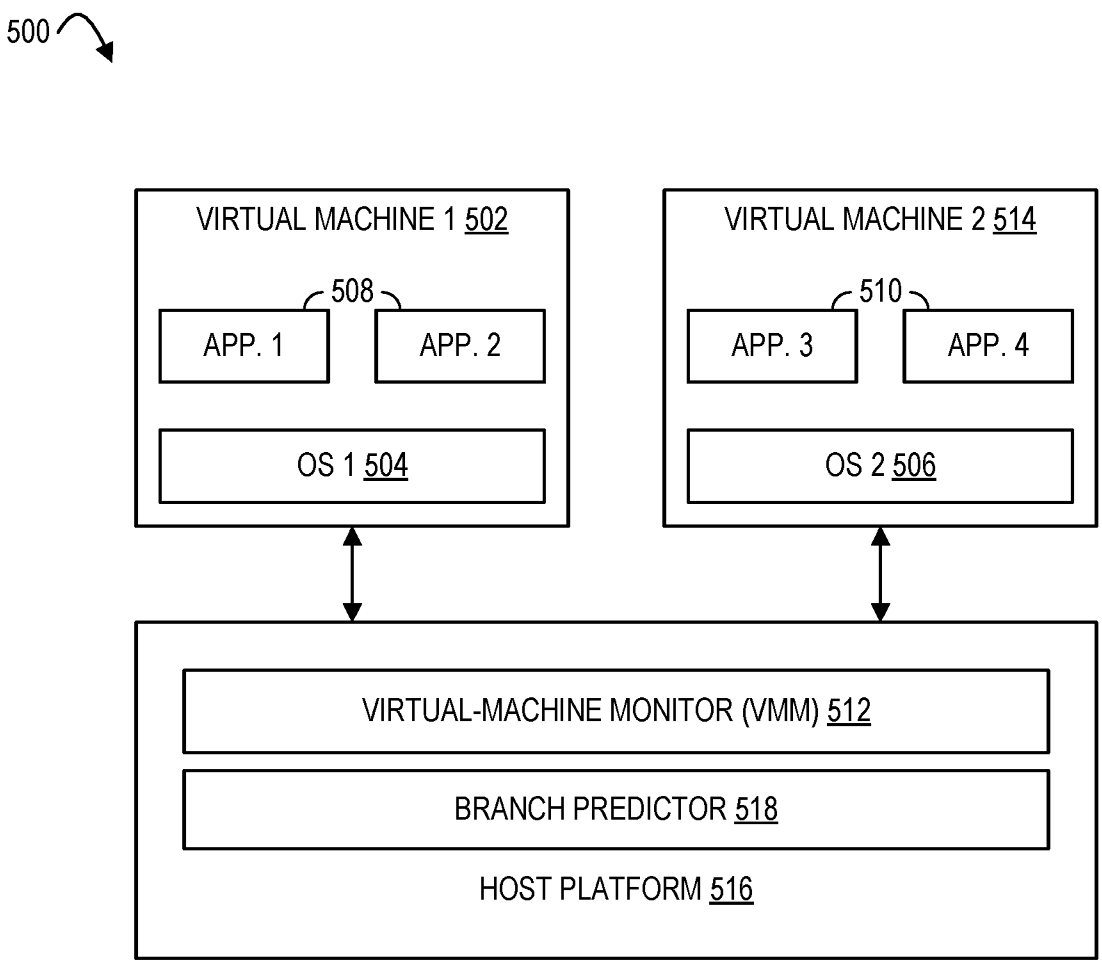
FIG. 5 illustrates a virtual machine environment according to embodiments of the disclosure.

FIG. 5 illustrates a virtual machine environment 500 according to embodiments of the disclosure. In one embodiment the host platform 516 is a processor (e.g., any processor or core discussed herein). The host platform 516 includes a branch predictor 518, e.g., any branch predictor discussed herein. The host platform 516 is capable of executing a virtual machine monitor (VMM) 512. The VMM 512 may be implemented in software, but export a bare machine interface to higher level software. The interface is exported as one or more virtual machines (e.g., VM 502 and VM 514) and may mirror the actual host hardware platform, so that it is virtualized. Alternatively, the interface exported by the VMM 512 may differ in some or all respects so that a different platform is emulated. The higher-level software may comprise a standard or real-time OS (e.g., OS 504 or OS 506). Alternatively, the VMM 512 may be run within, or on top of, another VMM.

As described above, the VMM 512 presents to other software (e.g., "guest" software) the abstraction of one or more virtual machines (VMs). FIG. 5 shows VM 502 and VM 514. VM 502 and VM 514 may run their own guest operating systems (OSes), in this example, guest OSes 504 and 506. The guest OS is provided with the illusion of executing on the host platform, rather than in a virtual platform. In one embodiment, the virtual abstraction presented to the guest OS matches the characteristics of the host platform 516. Alternatively, the virtual abstraction presented to the guest OS differs from the characteristics of the host platform 516. In certain embodiments, the VMM 512 provides protection between VMs 502 and 514 and observes and restricts the activities of the VMs 502 and 514. VM 502 and VM 514 may run their own (e.g., user) applications (Apps.), in this example, application 1 and application 2 at 508 on VM 502 and application 3 and application 4 at 510 on VM 514. A predictor mode for use in a virtual machine environment is discussed further below in section II.

II. Indirect Branch Control Mitigation

A branch may be an indirect type of branch that specifies where (e.g., register (R1) in a set of registers) the address to branch to is located. Certain processors (e.g., a logical or physical core thereof) use indirect branch predictors to determine the operations (e.g., target instruction) that are speculatively executed after an (e.g., near) indirect branch instruction. In one embodiment, the predictions are stored in a data structure that includes predictions for other types of branches (e.g. direct unconditional or direct conditional branches). In one embodiment, a branch predictor includes a first data structure to store predictions for all taken jumps (e.g., including indirect branches), as well as a separate, second data structure to store predictions for only indirect branches.

Branch target injection is a side channel method where an attacker takes advantage of the indirect branch predictors. For example, by controlling the operation of the indirect branch predictors (e.g., "training" them to predict a certain target instruction), an attacker can cause certain instructions to be speculatively executed and then use the effects for side channel analysis.

Embodiments herein mitigate or cease side channel methods where an attacker takes advantage of the indirect branch predictors. One example embodiment uses indirect branch control mechanisms, which are new interfaces between the processor (e.g., physical and/or logical cores thereof) and system software. These mechanisms allow system software to prevent an attacker from controlling a victim's indirect branch predictions (e.g., by invalidating the indirect branch predictors at appropriate times). Three indirect branch control mechanisms are discussed in this section: (i) indirect branch restricted speculation (IBRS), e.g., to restrict speculation of indirect branches, (ii) single thread indirect branch predictors (STIBP), e.g., to prevent indirect branch predictions from being controlled by a sibling thread, and (iii) indirect branch predictor barrier (IBPB), e.g., to prevent indirect branch predictions after the barrier from being controlled by software executed before the barrier. Appropriately written software can use these indirect branch control mechanisms to defend against branch target injection attacks. Certain embodiments herein utilize the same branch predictor to control both indirect and direct branch predictions. Table 1 below includes three different types of branch instructions that use indirect branch predictors (e.g., a target instruction of the indirect branch). In one embodiment, a processor (e.g., processor core) uses indirect branch predictors to control (e.g., only) the operation of the branch instructions enumerated in Table 1.

TABLE 1

Example Instructions that use Indirect Branch Predictors

| Branch Type | Instruction | Opcode |
|---|---|---|
| Near Call Indirect | CALL r/m16, CALL r/m32, CALL r/m64 | FF/2 |
| Near Jump Indirect | JMP r/m16, JMP r/m32, JMP r/m64 | FF /4 |
| Near Return | RET, RET Imm16 | C3, C2 Iw |

In certain embodiments, "near" refers to calling, jumping, or returning to an instruction within the current code segment (e.g., the segment currently pointed to by the code segment register, e.g., register 122 in FIG. 1), and this may sometimes be referred to as an intrasegment call, jump, or return, respectively. In one embodiment, a near CALL branch instruction, when executed by a processor (e.g., logical core), pushes the value of the instruction pointer (e.g., from an IP register which contains the offset of the instruction following the CALL instruction) onto the stack (e.g., a hardware RSB implemented as a stack) for use later as a return-instruction pointer, and the processor (e.g., logical core) then branches to the address in the current code segment specified with the target operand. In one embodiment, a near JUMP branch instruction, when executed by a processor (e.g., logical core), causes a jump in execution of code to the address (e.g., within the current code segment) that is specified with the target operand, for example, where the target operand specifies either an absolute offset (e.g., an offset from the base of the code segment) or a relative offset (e.g., a signed displacement relative to the current value of the instruction pointer in the IP register). In one embodiment, a near RETURN instruction, when executed by a processor (e.g., logical core), causes the processor (e.g., logical core) to pop the return instruction pointer (e.g., offset) from the top of the stack (e.g., RSB) (e.g., into the instruction pointer IP register) and begin program execution at the new instruction pointer. In certain embodiments, the code segment register is unchanged by execution of the near RETURN instruction. In one embodiment, an instruction pointer (e.g., the address of the next instruction to be executed) is referred to as an extended instruction pointer (EIP) or next instruction pointer (NIP). In certain embodiments, a return stack buffer (RSB) is a microarchitectural structure that holds predictions for execution of (e.g., near) return (RET) instructions. In one embodiment, each execution of a (e.g., near) CALL instruction with a non-zero displacement (e.g., a CALL instruction with a target of the next sequential instruction has zero displacement) adds an entry to the RSB that contains the address of the instruction sequentially following that CALL instruction. In one embodiment, the RSB is not used or updated by far CALL, far RET, and/or interrupt return (IRET) instructions (e.g., where "far" refers to an operation or procedure located in a different segment than the current code segment, sometimes referred to as an intersegment operation).

In certain processors supporting multithreading (e.g., Intel® Hyper-Threading Technology), a core (or physical processor) includes multiple logical cores (e.g., logical processors). In such a processor, the logical cores sharing a physical core may share indirect branch predictors (e.g., predicting a target instruction for an indirect branch instruction). As a result of this sharing, software on one of a physical core's logical cores may be able to control the predicted target of an indirect branch executed on another logical core of the same physical core. In one embodiment, this sharing occurs only between logical cores within a same physical core. In one embodiment, software executing on a logical core of a first physical core cannot control the predicted target instruction of an indirect branch by a logical core of a different, second physical core.

As discussed above, certain embodiments herein utilize different predictor modes corresponding to different degrees of privilege, e.g., for use in a virtual machine environment. In one embodiment, a root operation (e.g., Intel® virtual machine extension (VMX) root operation) (e.g., for a virtual-machine monitor or host) is more privileged (e.g., has greater access to the hardware) than (e.g., VMX) non-root operation (e.g., for a virtual machine or guest). In one embodiment, within either (e.g., VMX) root operation or (e.g., VMX) non-root operation, supervisor mode (e.g., CPL<3) is more privileged than user mode (e.g., CPL=3).

To prevent attacks based on branch target injection, in certain embodiments it is important to ensure that less privileged software cannot control use of the branch predictors by more privileged software. For this reason, it is useful to introduce the concept of predictor mode. The following are four predictor modes: host-supervisor, host-user, guest-supervisor, and guest-user. In this embodiment, the guest predictor modes are considered less privileged than the host predictor modes. Similarly, the user predictor modes are considered less privileged than the supervisor predictor modes. In one embodiment, host-user and guest-supervisor modes are mutually less privileged than each other. In one embodiment, there are operations that may be used to transition between unrelated software components, but which do not change CPL or cause a (e.g., VMX) transition, and these operations do not change the predictor mode. Examples include move (MOV) to a control register (CR) (e.g., CR3), VMPTRLD, extended-page-table pointer (EPTP) switching (e.g., using virtual machine (VM) function 0), and GETSEC[SENTER]. In one embodiment, VMPTRLD, when executed, loads the virtual machine control structure (VMCS) pointer for the virtual-machine to be launched, e.g., where the VMCS is a region in memory which holds all the data for the virtual-machine to be launched. In one embodiment, GETSEC[SENTER], when executed, broadcasts messages to the logical core (e.g., chipset) and other physical or logical cores (e.g., logical processors) in that platform, and in response, other logical cores perform basic cleanup, signal readiness to proceed, and wait for messages to join the created environment.

Hardware and methods herein provide three indirect branch control mechanisms: (A) indirect branch restricted speculation (IBRS), e.g., to restrict speculation of indirect branches, (B) single thread indirect branch predictors (STIBP), e.g., to prevent indirect branch predictions from being controlled by a sibling thread, and (C) indirect branch predictor barrier (IBPB), e.g., to prevent indirect branch predictions after the barrier from being controlled by software executed before the barrier. An enhanced IBRS mechanism is also discussed.

II(A). Indirect Branch Restricted Speculation (IBRS)

Indirect branch restricted speculation (IBRS) is an indirect branch control mechanism that restricts speculation of indirect branches on certain processors. In certain embodiments, a processor supports IBRS if it enumerates CPUID.(EAX=7H,ECX=0):EDX[26] as 1. In one embodiment, execution of the CPUID instruction causes a processor to reveal to software the processor type and/or presence of features by returning a resultant value (e.g., in register EAX) that indicates the processor type and/or presence of features. This is discussed further is section V below.

In certain embodiments, a processor that supports IBRS provides the following guarantees without any enabling by software: (i) the predicted targets of near indirect branches executed in an enclave (e.g., a protected container defined by Intel® SGX) cannot be controlled by software executing outside the enclave, and (ii) if the default treatment of system management interrupts (SMIs) and system-management mode (SMM) is active, software executed before a system management interrupt (SMI) cannot control the predicted targets of indirect branches executed in system-management mode (SMM) after the SMI.

In certain embodiments, enabling BRS on a processor (e.g., a logical core thereof) provides a method for critical software to protect their indirect branch predictions. As one example, if software sets an IBRS bit (or bits) in a register (e.g., an IBRS bit for that particular logical core) (e.g., sets IA32_SPEC_CTRL.IBRS in FIG. 9) to a set value (e.g., a one) (e.g., not cleared to a zero value), the predicted targets (e.g., target instructions) of indirect branches executed in that predictor mode with the IBRS bit set (e.g., IA32_SPEC_CTRL.IBRS=1) cannot be controlled by software that was executed in a less privileged predictor mode. In one embodiment, there is an instance of a model specific register (MSR) for each logical core.

In one embodiment, a transition to a more privileged predictor mode through an INIT # (e.g., to automatically initialize the software library code that is most appropriate for the current processor type) is an exception to this and may not be sufficient to prevent the predicted targets of indirect branches executed in the new predictor mode from being controlled by software operating in a less privileged predictor mode.

In one embodiment, when IBRS bit is set to a set value (e.g., IA32_SPEC_CTRL.IBRS is set to 1), the predicted targets of indirect branches cannot be controlled by another logical core (e.g., logical processor). In certain embodiments, if the IBRS bit is already set to the set value (e.g., IA32_SPEC_CTRL.IBRS is already 1) before a transition to a more privileged predictor mode, a processor allows the predicted targets of indirect branches executed in that predictor mode to be controlled by software that executed before the transition. In one embodiment, software can avoid this by using a write instruction (e.g., write to MSR (WRMSR)) on the register (e.g., IA32_SPEC_CTRL MSR in FIG. 9) to set the IBRS bit to the set value (e.g., one) after any such transition, e.g., regardless of the bit's previous value. In certain embodiments, it is not necessary to clear the bit first, e.g., writing it with a value of 1 after the transition suffices regardless of the bit's original value. In one embodiment, setting of the IBRS bit (e.g., IA32_SPEC_CTRL.IBRS) to the set value (e.g., and not set to the clear value) does not suffice to prevent the predicted target of a near return from using an RSB entry created in a less privileged predictor mode. As one example, software can avoid this by using an RSB overwrite sequence (e.g., a sequence of instructions that includes a plurality (e.g., 32) more of near CALL instructions with non-zero displacements than it has near RETs) following a transition to a more privileged predictor mode. In one embodiment, it is not necessary to use such a sequence following a transition from user mode to supervisor mode if supervisor-mode execution prevention (SMEP) is enabled. In certain embodiments, SMEP prevents execution of code on user mode pages, even speculatively, when in supervisor mode. In one embodiment, user mode code can only insert its own return addresses into the RSB, and not return address targets that can map to supervisor mode code pages. In one embodiment, a target can go to either its own return address or supervisor mode code pages, for example, because the target is not the full target (e.g. just bottom 24 bits) and thus the target can jump to many different pages. In certain of those embodiments, a branch predictor prevents that in order for software to rely on generated-in-user-mode RSB entries as not being able to cause speculation to supervisor mode code pages. In one embodiment of processors and/or software without SMEP where separate page tables are used for the OS and applications, the OS page tables can map user code as no-execute to cause a processor to not speculatively execute instructions from a translation marked no-execute.

In certain embodiments, enabling IBRS does not prevent (e.g., is not guaranteed to prevent) software from controlling the predicted targets of indirect branches of unrelated software executed later at the same predictor mode (for example, between two different user applications or two different virtual machines). In one embodiment, such isolation is ensured through use of the Indirect Branch Predictor Barrier (IBPB) command described below in section II(C). In one embodiment, enabling IBRS on one logical core (e.g., logical processor) of a physical core with multiple logical cores (e.g., that use Intel® Hyper-Threading Technology) may affect branch prediction on other logical cores (e.g., logical processors) of the same core. In these embodiment, software may disable IBRS (e.g., by clearing IA32_SPEC_CTRL.IBRS) prior to entering a sleep state (e.g., by executing a halt (HLT) instruction or a monitor/wait (MWAIT) instruction) and re-enable IBRS upon wakeup and prior to executing any indirect branch to improve performance.

Enhanced IBRS

Some processors may enhance IBRS in order to simplify software enabling and improve performance. In certain embodiments, a processor supports enhanced IBRS if read MSR (RDMSR) returns a value of 1 for bit 1 of the IA32_ARCH_CAPABILITIES MSR. In one embodiment, enhanced IBRS supports an "always on" model in which IBRS is enabled once (e.g., by setting IA32_SPEC_CTRL.IBRS) and never disabled (e.g., unless the processor is reset or rebooted). In one embodiment, when IBRS is set (e.g., IA32_SPEC_CTRL.IBRS=1) on a processor with enhanced IBRS, the predicted targets of indirect branches executed cannot be controlled by software that was executed in a less privileged predictor mode or on another logical core (e.g., logical processor). As a result, in certain embodiments, software operating on a processor with enhanced IBRS need not use WRMSR to set IA32_SPEC_CTRL.IBRS after every transition to a more privileged predictor mode. In these embodiments, software isolates predictor modes effectively simply by setting the bit once. In one embodiment, software setting this bit once and leaving it set provides higher performance than software which sets the bit only in more privileged predictor modes (e.g., than software that repeatedly sets and clears this bit on transitions). In one embodiment, software need not disable enhanced IBRS prior to entering a sleep state such as MWAIT or HLT. On certain processors with enhanced IBRS, an RSB overwrite sequence may not suffice to prevent the predicted target of a near return from using an RSB entry created in a less privileged predictor mode. In one embodiment, software can prevent this by enabling SMEP (e.g., for transitions from user mode to supervisor mode) and by having the IBRS bit (e.g., IA32_SPEC_CTRL.IBRS) set during virtual machine (VM) exits.

In one embodiment, processors with enhanced IBRS still support the usage model where IBRS is set only in the OS/VMM for OSes that enable SMEP. To do this, certain embodiments of processors will ensure that guest behavior cannot control the RSB after a VM exit once IBRS is set, e.g., even if IBRS was not set at the time of the VM exit. In one embodiment, if the guest has cleared IBRS, the VMM (e.g., hypervisor) should set IBRS after the VM exit, e.g., just as it would do on processors supporting IBRS but not enhanced BRS. As with IBRS, enhanced IBRS does not prevent (e.g., is not guaranteed to prevent) software from affecting the predicted target of an indirect branch executed at the same predictor mode in certain embodiments. For such cases, software may use the Indirect Branch Predictor Barrier (IBPB) command described below in section II(C).

II(B). Single Thread Indirect Branch Predictors (STIBP)

Single thread indirect branch predictors (STIBP) is an indirect branch control mechanism that restricts the sharing of branch prediction between logical cores (e.g., logical processors) on a physical core on certain processors. In certain embodiments, a processor supports STIBP if it enumerates CPUID.(EAX=7H,ECX=0):EDX[27] as 1. In one embodiment, execution of the CPUID instruction causes a processor to reveal to software the processor type and/or presence of features by returning a resultant value (e.g., in register EAX) that indicates the processor type and/or presence of features. This is discussed further is section V below.

In certain embodiments of multithreading processors (e.g., logical cores thereof), the logical cores (e.g., logical processors) sharing a physical core may share indirect branch predictors, allowing one logical core (e.g., logical processor) to control the predicted targets of indirect branches by another logical core (e.g., logical processor) of the same physical core.

In certain embodiments, enabling STIBP on a processor (e.g., a logical core thereof) (e.g., by setting the STIBP bit of the IA32_SPEC_CTRL MSR in FIG. 9) on a logical core prevents the predicted targets of indirect branches on any logical core of that physical core from being controlled by software that executes (or executed previously) on another logical core (e.g., logical processor) of the same physical core. In certain embodiments, indirect branch predictors are never shared across cores, e.g., such that the predicted target of an indirect branch executed on one physical core cannot be affected by software operating on a different physical core. In such an embodiment, it is not necessary to set the STIBP bit (e.g., IA32_SPEC_CTRL.STIBP) for a physical core to isolate indirect branch predictions from software operating on other physical cores.

Certain processors do not allow the predicted targets of indirect branches to be controlled by software operating on another logical core, e.g., regardless of STIBP. Non-limiting examples of these are processors on which multithreading (e.g., Intel® Hyper-Threading Technology) is not enabled and those that do not share indirect branch predictors between logical cores (e.g., logical processors). To simplify software enabling and enhance workload migration, in certain embodiments, STIBP may be enumerated (e.g., and setting IA32_SPEC_CTRL.STIBP allowed)) on such processors. In one embodiment, a processor (e.g., processor core) enumerates support for the IA32_SPEC_CTRL MSR (e.g., by enumerating CPUID.(EAX=7H,ECX=0):EDX[26] as 1) but not for STIBP (e.g., CPUID.(EAX=7H,ECX=0):EDX[27] is enumerated as 0). In certain embodiments of such processors, execution of WRMSR to IA32_SPEC_CTRL ignores the value of the STIBP bit (e.g., field) and does not cause a general-protection exception (#GP) if that bit position (e.g., bit position 1) of the source operand is set. This may be used to simplify virtualization in some cases. As noted in section II(A), enabling IBRS prevents software operating on one logical core from controlling the predicted targets of indirect branches executed on another logical core (e.g., of the same physical core as the one logical core). Thus, in some embodiments, it is not necessary to enable STIBP when IBRS is enabled. In another embodiment, enabling STIBP on one logical core (e.g., logical processor) of a physical core with multithreading (e.g., Intel® Hyper-Threading Technology) may affect branch prediction on other logical cores (e.g., logical processors) of the same physical core. In these embodiments, software may disable STIBP (e.g., by clearing IA32_SPEC_CTRL.STIBP) prior to entering a sleep state (e.g., e.g., by executing a halt (HLT) instruction or a monitor/wait (MWAIT) instruction) and re-enable STIBP upon wakeup and prior to executing any indirect branch.

II(C). Indirect Branch Predictor Barrier (IBPB)

The indirect branch predictor barrier (IBPB) is an indirect branch control mechanism that establishes a barrier to prevent software that executed before the barrier from controlling the predicted targets of indirect branches executed after the barrier on the same logical cores (e.g., logical processors) on certain processors. In certain embodiments, a processor supports IBPB if it enumerates CPUID.(EAX=7H,ECX=0):EDX[26] as 1. In one embodiment, execution of the CPUID instruction causes a processor to reveal to software the processor type and/or presence of features by returning a resultant value (e.g., in register EAX) that indicates the processor type and/or presence of features. This is discussed further is section V below.

In one embodiment, unlike IBRS and STIBP, IBPB does not define a new mode of processor operation that controls the branch predictors, and, as a result, it is not enabled by setting a bit in the IA32_SPEC_CTRL MSR, but instead, IBPB is a command that software executes when necessary in these embodiments. In one embodiment, software executes an IBPB command by writing a set value for an indirect branch predictor barrier bit in a command register (e.g., setting bit 0 (IBPB) in IA32_PRED_CMD MSR in FIG. 10). This may be done by either using the WRMSR instruction or as part of a VMX transition that loads the command register (e.g., MSR) from a command register load area (e.g., an MSR-load area). In certain embodiments, software that executed before the IBPB command cannot control the predicted targets of indirect branches executed after the command on the same logical core (e.g., logical processor). In one embodiment, the command register (e.g., IA32_PRED_CMD MSR) is write-only, for example, and it is not necessary to clear the set IBPB bit before writing it with a set value (e.g., one). In certain embodiments, IBPB is used in conjunction with IBRS to account for cases that IBRS does not cover, for example, where IBRS does not prevent software from controlling the predicted target of an indirect branch of unrelated software (e.g., a different user application or a different virtual machine) executed at the same predictor mode, software can prevent such control by executing an IBPB command when changing the identity of software operating at a particular predictor mode (e.g., when changing user applications or virtual machines). In certain embodiments, software clears the IBRS bit (e.g., in IA32_SPEC_CTRL.IBRS) in certain situations (e.g., for execution with CPL=3 in VMX root operation). In these cases, software use an IBPB command on certain transitions (e.g., after running an untrusted virtual machine) to prevent software that executed earlier from controlling the predicted targets of indirect branches executed subsequently with IBRS disabled on certain processors. In certain embodiments, software does not set IBRS, for example, IBPB is used after transitions to a more privileged mode instead of IBRS.

To provide the functionality discussed above, certain embodiments herein control the branch target buffer (BTBs) and/or return stack buffer (RSB). Next, example formats of BTBs and an RSB are discussed, followed by example implementations of the above mitigations.

Example Formats of Branch Target Buffers (BTBs)

FIGS. 6A-6H illustrate formats of branch target buffers (BTBs) according to embodiments of the disclosure. In certain embodiments, a branch predictor includes a BTB to store information about branch instructions that the processor has previously executed. In certain embodiments, this information includes a target instruction that is predicted to be executed after the branch instruction. In certain embodiments, the target instruction is identified by an entry in the BTB containing a location (e.g., address or register name) corresponding to the target instruction. In certain embodiments, the target field in an entry in the BTB stores the instruction pointer (e.g., bits 23:0 of the instruction pointer or the entire instruction pointer) for the target. In certain embodiments, the target field in the BTB stores a location (e.g., address or register name) where a pointer (e.g., IP) to the target instruction is stored. In one embodiment, the target field in the BTB stores a value indicating a particular (e.g., branch) register that stores a pointer (e.g., IP) to the target instruction.

In certain embodiments, the target instruction for a branch instruction is determined from the branch history, e.g., from a certain number (e.g., four) of the last outcomes of the branch instruction. Other branch prediction mechanisms may be utilized in other embodiments. Thus, in certain embodiments, a populated BTB is used by the branch predictor to predict the outcome (e.g., a target instruction) of a branch instruction, e.g., based on the instruction pointer of the branch instruction. The number of entries (e.g., rows in the embodiments of FIGS. 6A-6H) may be any number. In certain embodiments, each physical core includes its own BTB (e.g., such that the BTB entries for a physical core are not shared with other physical cores). Although particular fields are discussed in reference to the BTBs below, in other embodiments any combination of fields may be utilized, e.g., a valid field 609 may be used with any of thread identification (ID) field 616, Application versus OS field 618, or VM versus VMM field 620. In certain embodiments, separate BTBs are used for each logical core of a plurality of logical cores. In certain embodiments, a single BTB is shared by all of the logical core of a plurality of logical cores, e.g., where the BTB includes a logical core (processor) ID bit (e.g. thread ID bit) or does not include such an ID bit (e.g. XORing the thread ID with one or more of the branch IP bits or the global history). This may differ for different predictors that a processor has which can affect indirect branches (e.g. there may be a different behavior for a BTB that handles all branches and a separate indirect branch predictor that only affects indirect branches).

In FIG. 6A, branch target buffer (BTB) 601 includes a branch (e.g., branch instruction pointer (IP)) field 610 and a target (e.g., target instruction) field 612. In one embodiment, the branch IP field stores (e.g., a copy of) the instruction pointer to a particular branch instruction in code. In certain embodiments, the entire branch IP is stored in field 610. In certain embodiments, a proper subset of the branch IP is stored in field 610 but not the full branch IP. In certain embodiment, the value stored in field 610 is an entry identifier (e.g., index and/or tag identifying that entry) for a branch IP. In certain embodiments, an entry in the branch field 610 is a value derived from the branch IP itself, for example, a folded down version (e.g. the resultant of the bottom 32 bits of the IP XORed with top 32-bits of the IP). In certain embodiments, an entry in a branch field 610 is a value derived from a global history (e.g., the result of the most recent (e.g., 10) branch predictions). In certain embodiments, the target field 612 stores the (e.g., entire) instruction pointer for the target of the corresponding branch instruction (e.g., IP). In one embodiment, the target field stores a location (e.g., an identifier of a particular register or memory address) storing the instruction pointer to the predicted target for the particular branch instruction in code.

In FIG. 6B, branch target buffer (BTB) 602 includes a branch (e.g., branch instruction pointer (IP)) field 610, a target (e.g., target instruction) field 612, and a branch type field 614. In one embodiment, the branch IP field stores (e.g., a copy of) the instruction pointer to a particular branch instruction in code. In certain embodiments, the entire branch IP is stored in field 610. In certain embodiments, a proper subset of the branch IP is stored in field 610 but not the full branch IP. In certain embodiment, the value stored in field 610 is an entry identifier (e.g., index and/or tag identifying that entry) for a branch IP. In certain embodiments, an entry in the branch field 610 is a value derived from the branch IP itself, for example, a folded down version (e.g. the resultant of the bottom 32 bits of the IP XORed with top 32-bits of the IP). In certain embodiments, the target field 612 stores the instruction pointer for the target of the corresponding branch instruction (e.g., IP). In one embodiment, the target field stores a location (e.g., an identifier of a particular register or memory address) storing the instruction pointer to the predicted target for the particular branch instruction in code. In one embodiment, the branch type field stores a value that indicates the type of branch for that particular branch IP. For example, a first value (e.g., 1) in branch type field to indicate a direct branch and a second, different value (e.g., 0) in branch type field to indicate an indirect branch.

In FIG. 6C, branch target buffer (BTB) 603 includes a branch (e.g., branch instruction pointer (IP)) field 610, a target (e.g., target instruction) field 612, a branch type field 614, and a valid field 609. In one embodiment, the branch IP field stores (e.g., a copy of) the instruction pointer to a particular branch instruction in code. In certain embodiments, the entire branch IP is stored in field 610. In certain embodiments, a proper subset of the branch IP is stored in field 610 but not the full branch IP. In certain embodiment, the value stored in field 610 is an entry identifier (e.g., index and/or tag identifying that entry) for a branch IP. In certain embodiments, an entry in the branch field 610 is a value derived from the branch IP itself, for example, a folded down version (e.g. the resultant of the bottom 32 bits of the IP XORed with top 32-bits of the IP). In certain embodiments, the target field 612 stores the instruction pointer for the target of the corresponding branch instruction (e.g., IP). In one embodiment, the target field stores a location (e.g., an identifier of a particular register or memory address) storing the instruction pointer to the predicted target for the particular branch instruction in code. In one embodiment, the branch type field stores a value that indicates the type of branch for that particular branch IP. For example, a first value (e.g., 1) in branch type field to indicate a direct branch and a second, different value (e.g., 0) in branch type field to indicate an indirect branch. As another example, a first value (e.g., 1) in branch type field to indicate direct conditional branches and a second, different value (e.g., 0) in branch type field to return (RET) instructions.

In one embodiment, the valid field stores a value that indicates whether the entry (e.g., row in the depicted embodiment) is valid (e.g., is to be used by the branch predictor in its prediction) or not. For example, a first value (e.g., 1) in valid field to indicate a valid BTB entry and a second, different value (e.g., 0) in valid field to indicate an invalid BTB entry.

In FIG. 6D, branch target buffer (BTB) 604 includes a branch (e.g., branch instruction pointer (IP)) field 610, a target (e.g., target instruction) field 612, thread identification (ID) field 616, Application (App.) versus OS field 618, and VM versus VMM field 620. In one embodiment, the branch IP field stores (e.g., a copy of) the instruction pointer to a particular branch instruction in code. In certain embodiments, the entire branch IP is stored in field 610. In certain embodiments, a proper subset of the branch IP is stored in field 610 but not the full branch IP. In certain embodiment, the value stored in field 610 is an entry identifier (e.g., index and/or tag identifying that entry) for a branch IP. In certain embodiments, an entry in the branch field 610 is a value derived from the branch IP itself, for example, a folded down version (e.g. the resultant of the bottom 32 bits of the IP XORed with top 32-bits of the IP). In certain embodiments, the target field 612 stores the instruction pointer for the target of the corresponding branch instruction (e.g., IP). In one embodiment, the target field stores a location (e.g., an identifier of a particular register or memory address) storing the instruction pointer to the predicted target for the particular branch instruction in code. In one embodiment, the thread identification (ID) field includes a value that indicates which logical core (e.g., logical processor) that a thread (e.g., one or more instructions of a thread) is to execute on, for example which logical core of a plurality of logical cores of a single physical core. For example, a first value (e.g., 1) in a thread ID field to indicate an entry in a BTB is (e.g., only) for a first thread (e.g., the entry is only used in branch prediction for the first thread) and a second, different value (e.g., 0) in the thread ID field to indicate the entry in the BTB is (e.g., only) for a different, second thread (e.g., the entry is only used in branch prediction for the second thread). In one embodiment, the Application versus OS field 618 includes a value that indicates if an entry is for an application or an operating system. For example, a first value (e.g., 1) in an Application versus OS field to indicate an entry in a BTB is (e.g., only) for an application (for example, the entry is only used in branch prediction for the application, e.g., and not the OS) and a second, different value (e.g., 0) in the Application versus OS field to indicate the entry in the BTB is (e.g., only) for an OS (for example, the entry is only used in branch prediction for the OS, e.g., and not the application(s)). In one embodiment, instead of including field 618 in BTB 604, a value that indicates if an entry is for an application or an operating system is part of the index and/or tag (e.g., in field 610).

The branch predictor in one embodiment is not to use a target instruction for a branch IP for an instruction in application code, but is to use the target instruction (e.g., for prefetch) for a branch IP for an instruction in operating system code. The branch predictor in an embodiment is not to use a target instruction for a branch IP for an instruction in operating system code, but is to use the target instruction (e.g., for prefetch) for a branch IP for an instruction in application code. In one embodiment, the VM versus VMM field 620 includes a value that indicates if an entry is for a virtual machine (VM) (e.g., guest) or a virtual machine monitor (VMM) (e.g., host). For example, a first value (e.g., 1) in a VM versus VMM field to indicate an entry in a BTB is (e.g., only) for a virtual machine (for example, the entry is only used in branch prediction for the virtual machine, e.g., and not the virtual machine monitor) and a second, different value (e.g., 0) in the VM versus VMM field to indicate the entry in the BTB is (e.g., only) for a virtual machine monitor (e.g., manager) (for example, the entry is only used in branch prediction for the VMM, e.g., and not the VM(s)). The branch predictor in one embodiment is not to use a target instruction for a branch IP for an instruction in VMM code, but is to use the target instruction (e.g., for prefetch) for a branch IP for an instruction in VM code. The branch predictor in an embodiment is not to use a target instruction for a branch IP for an instruction in VM code, but is to use the target instruction (e.g., for prefetch) for a branch IP for an instruction in VMM code. In one embodiment, instead of including field 620 in BTB 604, a value that indicates if an entry is entry is for a virtual machine (VM) (e.g., guest) or a virtual machine monitor (VMM) (e.g., host) is part of the index and/or tag (e.g., a dedicated bit in field 610).

In FIG. 6E, branch target buffer (BTB) 605 includes a branch (e.g., branch instruction pointer (IP)) field 610, a target (e.g., target instruction) field 612, thread identification (ID) field 616, and Application (App.) versus OS field 618. In one embodiment, the branch IP field stores (e.g., a copy of) the instruction pointer to a particular branch instruction in code. In certain embodiments, the entire branch IP is stored in field 610. In certain embodiments, a proper subset of the branch IP is stored in field 610 but not the full branch IP. In certain embodiment, the value stored in field 610 is an entry identifier (e.g., index and/or tag identifying that entry) for a branch IP. In certain embodiments, an entry in the branch field 610 is a value derived from the branch IP itself, for example, a folded down version (e.g. the resultant of the bottom 32 bits of the IP XORed with top 32-bits of the IP). In certain embodiments, the target field 612 stores the instruction pointer for the target of the corresponding branch instruction (e.g., IP). In one embodiment, the target field stores a location (e.g., an identifier of a particular register or memory address) storing the instruction pointer to the predicted target for the particular branch instruction in code. In one embodiment, the thread identification (ID) field includes a value that indicates which logical core (e.g., logical processor) that a thread (e.g., one or more instructions of a thread) is to execute on, for example which logical core of a plurality of logical cores of a single physical core. For example, a first value (e.g., 1) in a thread ID field to indicate an entry in a BTB is (e.g., only) for a first thread (e.g., the entry is only used in branch prediction for the first thread) and a second, different value (e.g., 0) in the thread ID field to indicate the entry in the BTB is (e.g., only) for a different, second thread (e.g., the entry is only used in branch prediction for the second thread). In one embodiment, the Application versus OS field includes a value that indicates if an entry is for an application or an operating system. For example, a first value (e.g., 1) in an Application versus OS field to indicate an entry in a BTB is (e.g., only) for an application (for example, the entry is only used in branch prediction for the application, e.g., and not the OS) and a second, different value (e.g., 0) in the Application versus OS field to indicate the entry in the BTB is (e.g., only) for an OS (for example, the entry is only used in branch prediction for the OS, e.g., and not the application(s)). The branch predictor in one embodiment is not to use a target instruction for a branch IP for an instruction in application code, but is to use the target instruction (e.g., for prefetch) for a branch IP for an instruction in operating system code. The branch predictor in an embodiment is not to use a target instruction for a branch IP for an instruction in operating system code, but is to use the target instruction (e.g., for prefetch) for a branch IP for an instruction in application code.

In FIG. 6F, branch target buffer (BTB) 606 includes a branch (e.g., branch instruction pointer (IP)) field 610, a target (e.g., target instruction) field 612, thread identification (ID) field 616, and VM versus VMM field 620. In one embodiment, the branch IP field stores (e.g., a copy of) the instruction pointer to a particular branch instruction in code. In one embodiment, the target field stores a location (e.g., an identifier of a particular register or memory address) storing the instruction pointer to the predicted target for the particular branch instruction in code. In certain embodiments, the entire branch IP is stored in field 610. In certain embodiments, a proper subset of the branch IP is stored in field 610 but not the full branch IP. In certain embodiment, the value stored in field 610 is an entry identifier (e.g., index and/or tag identifying that entry) for a branch IP. In certain embodiments, an entry in the branch field 610 is a value derived from the branch IP itself, for example, a folded down version (e.g. the resultant of the bottom 32 bits of the IP XORed with top 32-bits of the IP). In certain embodiments, the target field 612 stores the instruction pointer for the target of the corresponding branch instruction (e.g., IP). In one embodiment, the thread identification (ID) field includes a value that indicates which logical core (e.g., logical processor) that a thread (e.g., one or more instructions of a thread) is to execute on, for example which logical core of a plurality of logical cores of a single physical core. For example, a first value (e.g., 1) in a thread ID field to indicate an entry in a BTB is (e.g., only) for a first thread (e.g., the entry is only used in branch prediction for the first thread) and a second, different value (e.g., 0) in the thread ID field to indicate the entry in the BTB is (e.g., only) for a different, second thread (e.g., the entry is only used in branch prediction for the second thread). In one embodiment, the VM versus VMM field includes a value that indicates if an entry is for a virtual machine (VM) (e.g., guest) or a virtual machine monitor (VMM) (e.g., host). For example, a first value (e.g., 1) in a VM versus VMM field to indicate an entry in a BTB is (e.g., only) for a virtual machine (for example, the entry is only used in branch prediction for the virtual machine, e.g., and not the virtual machine monitor) and a second, different value (e.g., 0) in the VM versus VMM field to indicate the entry in the BTB is (e.g., only) for a virtual machine monitor (e.g., manager) (for example, the entry is only used in branch prediction for the VMM, e.g., and not the VM(s)). The branch predictor in one embodiment is not to use a target instruction for a branch IP for an instruction in VMM code, but is to use the target instruction (e.g., for prefetch) for a branch IP for an instruction in VM code. The branch predictor in an embodiment is not to use a target instruction for a branch IP for an instruction in VM code, but is to use the target instruction (e.g., for prefetch) for a branch IP for an instruction in VMM code.

In FIG. 6G, branch target buffer (BTB) 607 includes an indirect (e.g., branch (e.g., indirect branch instruction pointer (IP)) field 622 (e.g., and not any entries for direct branch instructions) and a target (e.g., target instruction) field 612. In one embodiment, the indirect branch IP field stores (e.g., a copy of) the instruction pointer to a particular indirect branch instruction in code. In certain embodiments, the entire indirect branch IP is stored in field 622. In certain embodiments, a proper subset of the indirect branch IP is stored in field 622 but not the full indirect branch IP. In certain embodiment, the value stored in field 622 is an entry identifier (e.g., index and/or tag identifying that entry) for an indirect branch IP. In certain embodiments, an entry in the indirect branch field 622 is a value derived from the indirect branch IP itself, for example, a folded down version (e.g. the resultant of the bottom 32 bits of the IP XORed with top 32-bits of the IP). In certain embodiments, the target field 612 stores the instruction pointer for the target of the corresponding indirect branch instruction (e.g., IP). In one embodiment, the target field stores a location (e.g., an identifier of a particular register or memory address) storing the instruction pointer to the predicted target for the particular indirect branch instruction in code.

In FIG. 6H, branch target buffer (BTB) 608 includes a direct branch (e.g., direct branch instruction pointer (IP)) field 624 (e.g., and not any entries for indirect branch instructions) and a target (e.g., target instruction) field 612. In one embodiment, the direct branch IP field stores (e.g., a copy of) the instruction pointer to a particular direct branch instruction in code. In certain embodiments, the entire direct branch IP is stored in field 624. In certain embodiments, a proper subset of the direct branch IP is stored in field 624 but not the full direct branch IP. In certain embodiment, the value stored in field 624 is an entry identifier (e.g., index and/or tag identifying that entry) for a direct branch IP. In certain embodiments, an entry in the direct branch field 624 is a value derived from the direct branch IP itself, for example, a folded down version (e.g. the resultant of the bottom 32 bits of the IP XORed with top 32-bits of the IP). In certain embodiments, the target field 612 stores the instruction pointer for the target of the corresponding direct branch instruction (e.g., IP). In one embodiment, the target field stores an instruction pointer to the predicted target for the particular direct branch instruction in code or a location (e.g., an identifier of a particular register or memory address) storing the instruction pointer to the predicted target for the particular direct branch instruction in code.

Example Format of a Return Stack Buffer (RSB)

FIG. 7 illustrates a format of a return stack buffer (RSB) 700 according to embodiments of the disclosure. Arrow 704 depicts a push of data (e.g., a return IP) to the top entry 702 of RSB 700 and arrow 706 depicts a pull (e.g., read and delete) of data (e.g., a return IP) from the top entry 702 of RSB 700. This may be referred to as a last-in, first-out (LIFO) buffer. In certain embodiments, a branch predictor (e.g., branch address calculator (BAC) 442 in FIG. 4) stores the return addresses of any CALL instructions (e.g., that push their return address on the stack).

Example Implementations for Indirect Branch Restricted Speculation (IBRS) and Enhanced BRS In certain embodiments, when IBRS is set (for example, after a transition from a less privileged predictor mode (e.g., application execution) to a more privileged predictor mode (e.g., OS execution)), a branch predictor is disabled. In one embodiment, disabling the branch predictor causes every query of the branch predictor (e.g., the BTB) to result in a miss (e.g., even if the queried data is in the BTB). In one embodiment, the branch predictor is disabled by executing a branch address clear (BACLEAR) instruction. In one embodiment, the decoding and execution of a branch address clear (BACLEAR) instruction causes the clearing out (e.g., in a physical core) of the microoperations and/or instructions that are already decoded and steering the instruction pointer to the code address (e.g., to the address zero or to the next sequential instruction) as specified by the instruction, for example, specified as an (e.g., immediate) operand of the_branch address clear (BACLEAR) instruction.

In one embodiment, disabling the branch predictor includes clearing (e.g., flushing) one or more (e.g., all) entries in a BTB of any of FIGS. 6A-6H, e.g., based on the predictor mode. In one embodiment, the clearing at least clears the target field 612 for an entry. In one embodiment, the clearing at least clears the valid field 609 for one or more (e.g., all) entries. In one embodiment, the IBRS bit being set causes a clearing of only indirect (and not direct) branch entries (e.g., clearing at least the target field 612 for those indirect branch entries).

In one embodiment, a processor (e.g., processor core) allows the data fetch (e.g., prefetch) operation of data for a target instruction of an indirect branch instruction, but discards (e.g., does not use) the fetched data when the IBRS bit is set (e.g., set for a logical processor that is to execute the indirect branch instruction and/or target instruction). In one embodiment, the IBRS bit being set (e.g., set for a logical processor that is to execute the indirect branch instruction and/or target instruction) causes the clearing (e.g., flushing) of the (e.g., indirect) BTB entries, for example, by the branch predictor. In one embodiment, the IBRS bit being set (e.g., set for a logical processor that is to execute the indirect branch instruction and/or target instruction) causes the clearing (e.g., flushing) of the (e.g., indirect) BTB entries even if the IBRS bit is already set (e.g., to one). In one embodiment, the IBRS bit being set (e.g., set for a logical processor that is to execute the indirect branch instruction and/or target instruction) causes the clearing (e.g., flushing) of the (e.g., indirect) BTB entries when the IBRS bit transitions from an un-set value (e.g., 0) to a set value (e.g., 1) and/or on a transition if the IBRS bit is set (e.g., to a 1). In certain embodiments, a transition includes changing modes from a less privileged predictor mode (e.g., application execution) to a more privileged predictor mode (e.g., OS execution). In certain (e.g., same) embodiments, a transition includes changing modes to a less privileged predictor mode (e.g., application execution) from a more privileged predictor mode (e.g., OS execution). In one embodiment, setting of the IBRS bit also causes an STIBP implementation (e.g., the functions thereof) to be performed. In one embodiment, a processor (e.g., processor core) isolates branch predictions executed in a more privileged predictor mode from code executed in a less privileged predictor mode through the clearing of BTB entries when the IBRS bit is set to 1 and/or the clearing of BTB entries when the IBRS bit is set at 1 at the time of the transition. If IBRS is defined in an embodiment to require setting after each transition, then clearing BTB entries may only be needed when the IBRS bit is set and not required during transitions.

In certain embodiments, on a processor with enhanced IBRS, the setting of the enhanced IBRS bit occurs once during an operating instance of a processor (e.g., until shut down or power off) and it stays set during that operating instance. In one embodiment, IBRS bit being set causes entries (for example, to store different target values (e.g., addresses) for a same branch IP) for an application(s) and an OS(s) to be kept in separate entries in a BTB, e.g., as part of branch field 610 (e.g., tag stored therein), or as in FIG. 6D or 6E using the App. vs. OS field 618. Additionally or alternatively, in one embodiment, IBRS bit being set causes entries (for example, to store different target values (e.g., addresses) for a same branch IP) for a virtual machine (VM) and a virtual machine monitor (VMM) to be kept in separate entries in a BTB, e.g., as part of branch field 610 (e.g., tag stored therein), or as in FIG. 6D or 6F using the VM. vs. VMM field 620. In certain embodiments, a logical core (e.g., logical processor) has its own BTB entries that are not shared with other logical cores (e.g., logical processors) of the same physical core. In another embodiment, there is a thread ID (logical core (e.g., processor) ID) bit in the tag (or different field) to ensure that a single entry is not shared among multiple logical cores at the same time, for example, while still allowing it to be shared across multiple logical cores at different times (e.g., dynamically allocated to a logical core). In certain embodiments, the data stored in entries of a BTB is controlled (e.g., cleared) by the mitigations discussed herein. In one embodiment, the enhanced IBRS bit is cleared when executing a guest that is using the non-enhanced IBRS usage model.

In one embodiment, a respective indirect branch restricted speculation bit being set (e.g., in a model specific register) for a first logical core of a plurality of logical cores (e.g., of a single physical core of a processor) (e.g., after a transition of the first logical core to a more privileged predictor mode (e.g., as set in a predictor mode register for the first logical core)) prevents the branch predictor from predicting the target instruction of the indirect branch instruction for the first logical core based on (e.g., the history of) software executed in a less privileged predictor mode by any (e.g., all) of the plurality of logical cores. In certain embodiments, "based on" includes influence and/or control. For example, "based on" may only include influence in one embodiment, and only control in another embodiment. Certain embodiments herein allow for preventing (e.g., breaking) control over certain predictions without preventing (e.g., breaking) all levels of influence. For example, an implementation where software executed in the less privileged predictor mode by any of the plurality of logical cores can have an impact on a branch prediction of the more privileged mode, but cannot control that branch prediction.

In one embodiment, setting the IBRS bit (e.g., for a logical core) prevents an indirect branch target from being controlled by all code, software, and/or history on or of the other logical cores, for example, even if that other code, software, and/or history is running at the same predictor mode (e.g. both are applications).

In one embodiment, this is implemented by clearing all (e.g., only indirect) branch prediction entries (e.g., at least the target information) from a BTB (e.g., any of BTBs in FIGS. 6A-6G) when the respective indirect branch restricted speculation bit is set, for example, and also not allowing entries to be filled by another logical core that can be used by this logical core (e.g., to prevent the other hardware thread(s) from putting in BTB entries again when the respective indirect branch restricted speculation bit is set). In one embodiment, the predictor mode is set in the predictor register by the processor based on the software being executed, e.g., if a host-supervisor, host-user, guest-supervisor, and guest-user is requesting an (e.g., branch) instruction be executed. In one embodiment, the predictor mode is linked to hardware indications for the various modes (e.g. to a CPL register or a register that holds a guest/host bit). In one embodiment, the predictor mode is implemented in microcode. For example, where the microcode checks the mode transition and looks at the mode bit and takes the appropriate action(s) (e.g., invalidate the branch predictor(s)). Another example implementation allows the processor (e.g., CPU) to ignore the predictor mode and performs the operation on the IBRS change (e.g. invalidate branch predictors then). As yet another example implementation, the predictor mode is ignored and the processor (e.g., CPU) prevents indirect branch instructions from predicting using the branch predictor (e.g. by forcing the speculation after an indirect branch to a static prediction of 0, regardless of what the branch predictor contained). Another implementation has the predictor mode in the branch predictor entries themselves and the processor (e.g., CPU) forces speculation to a static prediction (or to stall and have no prediction) when the current mode did not match the bits in that predictor. Another implementation is to not match (e.g., tag mismatch) any entries that have predictor mode in the entry that do not match the current predictor mode.

In one embodiment, a respective indirect branch restricted speculation bit being set in the model specific register for each logical core of the plurality of logical cores prevents the branch predictor from predicting the target instruction of the indirect branch instruction for a logical core of the plurality of logical cores based on software executed by the other of the plurality of logical cores. In one embodiment, a branch predictor is prevented from predicting the target instruction, for the indirect branch instruction executed in an enclave, based on software executed outside the enclave by any of the plurality of logical cores.

In one embodiment, a branch predictor is prevented from predicting the target instruction, for the indirect branch instruction executed in system-management mode after a system-management interrupt, based on software executed in the system-management mode by any of the plurality of logical cores.

In one embodiment, the processor is to prevent the predictor from predicting a target instruction for a particular branch IP by stalling the branch predictor or forcing to a static address (for example, letting the branch predictor predict (e.g., for a cycle or two) to analyze what the predictor predicts, then redirect the predictor in the decode pipeline stage to a different address and invalidate whatever was predicted by the branch predictor before those operations (e.g., microoperations) can execute. In one embodiment, the processor is to prevent the predictor from predicting a target instruction for a particular branch IP by preventing new filling of BTB entries (e.g., and flushing certain (or all) of the BTB entries).

In one embodiment, a processor core (e.g., software executing on that processor core) is to clear (e.g., by executing the WRMSR instruction) the set indirect branch restricted speculation bit for the first logical core in the model specific register prior to entering a sleep state. In certain embodiments, the processor core is to re-set (e.g., by executing the WRMSR instruction) the cleared indirect branch restricted speculation bit for the first logical core in the model specific register after wakeup from the sleep state.

In one embodiment, an indirect branch restricted speculation bit being set (e.g., after the transition to the more privileged predictor mode) prevents the branch predictor from predicting the target instruction for the first logical core based on software executed (e.g., before the transition,) in the less privileged predictor mode by any of the plurality of logical cores.

In one embodiment, an indirect branch restricted speculation bit being set (e.g., after the transition to the more privileged predictor mode) also prevents the branch predictor from predicting the target instruction for the first logical core based on software executed in a less privileged predictor mode by any of the plurality of logical cores for a (e.g., later, second) transition of the first logical core to the more privileged predictor mode.

Example Implementations for Single Thread Indirect Branch Predictors (STIBP)

In certain embodiments, when an STIBP bit is set, the sharing of predictions by logical cores (e.g., or by multiple threads) is disabled by the branch predictor. In one embodiment, a BTB includes a thread identification field (e.g., thread ID field 616 in FIG. 6D) to track which thread a (e.g., same) branch instruction (e.g., IP) corresponds, e.g., so that one thread does not use another thread's prediction(s) (e.g., predicted target). Additionally, in certain embodiments the BTB also includes (i) a branch type field (e.g., branch type field 614 in FIG. 6B) or (ii) a separate BTB for indirect branches (e.g., BTB 607 in FIG. 6G), e.g., to allow the STIBP being set to only affect the indirect type of branches. In one embodiment, the branch predictor is disabled by executing a branch address clear (BACLEAR) instruction. In one embodiment, the decoding and execution of a branch address clear (BACLEAR) instruction causes the clearing out (e.g., in a physical core) of the microoperations and/or instructions that are already decoded and steering the instruction pointer to the code address (e.g., to the address zero or to the next sequential instruction) as specified by the instruction, for example, specified as an (e.g., immediate) operand of the branch address clear (BACLEAR) instruction.

In one embodiment, the branch predictor is disabled by clearing (e.g., flushing) one or more (e.g., all) entries in a BTB of any of FIGS. 6A-6H, e.g., independent of the predictor mode. In one embodiment, the setting of the STIBP bit also prevents a refill of (e.g., any of) the BTB entries. In one embodiment, the setting of the STIBP bit for a particular logical core prevents a refill of (e.g., any of) the BTB entries by another logical core in such a way that the entries could be used by the particular logical core (e.g., to ensure that any new entries that the other hardware thread can install (if it can install any) cannot be used by the particular logical core).

In one embodiment, the clearing at least clears the target field 612 for an entry. In one embodiment, the STIBP bit being set causes a clearing of only indirect (and not direct) branch entries (e.g., clearing at least the target field 612 for those indirect branch entries). In one embodiment, a BTB includes a valid field (e.g., valid field 609 in FIG. 6C) and the STIBP bit being set causes the valid bit (for example, all valid bits for (e.g., indirect) branches) to be set to a value that indicates the entry is invalid even though the entry includes a valid predicted target (e.g., the entry identifies a location to access the target IP). In one embodiment, the STIBP bit being set causes the (e.g., indirect) branch entries to have a target set to indicate a safe instruction pointer (e.g., providing a next instruction pointer or zero as the target value in target field 612 in FIGS. 6A-6H) and not a predicted target.

In one embodiment, a single thread indirect branch predictor bit being set in the model specific register prevents the branch predictor from predicting the target instruction of the indirect branch instruction for the first logical core based on software executed by the other of the plurality of logical cores (e.g., but allows for predictions by software executed by the first logical core).

In one embodiment, a single thread indirect branch predictor bit being set in the model specific register prevents the branch predictor from predicting the target instruction for (e.g., a thread of) the first logical core based on software (e.g., other logical threads) that was executed by the other of the plurality of logical cores before the setting of the single thread indirect branch predictor bit.

In one embodiment, a processor core (e.g., software running on the processor core) is to clear (e.g., by executing the WRMSR instruction) the set single thread indirect branch predictor bit for the first logical core in the model specific register prior to entering a sleep state. In certain embodiments, the processor core (e.g., software running on the processor core) is to re-set (e.g., by executing the WRMSR instruction) the cleared single thread indirect branch predictor bit for the first logical core in the model specific register after wakeup from the sleep state.

In one embodiment, a (e.g., respective) model specific register stores a respective single thread indirect branch predictor bit for each logical core of the plurality of logical cores that, when set, prevents the branch predictor from predicting the target instruction of the indirect branch instruction for a logical core of the plurality of logical cores based on software executed by the other of the plurality of logical cores.

Example Implementations for Indirect Branch Predictor Barrier (IBPB)

In certain embodiments, when an IBPB bit is set, it serves as a command to implement a barrier between code sections, e.g., such that code before the barrier does not control the branch predictions (e.g., targets) for code after the barrier and/or that code after the barrier does not control the branch predictions (e.g., targets) for code before the barrier. In one embodiment, when an IBPB bit is set, a branch predictor is to clear all the data of branch predictions in the BTB (e.g., full branch predictor array). In one embodiment, when an IBPB bit is set, a branch predictor is to clear the valid bits in a BTB (e.g., from valid field 609 in FIG. 6C), e.g., but leave the rest of the data in the BTB. In one embodiment, when an IBPB bit is set, a branch predictor is to clear the target (e.g., in target field 612 in FIGS. 6A-6H), for example, and leave the valid bit in its current value (set or unset). In one embodiment, a BTB includes a branch type field (e.g., branch type field 614 in FIGS. 6A-6B) and when an IBPB bit is set, a branch predictor is to clear the data when the branch type is indirect. In one embodiment, when an IBPB bit is set, a branch predictor is to clear the target field (and/or put a dummy value in the target field instead of the target branch address) to retain the other data in an entry. In one embodiment, a branch predictor is to clear an entire RSB (e.g., RSB 700 in FIG. 7) and/or the entire BTB (e.g., BTB in FIGS. 6A-6H).

In one embodiment, an indirect branch predictor barrier bit for a first logical core of the plurality of logical cores being set, prevents the branch predictor from predicting the target instruction of the indirect branch instruction for the first logical core based on software executed by the first logical core before the indirect branch predictor barrier bit was set. In certain embodiments, the command register is a write-only register.

III. Bounds Check Bypass Mitigation

Bounds check bypass is a side channel method that takes advantage of the speculative execution that may occur following a conditional branch instruction. Specifically, the method is used in situations in which the processor is checking whether an input is in bounds (e.g., while checking whether the index of an array element being read is within acceptable values). The processor may issue operations (e.g., fetch, decode, and/or execute operations) speculatively before the bounds check resolves. If an attacker contrives for these operations to access out-of-bound memory, information may be leaked to the attacker in certain circumstances. Bounds check bypass can be mitigated through the modification of software to constrain speculation in confused deputies. In certain embodiments, software is to insert a speculation stopping barrier between a bounds check and a later operation that could cause a speculative side channel. A load fence (LFENCE) instruction, or any serializing instruction, serves as such a barrier in certain embodiments. In one embodiment, these instructions suffice regardless of whether the bounds checking is implemented using conditional branches or through the use of bound checking instructions (e.g., lower bound checking instruction (BNDCL) and upper bound checking instruction (BNDCU) that are part of an Intel® Memory Protection Extensions (Intel® MPX). In certain embodiments, an LFENCE instruction and the serializing instructions all ensure that no later instruction will execute, even speculatively, until all prior instructions have completed locally. In one embodiment, the LFENCE instruction has lower latency than the serializing instructions. Other instructions such as a conditional move (CMOVcc), AND, add with carry (ADC), subtract with borrow (SBB), and set byte on conditional (SETcc) may used to prevent bounds check bypass by constraining speculative execution on certain processors. Memory disambiguation (described in section IV below) can theoretically impact such speculation constraining sequences when they involve a load from memory. In the following example (using the registers referred to as RAX, RCX, and RDX), a conditional move if greater (CMOVG) instruction is inserted in this code to prevent a side channel from being created with data from any locations beyond the array bounds.

```
CMP RDX, [array bounds]
JG out_of_bounds input
MOV RCX, 0
MOV RAX, [RDX+0x400000]
CMOVG RAX, RCX
```

As an example, assume the value at "array bounds" is 0x20, but that value was only just stored to "array_bounds" and that the prior value at "array bounds" was significantly higher, such as 0xFFFF. The processor can execute the compare (CMP) instruction speculatively using a value of 0xFFFF for the loaded value due to the memory disambiguation mechanism, although the instruction will eventually be re-executed with the intended array bounds of 0x20. This can theoretically cause the above sequence to create a speculative store bypass side channel that reveals information about the memory at addresses up to 0xFFFF instead of constraining it to addresses below 0x20.

IV. Speculative Store Bypass Mitigation

Certain processors may use memory disambiguation predictors that allows loads to be executed speculatively before it is known whether the load's address overlaps with a preceding store's address. This may happen if a store's address is unknown when the load is ready to execute. If the processor predicts that the load address will not overlap with the unknown store address, the load may execute speculatively. However, if there was indeed an overlap, then the load may consume stale data. When this occurs, in certain embodiments, the processor will reexecute the load to ensure a correct result. Through the memory disambiguation predictors, in certain embodiments an attacker can cause certain instructions to be executed speculatively and then use the effects for side channel analysis. For example, consider the following scenario:

Assume that a key K exists. The attacker is allowed to know the value of M, but not the value of key K. X is a variable in memory.

1. X=&K; // Attacker manages to get variable with address of K stored into pointer X <at some later point>

2. X=&M; // Does a store of address of M to pointer X
3. Y=Array[*X & 0xFFFF]; // Dereferences address of M which is in pointer X in order
   // to load from array at index specified by M[15:0]

When the above code runs, the load from address X that occurs as part of step 3 may execute speculatively and, due to memory disambiguation, initially receive a value of address of K instead of the address of M. When this value of address of K is dereferenced, the array is speculatively accessed with an index of K[15:0] instead of M[15:0]. In certain embodiments, the processor will later reexecute the load from address X and use M[15:0] as the index into the array. However, the cache movement caused by the earlier speculative access to the array may be analyzed by the attacker to infer information about K[15:0].

The following discusses mitigation techniques for speculative store bypass. It can be mitigated by software modifications, or (e.g., if that is not feasible) the use of Speculative Store Bypass Disable (SSBD) mitigation, which prevents a load from executing speculatively until the addresses of all older stores are known.

Software-Based Mitigations

Speculative store bypass can be mitigated through numerous software-based approaches. This section describes two such software-based mitigations: process isolation and the selective use of LFENCE.

One approach is to move all (e.g., secret) information into a separate address space from untrusted code. For example, creating separate processes for different websites so that secrets of one website are not mapped into the same address space as code from a different, possibly malicious, website. Similar techniques can be used for other runtime environments that rely on language based security to run trusted and untrusted code within the same process. This may also be useful as a defense in depth to prevent trusted code from being manipulated to create a side channel. Protection keys can also be valuable in providing such isolation, e.g., to limit the memory addresses that could be revealed by a branch target injection or bound check bypass attack.

In another embodiment, a processor (e.g., processor core) uses LFENCE to control speculative load execution. Software can insert an LFENCE between a store (for example, the store of address of M in step 2 above of X=&M) and the subsequent load (for example, the load that dereferences X in step 3 there) to prevent the load from executing before the previous store's address is known. The LFENCE can also be inserted between the load and any subsequent usage of the data returned which might create a side channel (for example, the access to Array in step 3 there). In certain embodiments, software should not apply this mitigation broadly, but instead only apply it where there is a realistic risk of an exploit; including that the attacker can control the old value in the memory location, there is a realistic chance of the load executing before the store address is known, and there is attacker code (e.g., a disclosure gadget) that reveals the contents of sensitive memory.

Speculative Store Bypass Disable (SSBD)

Certain processors employ Speculative Store Bypass Disable (SSBD) to mitigate speculative store bypass. In certain embodiments, when an SSBD bit is set (e.g., as in FIG. 9), loads will not execute speculatively until the addresses of all older stores are known, e.g., to ensure that a load does not speculatively consume stale data values due to bypassing an older store on the same logical core (e.g., logical processor).

In certain embodiments, software disables speculative store bypass on a logical core by setting IA32_SPEC_CTRL.SSBD to 1. In one embodiment, both enclave and SMM code will behave as if SSBD is set regardless of the actual value of the MSR bit, e.g., the processor will ensure that a load within enclave or SMM code does not speculatively consume stale data values due to bypassing an older store on the same logical core (e.g., logical processor).

Enabling the SSBD mitigation prevents exploits based on speculative store bypass in certain embodiments. However, this may reduce performance in an embodiment. In certain embodiments, a software set SSBD bit is utilized for applications and/or execution runtimes relying on language-based security mechanisms. Examples include managed runtimes and just-in-time translators. In certain embodiments where software is not relying on language-based security mechanisms, for example, because it is using process isolation, then setting SSBD may not be needed. For example, where there is no practical exploit for Operating Systems, Virtual Machine Monitors, or other applications that do not rely on language-based security.

Certain processors may support multithreading, but not support enhanced IBRS, and in one embodiment, setting SSBD on a logical core (e.g., logical processor) may impact the performance of a sibling logical core (e.g., logical processor) on the same physical core. In certain of such embodiments, the SSBD bit is cleared when in an idle state on such processors. In one embodiment, an OS provides an application programming interface (API) through which a process can request it be protected by SSBD mitigation. In one embodiment, virtual machine monitor (VMM) allows a virtual machine (e.g., guest) to determine whether to enable SSBD mitigation by providing direct guest access to IA32_SPEC_CTRL (e.g., MSR in format 900 in FIG. 9).

V. Capabilities Enumeration and Architectural Registers

In certain embodiments, processor support for the mitigation mechanisms discussed herein is enumerated using the CPUID instruction and several architectural MSRs. In one embodiment, execution of a CPUID instruction causes a processor to reveal to software the processor type and/or presence of features by returning a resultant value (e.g., in (capabilities) register EAX and/or EDX) that indicates the processor type and/or presence of features.

In one embodiment, execution of the CPUID instruction enumerates support for any of the mitigation mechanisms using five feature flags in CPUID.(EAX=7H,ECX=0):EDX:

- CPUID.(EAX=7H,ECX=0):EDX[26] enumerates support for indirect branch restricted speculation (IBRS) and the indirect branch predictor barrier (IBPB). Processors that set this bit after execution of CPUID support the IA32_SPEC_CTRL MSR and the IA32_PRED_CMD MSR, e.g., they allow software to set IA32_SPEC_CTRL[0] (IBRS) and IA32_PRED_CMD[0] (IBPB).
- CPUID.(EAX=7H,ECX=0):EDX[27] enumerates support for single thread indirect branch predictors (STIBP). Processors that set this bit after execution of CPUID support the IA32_SPEC_CTRL MSR, e.g., they allow software to set IA32_SPEC_CTRL[1] (STIBP).
- CPUID.(EAX=7H,ECX=0):EDX[28] enumerates support for LID_FLUSH. Processors that set this bit after execution of CPUID support the IA32_FLUSH_CMD MSR, e.g., they allow software to set IA32_FLUSH_CMD[0] (LID FLUSH).
- CPUID.(EAX=7H,ECX=0):EDX[29] enumerates support for the IA32_ARCH_CAPABILITIES MSR.
- CPUID.(EAX=7H,ECX=0):EDX[31] enumerates support for Speculative Store Bypass Disable (SSBD). Processors that set this bit after execution of CPUID support the IA32_SPEC_CTRL MSR, e.g., they allow software to set IA32_SPEC_CTRL[2](SSBD).

In certain embodiments one or more (e.g., all of) the mitigation mechanisms discussed herein are introduced to a processor by loading a microcode update. For example, with software re-evaluating the enumeration after loading that microcode update. In one embodiment, each logical core (e.g., logical processor) has its own capabilities register, control register, command register, or any combination thereof.

In one embodiment, execution of CPUID instruction causes the EAX register to be loaded with data that indicates the main category of information returned (e.g., the CPUID leaf) and/or the EDX register to be loaded with data that indicates specific supported features (e.g., mitigations) for that category, e.g., depending on which logical core (e.g., logical processor) the CPUID instruction w as executed rn tar (e.g., run "on"). Table 2 below discusses example format of data in an EDX register for an EAX value ("leaf").

TABLE 2

Example CPUID Leaf 07H, Sub-leaf 0: Updated EDX Register Details

| Initial EAX Value | Information Provided About the Processor<br>Structured Extended Feature Flags Enumeration Leaf<br>(Output depends on ECX input value) | |
|---|---|---|
| 07H | EDX | NOTES:<br>Leaf 07H main leaf (ECX = 0).<br>If ECX contains an invalid sub-leaf index, EAX/EBX/ECX/EDX return 0.<br>Bits 25-00: Reserved<br>Bit 26: IBRS and IBPB supported<br>Bit 27: STIBP supported<br>Bit 28: L1D_FLUSH supported<br>Bit 29: IA32_ARCH_CAPABILITIES supported<br>Bit 30: Reserved<br>Bit 31: SSBD supported |

IA32 ARCH_CAPABILITIES MSR

In certain embodiments, additional features are enumerated by the IA32_ARCH_CAPABILITIES MSR (e.g., MSR index 10AH). In one embodiment, this is a read-only MSR that is supported if CPUID.(EAX=7H,ECX=0):EDX[29] is enumerated as 1. Table 3 below provides details of one embodiment of a capabilities register for use herein.

TABLE 3

Example IA32_ARCH_CAPABILITIES MSR Details

| Register Address | | | | |
|---|---|---|---|---|
| Hex | Dec | Register Name/Bit Fields | Bit Description | Comment |
| 10AH | 266 | IA32_ARCH_CAPABILITIES | Enumeration of Architectural Features (RO) | IF CPUID.(EAX=07H, ECX=0):EDX[29]=1 |
| | | 0 | RDCL_NO: The processor is not susceptible to Rogue Data Cache Load (RDCL). | |
| | | 1 | IBRS_ALL: The processor supports enhanced IBRS. | |

TABLE 3-continued

| Example IA32_ARCH_CAPABILITIES MSR Details | | | | |
|---|---|---|---|---|
| Register Address | | | | |
| Hex | Dec | Register Name/Bit Fields | Bit Description | Comment |
| | | 2 | RSBA: The processor supports RSB Alternate. Alternative branch predictors may be used by RET instructions when the RSB is empty. SW using retpoline may be affected by this behavior. | |
| | | 3 | SKIP_L1DFL_VMENTRY: A value of 1 indicates the hypervisor need not flush the L1D on VM entry. | |
| | | 4 | SSB_NO: Processor is not susceptible to Speculative Store Bypass. | |
| | | 63:5 | Reserved. | |

Figure 8:
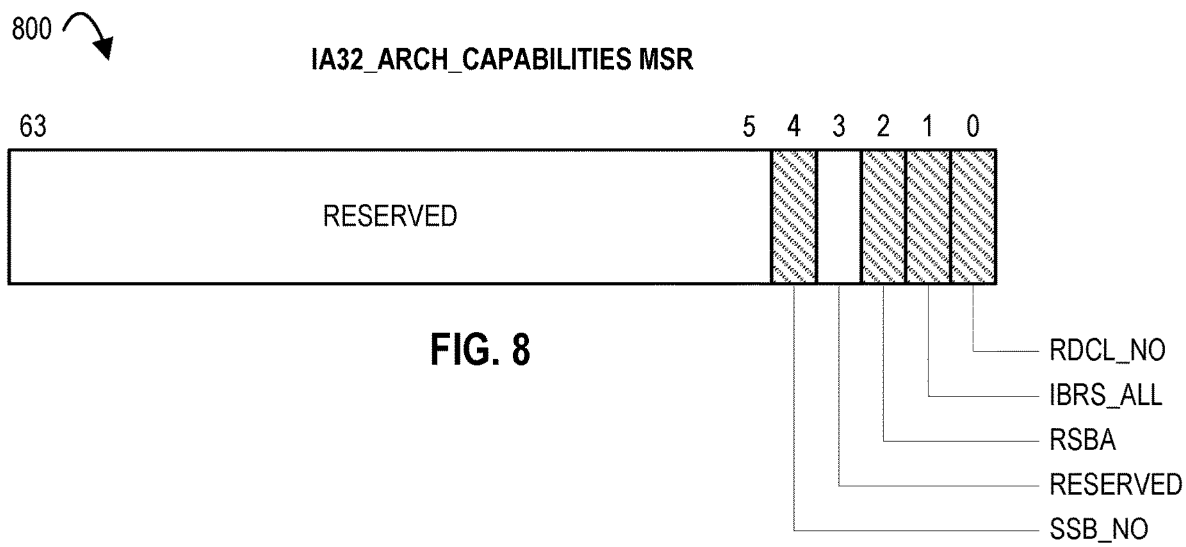
FIG. 8 illustrates a format of a capabilities register according to embodiments of the disclosure.

FIG. 8 illustrates a format of a capabilities register 800 according to embodiments of the disclosure, e.g., using the bits in Table 3 above.

IA32 SPEC_CTRL MSR

In certain embodiments, the IA32_SPEC_CTRL MSR bits are defined as logical core (e.g., logical processor) scope. On some core implementations, the bits may impact sibling logical cores (e.g., logical processors) on the same physical core. In one embodiment, this MSR has a value of 0 after reset and is unaffected by INIT # or Startup Inter-Processor Interrupt (SIPI #). In one embodiment, like IA32_TSC_DEADLINE MSR (e.g., MSR index 6E0H), the x2APIC MSRs (e.g., MSR indices 802H to 83FH) and IA32_PRED_CMD (e.g., MSR index 49H), performing a write (e.g., by a WRMSR instruction) to IA32_SPEC_CTRL (MSR index 48H) is not defined as a serializing instruction. In one embodiment, a write (e.g., WRMSR) to IA32_SPEC_CTRL does not execute until all prior instructions have completed locally and no later instructions begin execution until the WRMSR completes. Table 4 below provides details of one embodiment of a speculative control register for use herein.

TABLE 4

| Example IA32_SPEC_CTRL MSR Details | | | | | |
|---|---|---|---|---|---|
| Register Address | | Register Name/ | | | |
| Hex | Dec | Bit Fields | Bit Description | Comment | |
| 48H | 72 | IA32_SPEC_CTRL | Speculation Control (R/W) | If any one of the enumeration conditions for defined bit field positions holds. | |
| | | 0 | Indirect Branch Restricted speculation (IBRS). Restricts speculation of indirect branch. | If CPUID.(EAX=07H, ECX=0):EDX[26]=1. | |
| | | 1 | Single Thread Indirect Branch Predictors (STIBP). Prevents indirect branch predictions on all logical processors on the core from being controlled by any sibling logical processor in the same core. | If CPUID.(EAX=07H, ECX=0): EDX[27]=1. | |
| | | 2 | Speculative Store Bypass Disable (SSBD) delays speculative execution of a load until the addresses for all older stores are known. | If CPUID.(EAX=07H, ECX=0):EDX[31]=1. | |
| | | 63:3 | Reserved. | | |

In one embodiment, processors that support the IA32_SPEC_CTRL MSR but not STIBP (e.g., CPUID.(EAX=07H, ECX=0):EDX[27:26]=01b) will not cause an exception due to an attempt to set STIBP (bit 1).

Figure 9:
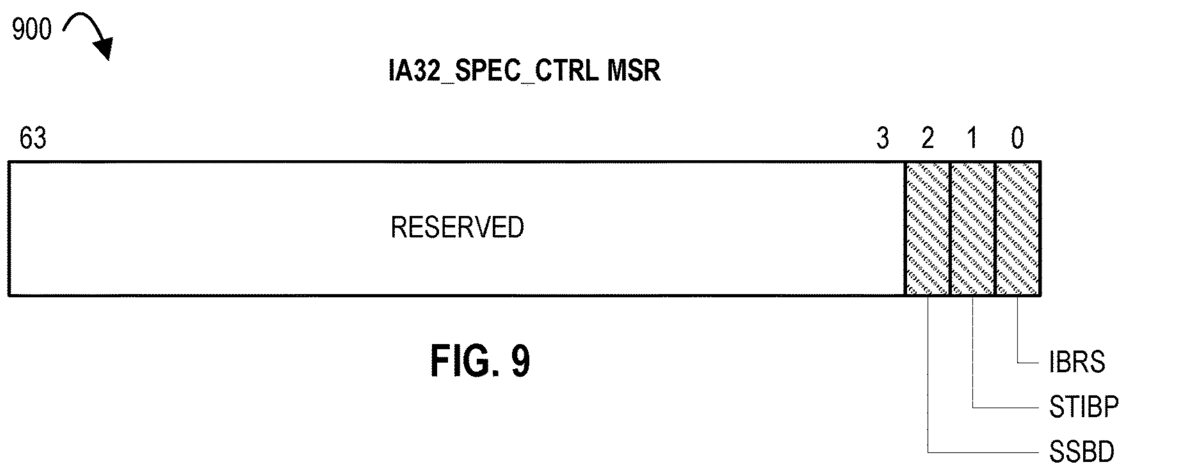
FIG. 9 illustrates a format of a speculative control register according to embodiments of the disclosure.

FIG. 9 illustrates a format 900 of a speculative control register according to embodiments of the disclosure, e.g., using the bits in Table 4 above.

IA32 PRED_CMD MSR

In certain embodiments, IA32_PRED_CMD MSR gives software a way to issue commands that affect the state of predictors. In one embodiment, like IA32_TSC_DEADLINE MSR (e.g., MSR index 6E0H), the X2APIC MSRs (e.g., MSR indices 802H to 83FH) and IA32_SPEC_CTRL (e.g., MSR index 48H), a write (e.g., by a WRMSR instruction) to IA32_PRED_CMD (MSR index 49H) is not defined as a serializing instruction. In one embodiment, a write (e.g., via WRMSR) to IA32_PRED_CMD does not execute until all prior instructions have completed locally and no later instructions begin execution until the WRMSR completes. Table 5 below provides details of one embodiment of a prediction command register for use herein.

TABLE 5

Example IA32_PRED_CMD MSR Details

| Register Address | | Register Name/ | | |
|---|---|---|---|---|
| Hex | Dec | Bit Fields | Bit Description | Comment |
| 49H | 73 | IA32...PRED...CMD | Prediction Command (WO) | If any one of the enumeration conditions for defined bit field positions holds |
| | | 0 | Indirect Branch Prediction Barrier (IBPB). | If CPUID.(EAX=07H, ECX=0):EDX[26]=1. |
| | | 63:1 | Reserved. | |

Figure 10:
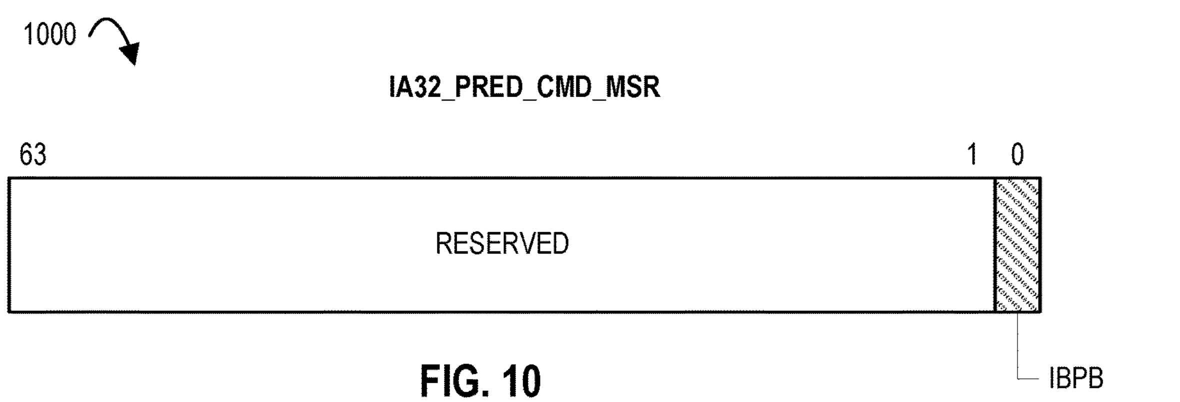
FIG. 10 illustrates a format of a prediction command register according to embodiments of the disclosure.

FIG. 10 illustrates a format of a prediction command register 1000 according to embodiments of the disclosure, e.g., using the bits in Table 5 above.

IA32 FLUSH_CMD MSR

In certain embodiments, a flush command register (e.g., IA32_FLUSH_CMD MSR) gives software a way to invalidate structures with finer granularity than other architectural methods. In one embodiment, like the IA32_TSC_DEADLINE MSR (e.g., MSR index 6E0H), the X2APIC MSRs (e.g., MSR indices 802H to 83FH), and the IA32_SPEC_CTRL MSR (e.g., MSR index 48H), a write (e.g., by a WRMSR instruction) to the IA32_FLUSH_CMD MSR (e.g., MSR index 10BH) is not defined as a serializing instruction. In one embodiment, a write (e.g., via WRMSR) to the IA32_FLUSH_CMD MSR does not execute until all prior instructions have completed locally, and no later instructions begin execution until the WRMSR completes. In one embodiment, the LID_FLUSH command allows for finer granularity invalidation of caching structures than other mechanisms, e.g., like a write back and invalidate cache (WBINVD) instruction that writes back and flushes internal caches and initiates writing-back and flushing of external caches. In one embodiment, execution of the LID_FLUSH command causes a writeback and invalidation of the L1 data cache, including all cachelines brought in by preceding instructions, without invalidating all caches (for example, without invalidating the L2 cache or LLC). Some embodiments (e.g., processors) may also invalidate the first level instruction cache on a LID_FLUSH command. The L1 data and instruction caches may be shared across the logical cores (e.g., logical processors) of a physical core. In certain embodiments, this command is used by a VMM to mitigate a L1 cache terminal fault (L1TF) exploit. Table 6 below provides details of one embodiment of a flush command register (e.g., as command register 114 in FIG. 1) for use herein.

TABLE 6

Example IA32_FLUSH_CMD MSR Details

| Register Address | | Register Name/ | | |
|---|---|---|---|---|
| Hex | Dec | Bit Fields | Bit Description | Comment |
| 10BH | 267 | IA32_FLUSH_CMD | Flush Command (WO) | If any one of the enumeration conditions for defined bit field positions holds |
| | | 0 | L1D_FLUSH: Writeback and invalidate the L1 data cache | If CPUID.(EAX=07H, ECX=0):EDX[28]=1. |
| | | 63:1 | Reserved. | |

Figure 11:
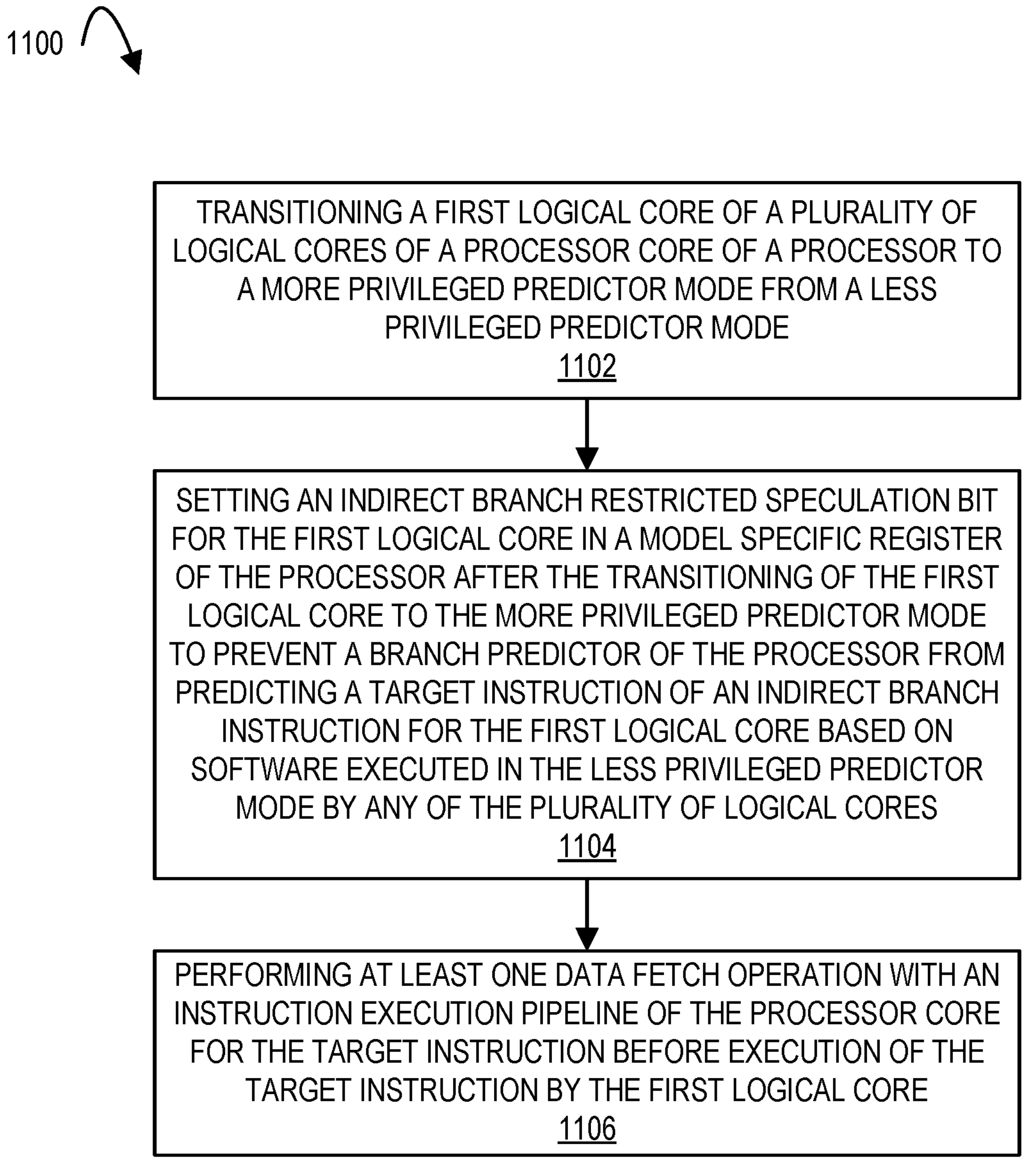
FIG. 11 illustrates a flow diagram according to embodiments of the disclosure.

FIG. 11 illustrates a flow diagram 1100 according to embodiments of the disclosure. Depicted flow 1100 includes transitioning a first logical core of a plurality of logical cores of a processor core of a processor to a more privileged predictor mode from a less privileged predictor mode at 1102, setting an indirect branch restricted speculation bit for the first logical core in a model specific register of the processor after the transitioning of the first logical core to the more privileged predictor mode to prevent a branch predictor of the processor from predicting a target instruction of an indirect branch instruction for the first logical core based on software executed in the less privileged predictor mode by any of the plurality of logical cores at 1104, and performing at least one data fetch operation with an instruction execution pipeline of the processor core for the target instruction before execution of the target instruction by the first logical core at 1106.

In one embodiment, a processor (e.g., processor core) includes at least one logical core (or a plurality of logical cores (e.g., logical processors)); a branch predictor to predict a target instruction of an indirect branch instruction; an instruction execution pipeline of the processor core (e.g., shared by the plurality of logical cores) to perform at least one data fetch operation for the target instruction before execution (e.g., and decode) of the target instruction; and a model specific register to store (e.g., by execution of a WRMSR instruction) an indirect branch restricted speculation bit (e.g., only) for a first logical core of the at least one logical core (or the plurality of logical cores) that (e.g., when set after a transition of the first logical core to a more privileged predictor mode (e.g., as detected in a predictor mode register),) prevents the branch predictor from predicting the target instruction of the indirect branch instruction for the first logical core based on (e.g., statistics for) software executed in a less privileged predictor mode by any (e.g., all) of the at least one logical core (or the plurality of logical cores). In an embodiment, a respective indirect branch restricted speculation bit being set in the model specific register for each physical (e.g., or logical) core of the plurality of logical cores prevents the branch predictor from predicting the target instruction of the indirect branch instruction for a logical core of the plurality of logical cores based on software executed by the other of the plurality of logical cores. In an embodiment, the branch predictor is prevented from predicting the target instruction, for the indirect branch instruction executed in an enclave, based on software executed outside the enclave by any of the at least one logical core (or the plurality of logical cores). In an embodiment, the branch predictor is prevented from predicting the target instruction, for the indirect branch instruction executed in system-management mode after a system-management interrupt, based on software executed in the system-management mode by any of the at least one logical core (or the plurality of logical cores). In an embodiment, the processor core is to clear (e.g., via execution of a WRMSR instruction) the set indirect branch restricted speculation bit for the first logical core in the model specific register (e.g., for only the first logical core) prior to entering a sleep state. In an embodiment, the processor core is to re-set the cleared indirect branch restricted speculation bit for the first logical core in the model specific register after wakeup from the sleep state. In an embodiment, the indirect branch restricted speculation bit being set (e.g., after the transition to the more privileged predictor mode) prevents the branch predictor from predicting the target instruction for the first logical core based on software executed (e.g., before the transition,) in the less privileged predictor mode by any of the at least one logical core (or the plurality of logical cores). In an embodiment, the indirect branch restricted speculation bit being set (e.g., after the transition to the more privileged predictor mode) also prevents the branch predictor from predicting the target instruction for the first logical core based on software executed in a less privileged predictor mode by any of the at least one logical core (or the plurality of logical cores) for a (e.g., later, second) transition of the first logical core to the more privileged predictor mode.

In another embodiment, a method includes transitioning a first logical core of at least one logical core (or a plurality of logical cores) of a processor core of a processor to a more privileged predictor mode from a less privileged predictor mode; setting an indirect branch restricted speculation bit for the first logical core in a model specific register of the processor (e.g., after the transitioning of the first logical core to the more privileged predictor mode) to prevent a branch predictor of the processor from predicting a target instruction of an indirect branch instruction for the first logical core based on software executed in the less privileged predictor mode by any of the at least one logical core (or the plurality of logical cores); and performing at least one data fetch operation with an instruction execution pipeline of the processor core for the target instruction before execution of the target instruction by the first logical core. The method may include setting a respective indirect branch restricted speculation bit in the model specific register for each physical (e.g., or logical) core of the plurality of logical cores to prevent the branch predictor from predicting the target instruction of the indirect branch instruction for a logical core of the plurality of logical cores based on software executed by the other of the plurality of logical cores. The method may include preventing the branch predictor from predicting the target instruction, for the indirect branch instruction executed in an enclave, based on software executed outside the enclave by any of the at least one logical core (or the plurality of logical cores). The method may include preventing the branch predictor from predicting the target instruction, for the indirect branch instruction executed in system-management mode after a system-management interrupt, based on software executed in the system-management mode by any of the at least one logical core (or the plurality of logical cores). The method may include clearing the set indirect branch restricted speculation bit for the first logical core in the model specific register prior to entering a sleep state. The method may include re-setting the cleared indirect branch restricted speculation bit for the first logical core in the model specific register after wakeup from the sleep state. The method may include wherein the setting of the indirect branch restricted speculation bit in the model specific register (e.g., after the transitioning to the more privileged predictor mode) prevents the branch predictor from predicting the target instruction for the first logical core based on software executed, before the transitioning, in the less privileged predictor mode by any of the at least one logical core (or the plurality of logical cores). The method may include wherein the setting of the indirect branch restricted speculation bit in the model specific register (e.g., after the transitioning to the more privileged predictor mode) also prevents the branch predictor from predicting the target instruction for the first logical core based on software executed in a less privileged predictor mode by any of the at least one logical core (or the plurality of logical cores) for a later, second transition of the first logical core to the more privileged predictor mode.

In yet another embodiment, a non-transitory machine readable medium that stores code that when executed by a machine causes the machine to perform a method comprising transitioning a first logical core of at least one logical core (or a plurality of logical cores) of a processor core of a processor to a more privileged predictor mode from a less privileged predictor mode; setting an indirect branch restricted speculation bit for the first logical core in a model specific register of the processor (e.g., after the transitioning of the first logical core to the more privileged predictor mode) to prevent a branch predictor of the processor from predicting a target instruction of an indirect branch instruction for the first logical core based on software executed in the less privileged predictor mode by any of the at least one logical core (or the plurality of logical cores); and performing at least one data fetch operation with an instruction execution pipeline of the processor core for the target instruction before execution of the target instruction by the first logical core. The method may include setting a respective indirect branch restricted speculation bit in the model specific register for each physical (e.g., or logical) core of the plurality of logical cores to prevent the branch predictor from predicting the target instruction of the indirect branch instruction for a logical core of the plurality of logical cores based on software executed by the other of the plurality of logical cores. The method may include preventing the branch predictor from predicting the target instruction, for the indirect branch instruction executed in an enclave, based on software executed outside the enclave by any of the at least one logical core (or the plurality of logical cores). The method may include preventing the branch predictor from predicting the target instruction, for the indirect branch instruction executed in system-management mode after a system-management interrupt, based on software executed in the system-management mode by any of the at least one logical core (or the plurality of logical cores). The method may include clearing the set indirect branch restricted speculation bit for the first logical core in the model specific register prior to entering a sleep state. The method may include re-setting the cleared indirect branch restricted speculation bit for the first logical core in the model specific register after wakeup from the sleep state. The method may include wherein the setting of the indirect branch restricted speculation bit in the model specific register (e.g., after the transitioning to the more privileged predictor mode) prevents the branch predictor from predicting the target instruction for the first logical core based on software executed, before the transitioning, in the less privileged predictor mode by any of the at least one logical core (or the plurality of logical cores). The method may include wherein the setting of the indirect branch restricted speculation bit in the model specific register (e.g., after the transitioning to the more privileged predictor mode) also prevents the branch predictor from predicting the target instruction for the first logical core based on software executed in a less privileged predictor mode by any of the at least one logical core (or the plurality of logical cores) for a later, second transition of the first logical core to the more privileged predictor mode.

In another embodiment, a processor (e.g., processor core) includes at least one logical core (or a plurality of logical cores); a branch predictor to predict a target instruction of an indirect branch instruction; an instruction execution pipeline of the processor core to perform at least one data fetch operation for the target instruction before execution of the target instruction; and a model specific register to store a single thread indirect branch predictor bit for a first logical core of the at least one logical core (or the plurality of logical cores) that, when set, prevents the branch predictor from predicting the target instruction of the indirect branch instruction for the first logical core based on software executed by the other of the at least one logical core (or the plurality of logical cores) (e.g., but allows for prediction(s) by software executed by the first logical core). In an embodiment, the single thread indirect branch predictor bit being set in the model specific register prevents the branch predictor from predicting the target instruction for the first logical core based on software executed by the other of the at least one logical core (or the plurality of logical cores) before setting of the single thread indirect branch predictor bit. In an embodiment, the processor core is to clear the set single thread indirect branch predictor bit for the first logical core in the model specific register prior to entering a sleep state. In an embodiment, the processor core is to re-set the cleared single thread indirect branch predictor bit for the first logical core in the model specific register after wakeup from the sleep state. In an embodiment, the model specific register stores a respective single thread indirect branch predictor bit for each logical core of the plurality of logical cores that, when set, prevents the branch predictor from predicting the target instruction of the indirect branch instruction for a logical core of the plurality of logical cores based on software executed by the other of the plurality of logical cores.

In yet another embodiment, a method includes setting a single thread indirect branch predictor bit for a first logical core of at least one logical core (or a plurality of logical cores) of a processor core of a processor in a model specific register of the processor to prevent a branch predictor of the processor from predicting a target instruction of an indirect branch instruction for the first logical core based on software executed by the other of the at least one logical core (or the plurality of logical cores); and performing at least one data fetch operation with an instruction execution pipeline of the processor core for the target instruction before execution of the target instruction by the first logical core.

In another embodiment, a processor (e.g., processor core) includes at least one logical core (or a plurality of logical cores); a branch predictor to predict a target instruction of an indirect branch instruction; an instruction execution pipeline of the processor core to perform at least one data fetch operation for the target instruction before execution of the target instruction; and a command register to store an indirect branch predictor barrier bit for a first logical core of the at least one logical core (or the plurality of logical cores), that when set, that prevents the branch predictor from predicting the target instruction of the indirect branch instruction for the first logical core based on software executed by the first logical core before the indirect branch predictor barrier bit was set. The command register may be a write-only register.

In yet another embodiment, a method includes setting an indirect branch predictor barrier bit for a first logical core of at least one logical core (or a plurality of logical cores) of a processor core of a processor in a command register of the processor to prevent a branch predictor of the processor from predicting a target instruction of an indirect branch instruction for the first logical core based on software executed by the first logical core before the indirect branch predictor barrier bit was set; and performing at least one data fetch operation with an instruction execution pipeline of the processor core for the target instruction before execution of the target instruction by the first logical core.

In another embodiment, a processor (e.g., processor core) includes at least one logical core (or a plurality of logical cores) (e.g., logical processors); means to predict a target instruction of an indirect branch instruction; an instruction execution pipeline of the processor core (e.g., shared by the plurality of logical cores) to perform at least one data fetch operation for the target instruction before execution (e.g., and decode) of the target instruction; and a model specific register to store (e.g., by execution of a WRMSR instruction) an indirect branch restricted speculation bit (e.g., only) for a first logical core of the at least one logical core (or the plurality of logical cores) that (e.g., when set after a transition of the first logical core to a more privileged predictor mode (e.g., as detected in a predictor mode register),) prevents the means from predicting the target instruction of the indirect branch instruction for the first logical core based on (e.g., statistics for) software executed in a less privileged predictor mode by any (e.g., all) of the at least one logical core (or the plurality of logical cores).

In yet another embodiment, a processor (e.g., processor core) includes at least one logical core (or a plurality of logical cores); means to predict a target instruction of an indirect branch instruction; an instruction execution pipeline of the processor core to perform at least one data fetch operation for the target instruction before execution of the target instruction; and a model specific register to store a single thread indirect branch predictor bit for a first logical core of the at least one logical core (or the plurality of logical cores) that, when set, prevents the means from predicting the target instruction of the indirect branch instruction for the first logical core based on software executed by the other of the at least one logical core (or the plurality of logical cores) (e.g., but allows for prediction(s) by software executed by the first logical core).

In another embodiment, a processor (e.g., processor core) includes at least one logical core (or a plurality of logical cores); means to predict a target instruction of an indirect branch instruction; an instruction execution pipeline of the processor core to perform at least one data fetch operation for the target instruction before execution of the target instruction; and a command register to store an indirect branch predictor barrier bit for a first logical core of the at least one logical core (or a plurality of logical cores), that when set, that prevents the means from predicting the target instruction of the indirect branch instruction for the first logical core based on software executed by the first logical core before the indirect branch predictor barrier bit was set.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, May 2018; and see Intel® Architecture Instruction Set Extensions Programming Reference, May 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 12A:
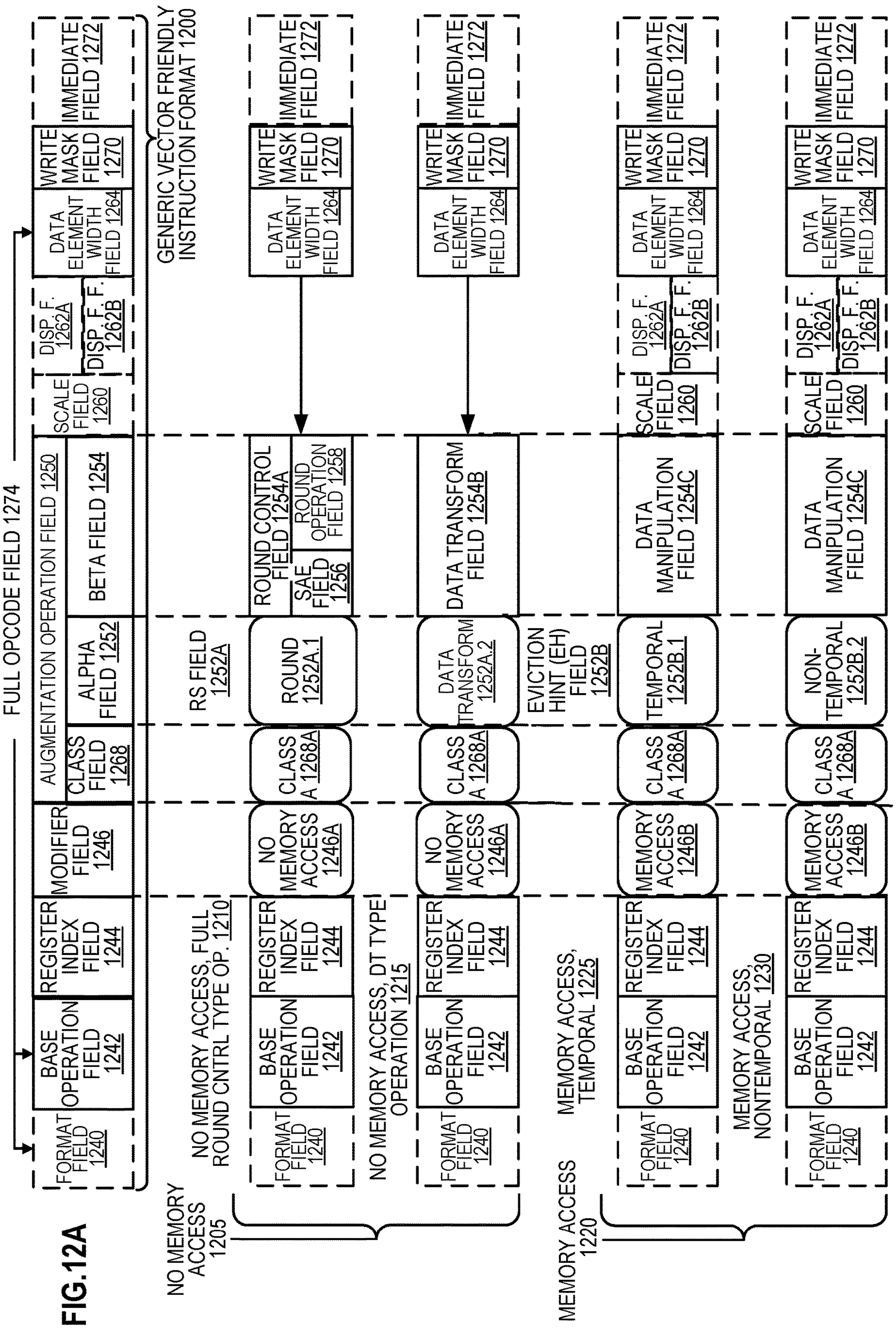
FIG. 12A is a block diagram illustrating a generic vector friendly instruction format and class A instruction templates thereof according to embodiments of the disclosure.
Figure 12B:
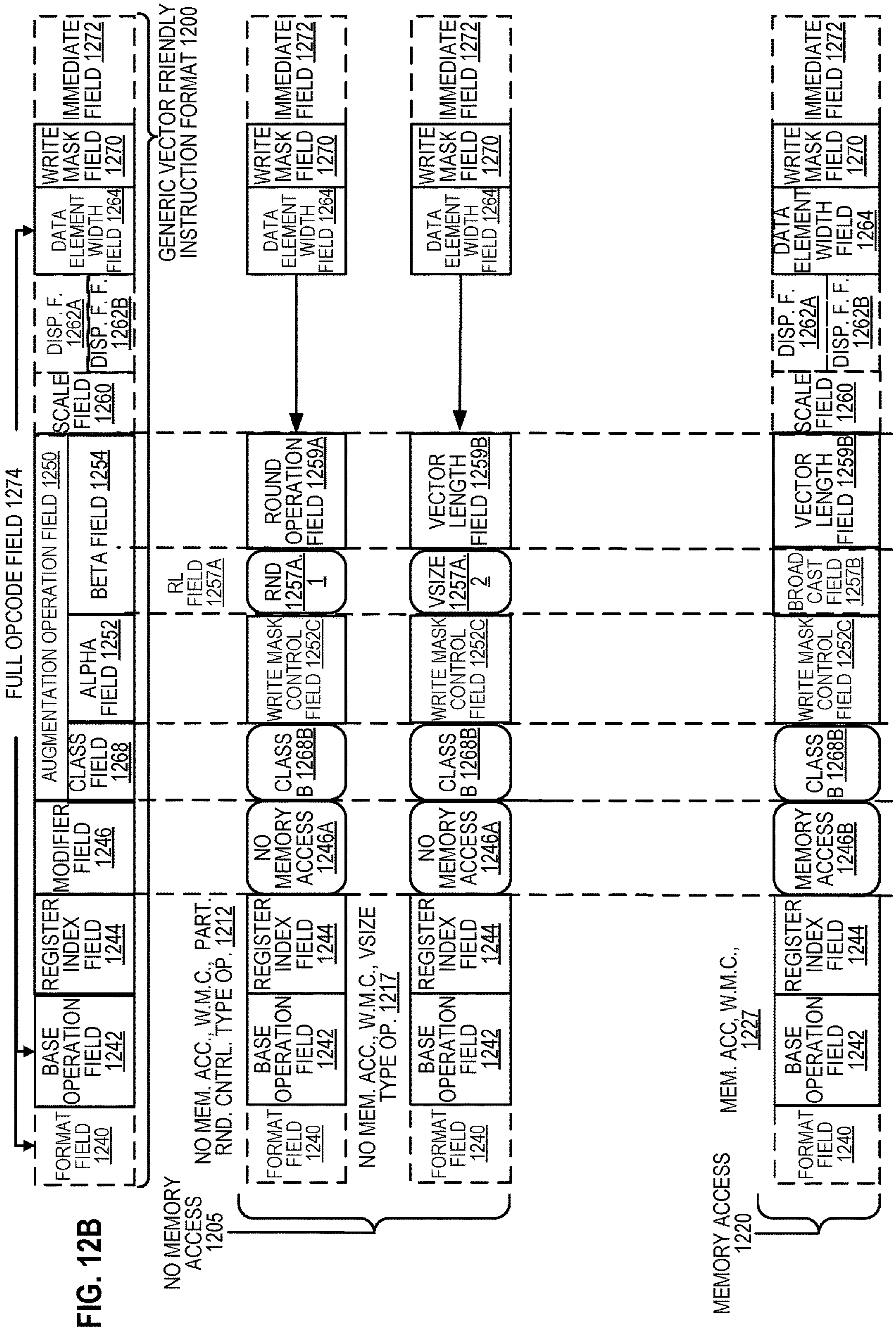
FIG. 12B is a block diagram illustrating the generic vector friendly instruction format and class B instruction templates thereof according to embodiments of the disclosure.

FIGS. 12A-12B are block diagrams illustrating a generic vector friendly instruction format and instruction templates thereof according to embodiments of the disclosure. FIG. 12A is a block diagram illustrating a generic vector friendly instruction format and class A instruction templates thereof according to embodiments of the disclosure; while FIG. 12B is a block diagram illustrating the generic vector friendly instruction format and class B instruction templates thereof according to embodiments of the disclosure. Specifically, a generic vector friendly instruction format 1200 for which are defined class A and class B instruction templates, both of which include no memory access 1205 instruction templates and memory access 1220 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 12A include: 1) within the no memory access 1205 instruction templates there is shown a no memory access, full round control type operation 1210 instruction template and a no memory access, data transform type operation 1215 instruction template; and 2) within the memory access 1220 instruction templates there is shown a memory access, temporal 1225 instruction template and a memory access, non-temporal 1230 instruction template. The class B instruction templates in FIG. 12B include: 1) within the no memory access 1205 instruction templates there is shown a no memory access, write mask control, partial round control type operation 1212 instruction template and a no memory access, write mask control, vsize type operation 1217 instruction template; and 2) within the memory access 1220 instruction templates there is shown a memory access, write mask control 1227 instruction template.

The generic vector friendly instruction format 1200 includes the following fields listed below in the order illustrated in FIGS. 12A-12B.

Format field 1240—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1242—its content distinguishes different base operations.

Register index field 1244—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1246—its content distinguishes occurrences of instructions in the generic vector instruction format that specify memory access at 1246B from those that do not at 1246A; that is, between no memory access 1205 instruction templates and memory access 1220 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1250—its content distinguishes which one of a variety of different operations to be performed in addition to the base operation. This field is context specific. In one embodiment of the disclosure, this field is divided into a class field 1268, an alpha field 1252, and a beta field 1254. The augmentation operation field 1250 allows common groups of operations to be performed in a single instruction rather than 2, 3, or 4 instructions.

Scale field 1260—its content allows for the scaling of the index field's content for memory address generation (e.g., for address generation that uses $2^{scale}$*index+base).

Displacement Field 1262A—its content is used as part of memory address generation (e.g., for address generation that uses $2^{scale}$*index+base+displacement).

Displacement Factor Field 1262B (note that the juxtaposition of displacement field 1262A directly over displacement factor field 1262B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1274 (described later herein) and the data manipulation field 1254C. The displacement field 1262A and the displacement factor field 1262B are optional in the sense that they are not used for the no memory access 1205 instruction templates and/or different embodiments may implement only one or none of the two.

Data element width field 1264—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1270—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1270 allows for partial vector operations, including loads, stores, arithmetic, logical, etc. While embodiments of the disclosure are described in which the write mask field's 1270 content selects one of a number of write mask registers that contains the write mask to be used (and thus the write mask field's 1270 content indirectly identifies that masking to be performed), alternative embodiments instead or additional allow the mask write field's 1270 content to directly specify the masking to be performed.

Immediate field 1272—its content allows for the specification of an immediate. This field is optional in the sense that is it not present in an implementation of the generic vector friendly format that does not support immediate and it is not present in instructions that do not use an immediate.

Class field 1268—its content distinguishes between different classes of instructions. With reference to FIGS. 12A-B, the contents of this field select between class A and class B instructions. In FIGS. 12A-B, rounded corner squares are used to indicate a specific value is present in a field (e.g., class A 1268A and class B 1268B for the class field 1268 respectively in FIGS. 12A-B).

Instruction Templates of Class A

In the case of the non-memory access 1205 instruction templates of class A, the alpha field 1252 is interpreted as an RS field 1252A, whose content distinguishes which one of the different augmentation operation types are to be performed (e.g., round 1252A.1 and data transform 1252A.2 are respectively specified for the no memory access, round type operation 1210 and the no memory access, data transform type operation 1215 instruction templates), while the beta field 1254 distinguishes which of the operations of the specified type is to be performed. In the no memory access 1205 instruction templates, the scale field 1260, the displacement field 1262A, and the displacement scale field 1262B are not present.

No-Memory Access Instruction Templates—Full Round Control Type Operation

In the no memory access full round control type operation 1210 instruction template, the beta field 1254 is interpreted as a round control field 1254A, whose content(s) provide static rounding. While in the described embodiments of the disclosure the round control field 1254A includes a suppress all floating point exceptions (SAE) field 1256 and a round operation control field 1258, alternative embodiments may support may encode both these concepts into the same field or only have one or the other of these concepts/fields (e.g., may have only the round operation control field 1258).

SAE field 1256—its content distinguishes whether or not to disable the exception event reporting; when the SAE field's 1256 content indicates suppression is enabled, a given instruction does not report any kind of floating-point exception flag and does not raise any floating point exception handler.

Round operation control field 1258—its content distinguishes which one of a group of rounding operations to perform (e.g., Round-up, Round-down, Round-towards-zero and Round-to-nearest). Thus, the round operation control field 1258 allows for the changing of the rounding mode on a per instruction basis. In one embodiment of the disclosure where a processor includes a control register for specifying rounding modes, the round operation control field's 1258 content overrides that register value.

No Memory Access Instruction Templates—Data Transform Type Operation

In the no memory access data transform type operation 1215 instruction template, the beta field 1254 is interpreted as a data transform field 1254B, whose content distinguishes which one of a number of data transforms is to be performed (e.g., no data transform, swizzle, broadcast).

In the case of a memory access 1220 instruction template of class A, the alpha field 1252 is interpreted as an eviction hint field 1252B, whose content distinguishes which one of the eviction hints is to be used (in FIG. 12A, temporal 1252B.1 and non-temporal 1252B.2 are respectively specified for the memory access, temporal 1225 instruction template and the memory access, non-temporal 1230 instruction template), while the beta field 1254 is interpreted as a data manipulation field 1254C, whose content distinguishes which one of a number of data manipulation operations (also known as primitives) is to be performed (e.g., no manipulation; broadcast; up conversion of a source; and down conversion of a destination). The memory access 1220 instruction templates include the scale field 1260, and optionally the displacement field 1262A or the displacement scale field 1262B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1252 is interpreted as a write mask control (Z) field 1252C, whose content distinguishes whether the write masking controlled by the write mask field 1270 should be a merging or a zeroing.

In the case of the non-memory access 1205 instruction templates of class B, part of the beta field 1254 is interpreted as an RL field 1257A, whose content distinguishes which one of the different augmentation operation types are to be performed (e.g., round 1257A.1 and vector length (VSIZE) 1257A.2 are respectively specified for the no memory access, write mask control, partial round control type operation 1212 instruction template and the no memory access, write mask control, VSIZE type operation 1217 instruction template), while the rest of the beta field 1254 distinguishes which of the operations of the specified type is to be performed. In the no memory access 1205 instruction templates, the scale field 1260, the displacement field 1262A, and the displacement scale field 1262B are not present.

In the no memory access, write mask control, partial round control type operation 1210 instruction template, the rest of the beta field 1254 is interpreted as a round operation field 1259A and exception event reporting is disabled (a given instruction does not report any kind of floating-point exception flag and does not raise any floating point exception handler).

Round operation control field 1259A—just as round operation control field 1258, its content distinguishes which one of a group of rounding operations to perform (e.g., Round-up, Round-down, Round-towards-zero and Round-to-nearest). Thus, the round operation control field 1259A allows for the changing of the rounding mode on a per instruction basis. In one embodiment of the disclosure where a processor includes a control register for specifying rounding modes, the round operation control field's 1258 content overrides that register value.

In the no memory access, write mask control, VSIZE type operation 1217 instruction template, the rest of the beta field 1254 is interpreted as a vector length field 1259B, whose content distinguishes which one of a number of data vector lengths is to be performed on (e.g., 128, 256, or 512 byte).

In the case of a memory access 1220 instruction template of class B, part of the beta field 1254 is interpreted as a broadcast field 1257B, whose content distinguishes whether or not the broadcast type data manipulation operation is to be performed, while the rest of the beta field 1254 is interpreted the vector length field 1259B. The memory access 1220 instruction templates include the scale field 1260, and optionally the displacement field 1262A or the displacement scale field 1262B.

With regard to the generic vector friendly instruction format 1200, a full opcode field 1274 is shown including the format field 1240, the base operation field 1242, and the data element width field 1264. While one embodiment is shown where the full opcode field 1274 includes all of these fields, the full opcode field 1274 includes less than all of these fields in embodiments that do not support all of them. The full opcode field 1274 provides the operation code (opcode).

The augmentation operation field 1250, the data element width field 1264, and the write mask field 1270 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 13 is a block diagram illustrating an exemplary specific vector friendly instruction format according to embodiments of the disclosure. FIG. 13 shows a specific vector friendly instruction format 1300 that is specific in the sense that it specifies the location, size, interpretation, and order of the fields, as well as values for some of those fields. The specific vector friendly instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 12 into which the fields from FIG. 13 map are illustrated.

It should be understood that, although embodiments of the disclosure are described with reference to the specific vector friendly instruction format 1300 in the context of the generic vector friendly instruction format 1200 for illustrative purposes, the disclosure is not limited to the specific vector friendly instruction format 1300 except where claimed. For example, the generic vector friendly instruction format 1200 contemplates a variety of possible sizes for the various fields, while the specific vector friendly instruction format 1300 is shown as having fields of specific sizes. By way of specific example, while the data element width field 1264 is illustrated as a one bit field in the specific vector friendly instruction format 1300, the disclosure is not so limited (that is, the generic vector friendly instruction format 1200 contemplates other sizes of the data element width field 1264).

The generic vector friendly instruction format 1200 includes the following fields listed below in the order illustrated in FIG. 13A.

EVEX Prefix (Bytes 0-3) 1302—is encoded in a four-byte form.

Format Field 1240 (EVEX Byte 0, bits [7:0])—the first byte (EVEX Byte 0) is the format field 1240 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]—R), EVEX.X bit field (EVEX byte 1, bit [6]—X), and 1257BEX byte 1, bit[5]—B). The EVEX.R, EVEX.X, and EVEX.B bit fields provide the same functionality as the corresponding VEX bit fields, and are encoded using is complement form, i.e. ZMMO is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]—mmmm)—its content encodes an implied leading opcode byte (0F, 0F 38, or 0F 3).

Data element width field 1264 (EVEX byte 2, bit [7]—W)—is represented by the notation EVEX.W. EVEX.W is used to define the granularity (size) of the datatype (either 32-bit data elements or 64-bit data elements).

EVEX.vvvv 1320 (EVEX Byte 2, bits [6:3]—vvvv)—the role of EVEX.vvvv may include the following: 1) EVEX.vvvv encodes the first source register operand, specified in inverted (Is complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 111 lb. Thus, EVEX.vvvv field 1320 encodes the 4 low-order bits of the first source register specifier stored in inverted (is complement) form. Depending on the instruction, an extra different EVEX bit field is used to extend the specifier size to 32 registers.

EVEX.U 1268 Class field (EVEX byte 2, bit [2]—U)—If EVEX.U=0, it indicates class A or EVEX.U0; if EVEX.U=1, it indicates class B or EVEX.U1.

Prefix encoding field 1325 (EVEX byte 2, bits [1.0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMID prefix (66H, F2H, F3H) in both the legacy format and in the EVEX prefix format, these legacy SIMID prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1252 (EVEX byte 3, bit [7]—EH; also known as EVEX.EH, EVEX.rs, EVEX.RL, EVEX.write mask control, and EVEX.N; also illustrated with a)—as previously described, this field is context specific.

Beta field 1254 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1210—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1270 (EVEX byte 3, bits [2:0]—kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1330 (Byte 4) is also known as the opcode byte. Part of the opcode is specified in this field.

MOD R/M Field 1340 (Byte 5) includes MOD field 1342, Reg field 1344, and R/M field 1346. As previously described, the MOD field's 1342 content distinguishes between memory access and non-memory access operations. The role of Reg field 1344 can be summarized to two situations: encoding either the destination register operand or a source register operand, or be treated as an opcode extension and not used to encode any instruction operand. The role of R/M field 1346 may include the following: encoding the instruction operand that references a memory address, or encoding either the destination register operand or a source register operand.

Scale, Index, Base (SIB) Byte (Byte 6)—As previously described, the scale field's 1260 content is used for memory address generation. SIB.xxx 1354 and SIB.bbb 1356—the contents of these fields have been previously referred to with regard to the register indexes Xxxx and Bbbb.

Displacement field 1262A (Bytes 7-10)—when MOD field 1342 contains 10, bytes 7-10 are the displacement field 1262A, and it works the same as the legacy 32-bit displacement (disp32) and works at byte granularity.

Displacement factor field 1262B (Byte 7)—when MOD field 1342 contains 01, byte 7 is the displacement factor field 1262B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1262B is a reinterpretation of disp8; when using displacement factor field 1262B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1262B substitutes the legacy x86 instruction set 8-bit displacement. Thus, the displacement factor field 1262B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1272 operates as previously described.

Full Opcode Field

FIG. 13B is a block diagram illustrating the fields of the specific vector friendly instruction format 1300 that make up the full opcode field 1274 according to one embodiment of the disclosure. Specifically, the full opcode field 1274 includes the format field 1240, the base operation field 1242, and the data element width (W) field 1264. The base operation field 1242 includes the prefix encoding field 1325, the opcode map field 1315, and the real opcode field 1330.

Register Index Field

FIG. 13C is a block diagram illustrating the fields of the specific vector friendly instruction format 1300 that make up the register index field 1244 according to one embodiment of the disclosure. Specifically, the register index field 1244 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
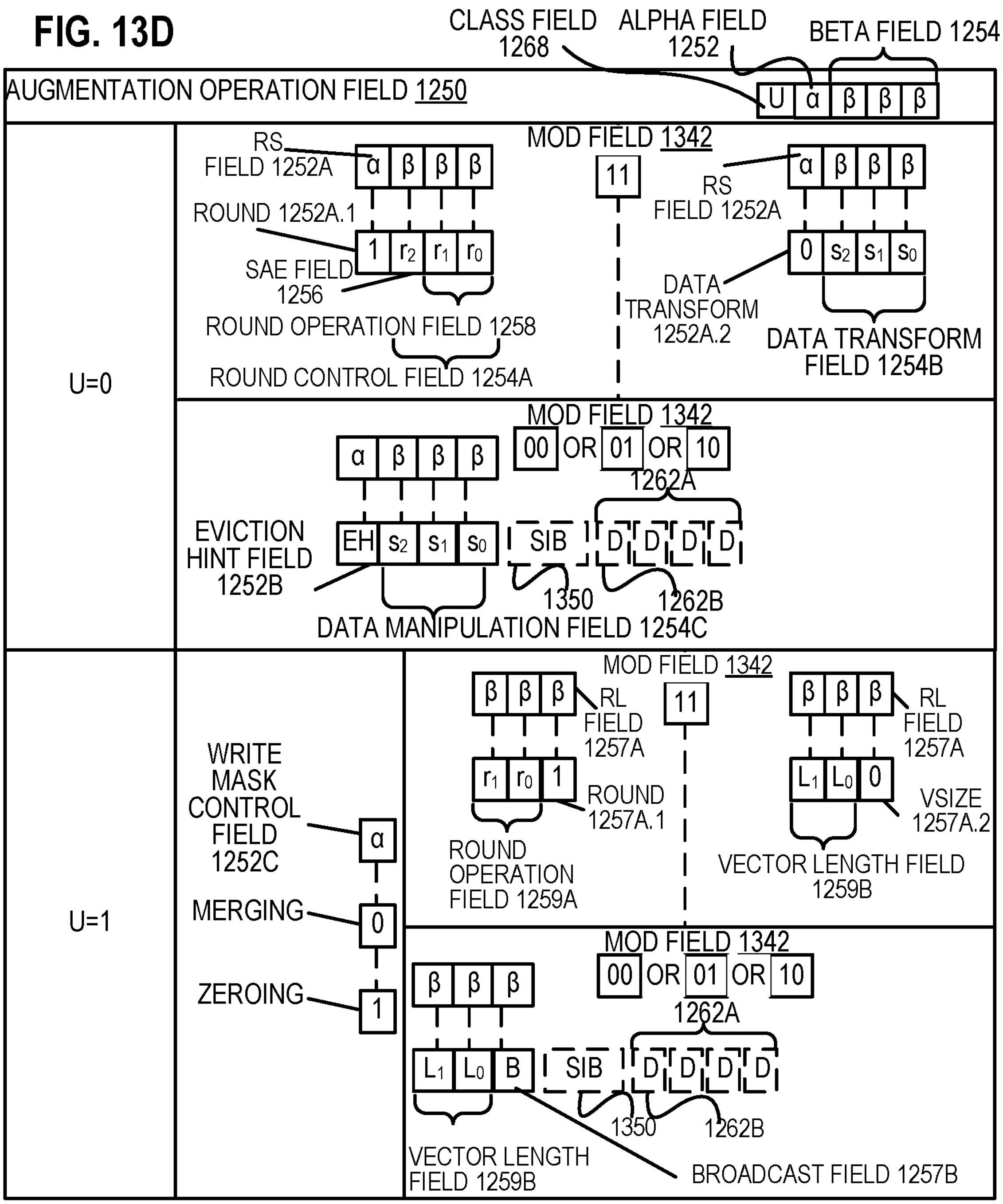
FIG. 13D is a block diagram illustrating the fields of the specific vector friendly instruction format in FIG. 13A that make up the augmentation operation field 1250 according to one embodiment of the disclosure.

FIG. 13D is a block diagram illustrating the fields of the specific vector friendly instruction format 1300 that make up the augmentation operation field 1250 according to one embodiment of the disclosure. When the class (U) field 1268 contains 0, it signifies EVEX.U0 (class A 1268A); when it contains 1, it signifies EVEX.U1 (class B 1268B). When U=0 and the MOD field 1342 contains 11 (signifying a no memory access operation), the alpha field 1252 (EVEX byte 3, bit [7]—EH) is interpreted as the rs field 1252A. When the rs field 1252A contains a 1 (round 1252A.1), the beta field 1254 (EVEX byte 3, bits [6:4]—SSS) is interpreted as the round control field 1254A. The round control field 1254A includes a one bit SAE field 1256 and a two bit round operation field 1258. When the rs field 1252A contains a 0 (data transform 1252A.2), the beta field 1254 (EVEX byte 3, bits [6:4]—SSS) is interpreted as a three bit data transform field 1254B. When U=0 and the MOD field 1342 contains 00, 01, or 10 (signifying a memory access operation), the alpha field 1252 (EVEX byte 3, bit [7]—EH) is interpreted as the eviction hint (EH) field 1252B and the beta field 1254 (EVEX byte 3, bits [6:4]—SSS) is interpreted as a three bit data manipulation field 1254C.

When U=1, the alpha field 1252 (EVEX byte 3, bit [7]—EH) is interpreted as the write mask control (Z) field 1252C. When U=1 and the MOD field 1342 contains 11 (signifying a no memory access operation), part of the beta field 1254 (EVEX byte 3, bit [4]—$S_0$) is interpreted as the RL field 1257A; when it contains a 1 (round 1257A.1) the rest of the beta field 1254 (EVEX byte 3, bit [6-5]—$S_{2-1}$) is interpreted as the round operation field 1259A, while when the RL field 1257A contains a 0 (VSIZE 1257.A2) the rest of the beta field 1254 (EVEX byte 3, bit [6-5]—$S_{2-1}$) is interpreted as the vector length field 1259B (EVEX byte 3, bit [6-5]—$L_{1-0}$). When U=1 and the MOD field 1342 contains 00, 01, or 10 (signifying a memory access operation), the beta field 1254 (EVEX byte 3, bits [6:4]—SSS) is interpreted as the vector length field 1259B (EVEX byte 3, bit [6-5]—$L_{1-0}$) and the broadcast field 1257B (EVEX byte 3, bit [4]—B).

Exemplary Register Architecture

Figure 14:
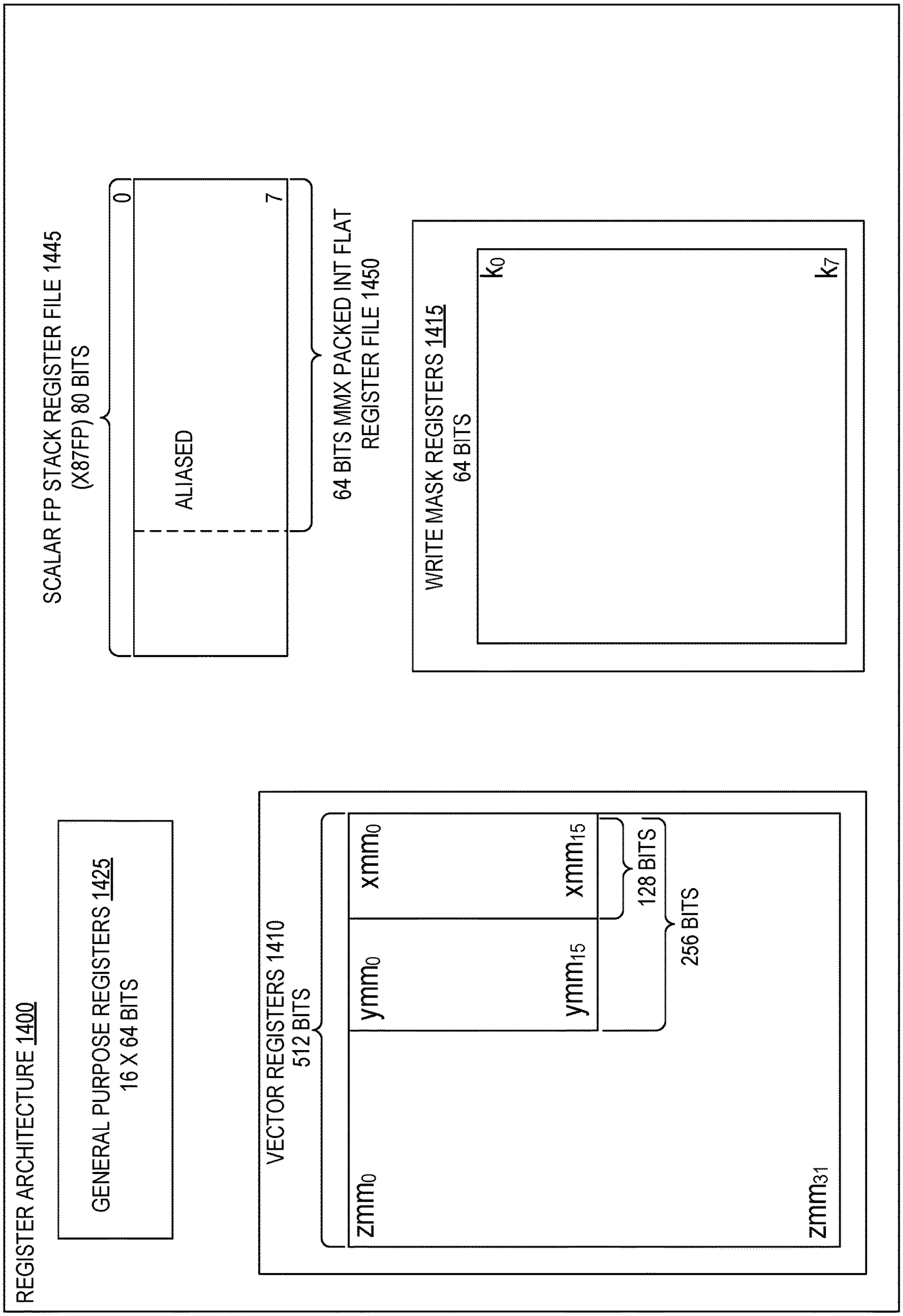
FIG. 14 is a block diagram of a register architecture according to one embodiment of the disclosure

FIG. 14 is a block diagram of a register architecture 1400 according to one embodiment of the disclosure. In the embodiment illustrated, there are 32 vector registers 1410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1300 operates on these overlaid register file as illustrated in the below tables.

| Adjustable Vector Length | Class | Operations | Registers |
|---|---|---|---|
| Instruction Templates that do not include the vector length field 1259 B | A (FIG. 12A; U = 0) | 1210, 1215, 1225, 1230 | zmm registers (the vector length is 64 byte) |
| | B (FIG. 12B; U = 1) | 1212 | zmm registers (the vector length is 64 byte) |
| Instruction templates that do include the vector length field 1259 B | B (FIG. 12B; U = 1) | 1217, 1227 | zmm, ymm, or xmm registers (the vector length is 64 byte, 32 byte, or 16 byte) depending on the vector length field 1259 B |

In other words, the vector length field 1259B selects between a maximum length an one or more other shorter lengths, where each such shorter length is half the length of the preceding length; and instructions templates without the vector length field 1259B operate on the maximum vector length. Further, in one embodiment, the class B instruction templates of the specific vector friendly instruction format 1300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1415—in the embodiment illustrated, there are 8 write mask registers (k0 through k7), each 64 bits in size. In an alternate embodiment, the write mask registers 1415 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 15A is a block diagram illustrating both an exemplary in-order pipeline and an exemplary register renaming, out-of-order issue/execution pipeline according to embodiments of the disclosure. FIG. 15B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macro-instructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 16B:
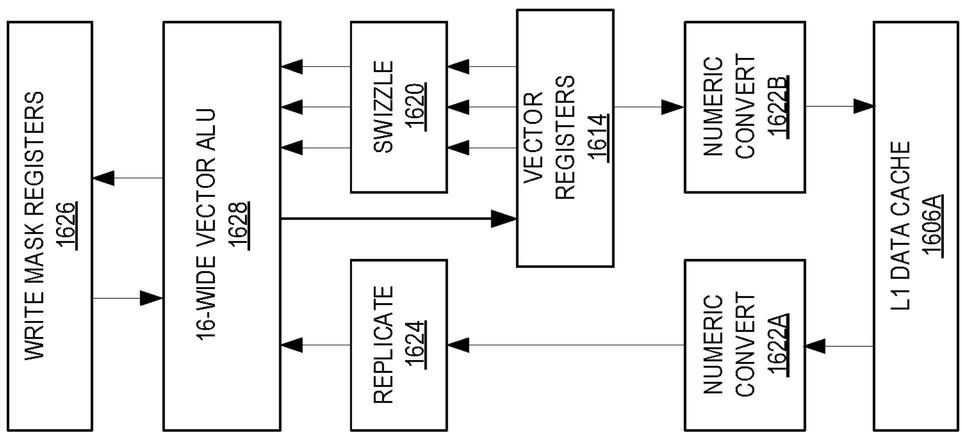
FIG. 16B is an expanded view of part of the processor core in FIG. 16A according to embodiments of the disclosure.
Figure 16A:
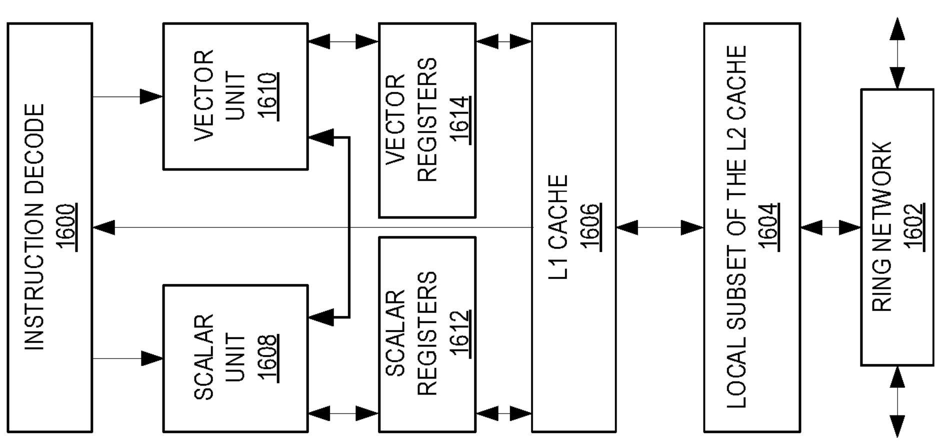
FIG. 16A is a block diagram of a single processor core, along with its connection to the on-die interconnect network and with its local subset of the Level 2 (L2) cache, according to embodiments of the disclosure.

FIGS. 16A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 16A is a block diagram of a single processor core, along with its connection to the on-die interconnect network (e.g., ring network 1602 in FIG. 16A) and with its local subset of the Level 2 (L2) cache 1604, according to embodiments of the disclosure. In one embodiment, an instruction decode unit 1600 supports the x86 instruction set with a packed data instruction set extension. An L1 cache 1606 allows low-latency accesses to cache memory into the scalar and vector units. While in one embodiment (to simplify the design), a scalar unit 1608 and a vector unit 1610 use separate register sets (respectively, scalar registers 1612 and vector registers 1614) and data transferred between them is written to memory and then read back in from a level 1 (L1) cache 1606, alternative embodiments of the disclosure may use a different approach (e.g., use a single register set or include a communication path that allow data to be transferred between the two register files without being written and read back).

The local subset of the L2 cache 1604 is part of a global L2 cache that is divided into separate local subsets, one per processor core. Each processor core has a direct access path to its own local subset of the L2 cache 1604. Data read by a processor core is stored in its L2 cache subset 1604 and can be accessed quickly, in parallel with other processor cores accessing their own local L2 cache subsets. Data written by a processor core is stored in its own L2 cache subset 1604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 16B is an expanded view of part of the processor core in FIG. 16A according to embodiments of the disclosure. FIG. 16B includes an L1 data cache 1606A part of the L1 cache 1606, as well as more detail regarding the vector unit 1610 and the vector registers 1614. Specifically, the vector unit 1610 is a 16-wide vector processing unit (VPU) (see the 16-wide ALU 1628), which executes one or more of integer, single-precision float, and double-precision float instructions. The VPU supports swizzling the register inputs with swizzle unit 1620, numeric conversion with numeric convert units 1622A-B, and replication with replication unit 1624 on the memory input. Write mask registers 1626 allow predicating resulting vector writes.

Figure 17:
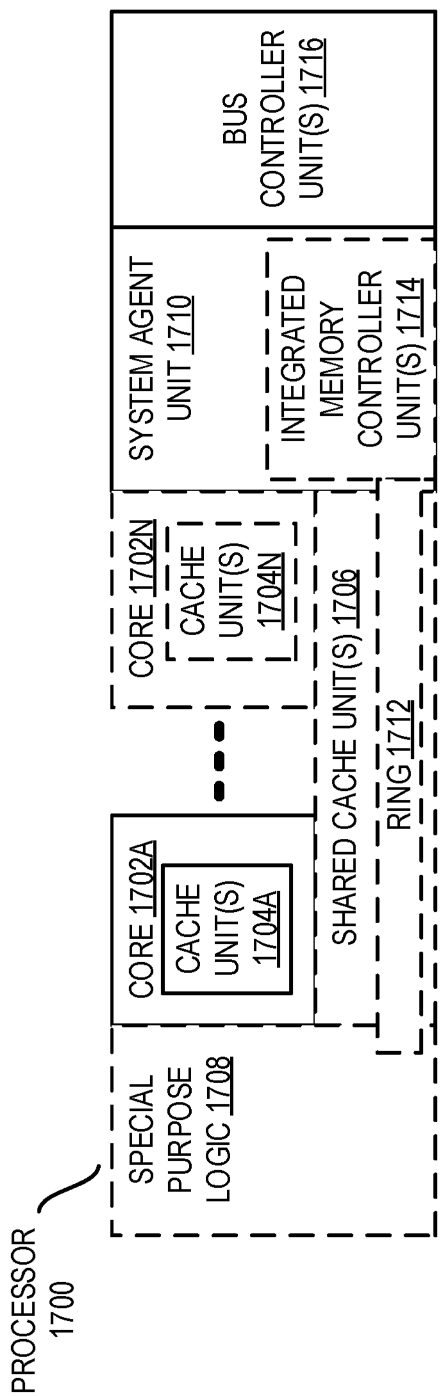
FIG. 17 is a block diagram of a processor that may have more than one core, may have an integrated memory controller, and may have integrated graphics according to embodiments of the disclosure.

FIG. 17 is a block diagram of a processor 1700 that may have more than one core, may have an integrated memory controller, and may have integrated graphics according to embodiments of the disclosure. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores. Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the special purpose logic 1708 (e.g., integrated graphics logic), the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multithreading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the special purpose logic 1708 (e.g., integrated graphics logic). The display unit is for driving one or more externally connected displays.

The cores 1702A-N may be homogenous or heterogeneous in terms of architecture instruction set; that is, two or more of the cores 1702A-N may be capable of executing the same instruction set, while others may be capable of executing only a subset of that instruction set or a different instruction set.

Exemplary Computer Architectures

FIGS. 18-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 18:
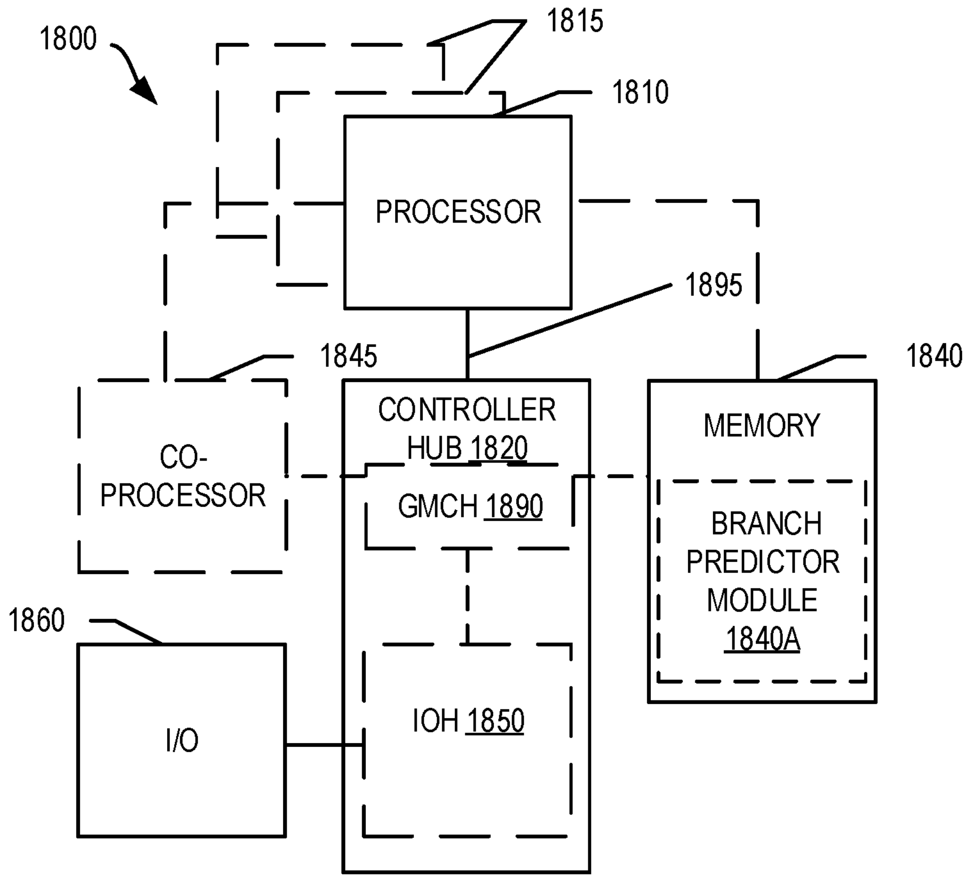
FIG. 18 is a block diagram of a system in accordance with one embodiment of the present disclosure.

Referring now to FIG. 18, shown is a block diagram of a system 1800 in accordance with one embodiment of the present disclosure. The system 1800 may include one or more processors 1810, 1815, which are coupled to a controller hub 1820. In one embodiment the controller hub 1820 includes a graphics memory controller hub (GMCH) 1890 and an Input/Output Hub (IOH) 1850 (which may be on separate chips); the GMCH 1890 includes memory and graphics controllers to which are coupled memory 1840 and a coprocessor 1845; the IOH 1850 couples input/output (I/O) devices 1860 to the GMCH 1890. Alternatively, one or both of the memory and graphics controllers are integrated within the processor (as described herein), the memory 1840 and the coprocessor 1845 are coupled directly to the processor 1810, and the controller hub 1820 in a single chip with the IOH 1850. Memory 1840 may include a branch predictor module 1840A, for example, to store code that when executed causes a processor to perform any method of this disclosure.

The optional nature of additional processors 1815 is denoted in FIG. 18 with broken lines. Each processor 1810, 1815 may include one or more of the processing cores described herein and may be some version of the processor 1700.

The memory 1840 may be, for example, dynamic random access memory (DRAM), phase change memory (PCM), or a combination of the two. For at least one embodiment, the controller hub 1820 communicates with the processor(s) 1810, 1815 via a multi-drop bus, such as a frontside bus (FSB), point-to-point interface such as Quickpath Interconnect (QPI), or similar connection 1895.

In one embodiment, the coprocessor 1845 is a special-purpose processor, such as, for example, a high-throughput MIC processor, a network or communication processor, compression engine, graphics processor, GPGPU, embedded processor, or the like. In one embodiment, controller hub 1820 may include an integrated graphics accelerator.

There can be a variety of differences between the physical resources of processors 1810 and 1815 in terms of a spectrum of metrics of merit including architectural, microarchitectural, thermal, power consumption characteristics, and the like.

In one embodiment, the processor 1810 executes instructions that control data processing operations of a general type. Embedded within the instructions may be coprocessor instructions. The processor 1810 recognizes these coprocessor instructions as being of a type that should be executed by the attached coprocessor 1845. Accordingly, the processor 1810 issues these coprocessor instructions (or control signals representing coprocessor instructions) on a coprocessor bus or other interconnect, to coprocessor 1845. Coprocessor(s) 1845 accept and execute the received coprocessor instructions.

Figure 19:
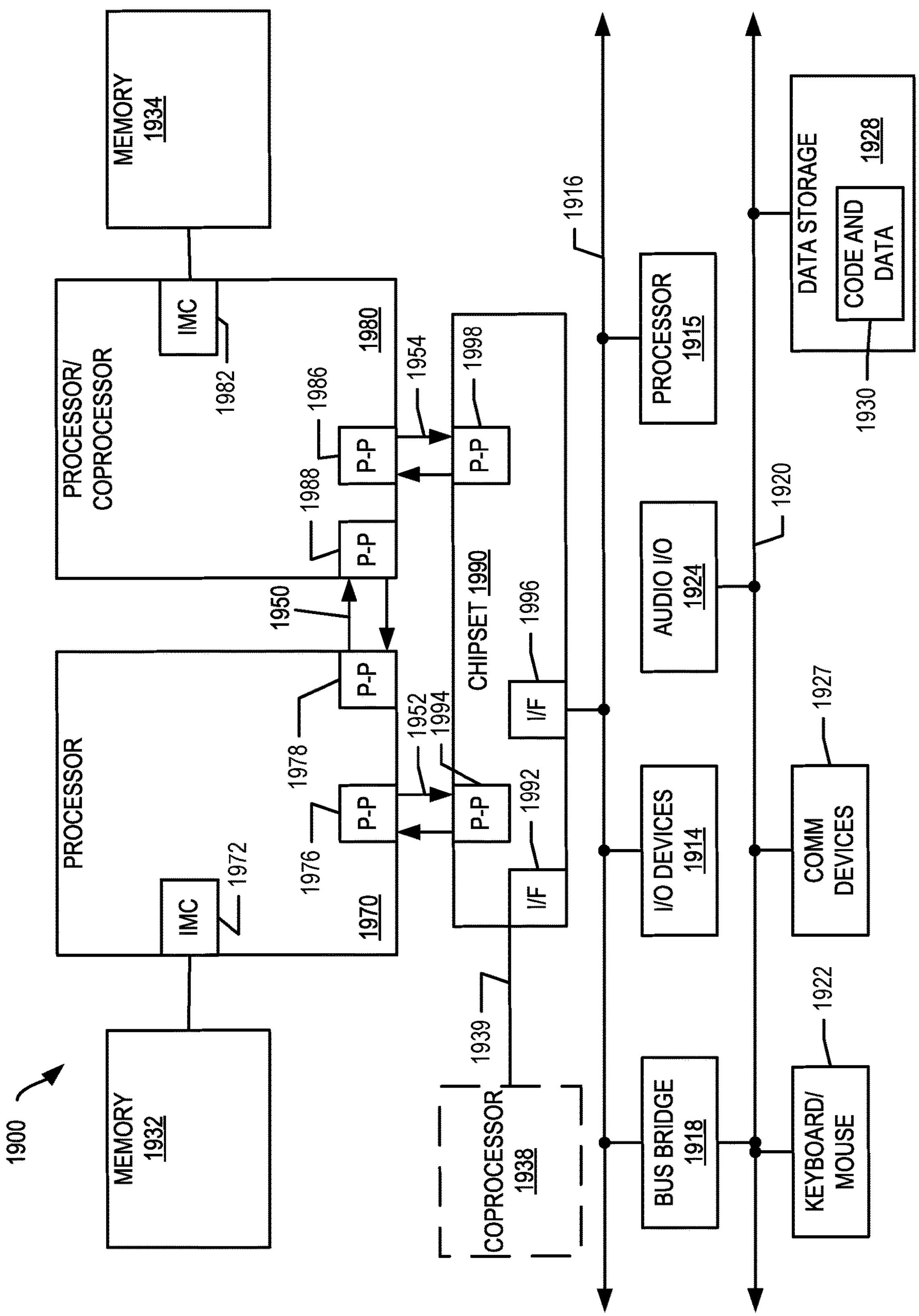
FIG. 19 is a block diagram of a more specific exemplary system in accordance with an embodiment of the present disclosure.

Referring now to FIG. 19, shown is a block diagram of a first more specific exemplary system 1900 in accordance with an embodiment of the present disclosure. As shown in FIG. 19, multiprocessor system 1900 is a point-to-point interconnect system, and includes a first processor 1970 and a second processor 1980 coupled via a point-to-point interconnect 1950. Each of processors 1970 and 1980 may be some version of the processor 1700. In one embodiment of the disclosure, processors 1970 and 1980 are respectively processors 1810 and 1815, while coprocessor 1938 is coprocessor 1845. In another embodiment, processors 1970 and 1980 are respectively processor 1810 and coprocessor 1845.

Processors 1970 and 1980 are shown including integrated memory controller (IMC) units 1972 and 1982, respectively. Processor 1970 also includes as part of its bus controller units point-to-point (P-P) interfaces 1976 and 1978; similarly, second processor 1980 includes P-P interfaces 1986 and 1988. Processors 1970, 1980 may exchange information via a point-to-point (P-P) interface 1950 using P-P interface circuits 1978, 1988. As shown in FIG. 19, IMCs 1972 and 1982 couple the processors to respective memories, namely a memory 1932 and a memory 1934, which may be portions of main memory locally attached to the respective processors.

Processors 1970, 1980 may each exchange information with a chipset 1990 via individual P-P interfaces 1952, 1954 using point to point interface circuits 1976, 1994, 1986, 1998. Chipset 1990 may optionally exchange information with the coprocessor 1938 via a high-performance interface 1939. In one embodiment, the coprocessor 1938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1990 may be coupled to a first bus 1916 via an interface 1996. In one embodiment, first bus 1916 may be a Peripheral Component Interconnect (PCI) bus, or a bus such as a PCI Express bus or another third generation I/O interconnect bus, although the scope of the present disclosure is not so limited.

As shown in FIG. 19, various I/O devices 1914 may be coupled to first bus 1916, along with a bus bridge 1918 which couples first bus 1916 to a second bus 1920. In one embodiment, one or more additional processor(s) 1915, such as coprocessors, high-throughput MIC processors, GPGPU's, accelerators (such as, e.g., graphics accelerators or digital signal processing (DSP) units), field programmable gate arrays, or any other processor, are coupled to first bus 1916. In one embodiment, second bus 1920 may be a low pin count (LPC) bus. Various devices may be coupled to a second bus 1920 including, for example, a keyboard and/or mouse 1922, communication devices 1927 and a storage unit 1928 such as a disk drive or other mass storage device which may include instructions/code and data 1930, in one embodiment. Further, an audio I/O 1924 may be coupled to the second bus 1920. Note that other architectures are possible. For example, instead of the point-to-point architecture of FIG. 19, a system may implement a multi-drop bus or other such architecture.

Figure 20:
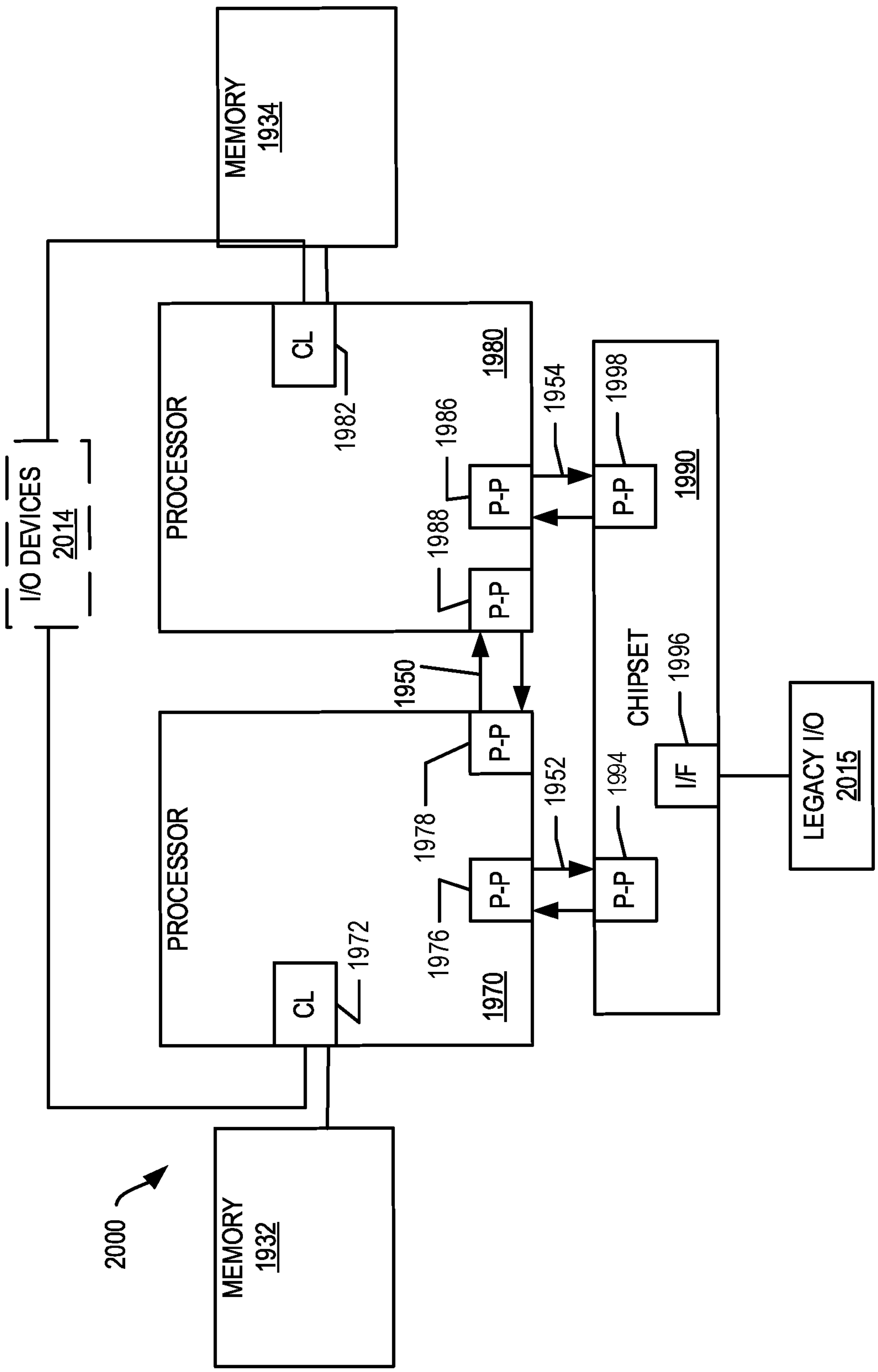
FIG. 20, shown is a block diagram of a second more specific exemplary system in accordance with an embodiment of the present disclosure.

Referring now to FIG. 20, shown is a block diagram of a second more specific exemplary system 2000 in accordance with an embodiment of the present disclosure. Like elements in FIGS. 19 and 20 bear like reference numerals, and certain aspects of FIG. 19 have been omitted from FIG. 20 in order to avoid obscuring other aspects of FIG. 20.

FIG. 20 illustrates that the processors 1970, 1980 may include integrated memory and I/O control logic ("CL") 1972 and 1982, respectively. Thus, the CL 1972, 1982 include integrated memory controller units and include I/O control logic. FIG. 20 illustrates that not only are the memories 1932, 1934 coupled to the CL 1972, 1982, but also that I/O devices 2014 are also coupled to the control logic 1972, 1982. Legacy I/O devices 2015 are coupled to the chipset 1990.

Figure 21:
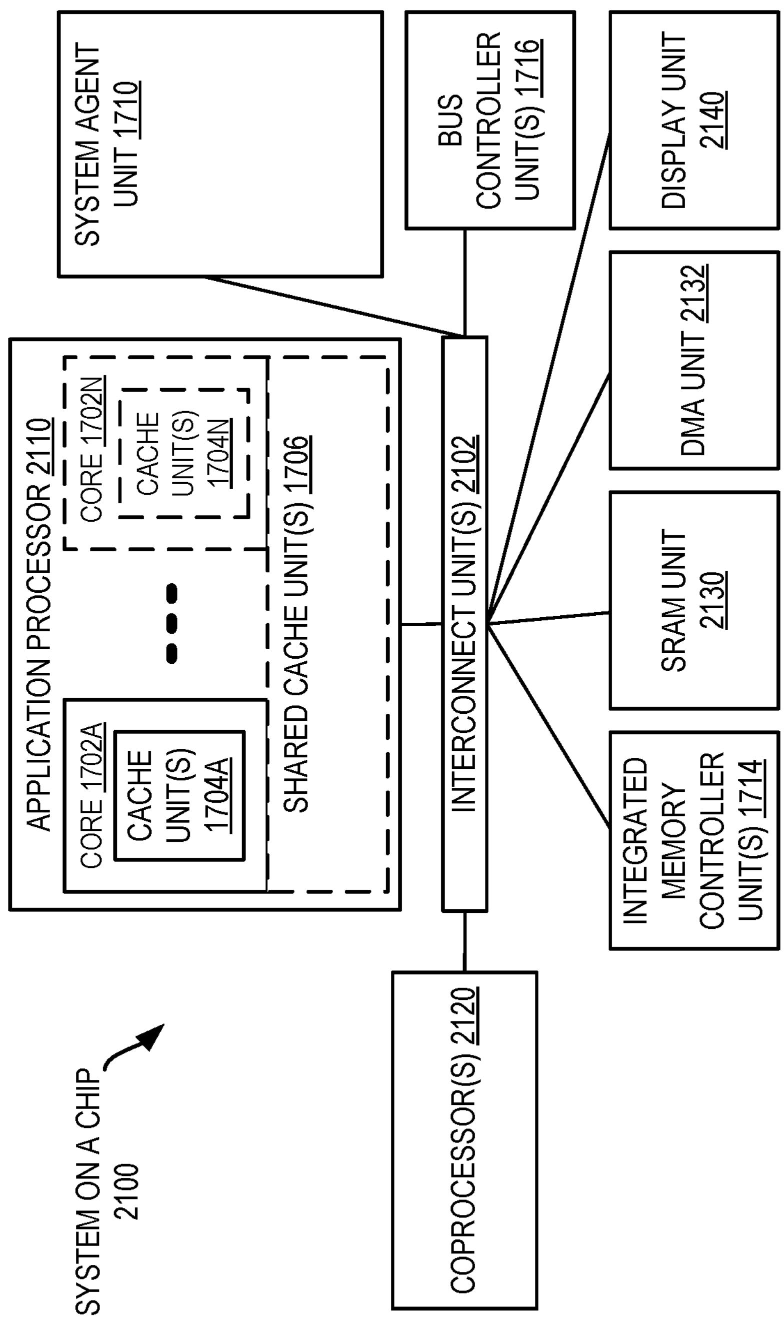
FIG. 21, shown is a block diagram of a system on a chip (SoC) in accordance with an embodiment of the present disclosure.

Referring now to FIG. 21, shown is a block diagram of a SoC 2100 in accordance with an embodiment of the present disclosure. Similar elements in FIG. 17 bear like reference numerals. Also, dashed lined boxes are optional features on more advanced SoCs. In FIG. 21, an interconnect unit(s) 2102 is coupled to: an application processor 2110 which includes a set of one or more cores 1702A-N and shared cache unit(s) 1706; a system agent unit 1710; a bus controller unit(s) 1716; an integrated memory controller unit(s) 1714; a set or one or more coprocessors 2120 which may include integrated graphics logic, an image processor, an audio processor, and a video processor; an static random access memory (SRAM) unit 2130; a direct memory access (DMA) unit 2132; and a display unit 2140 for coupling to one or more external displays. In one embodiment, the coprocessor(s) 2120 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code in code and data 1930 illustrated in FIG. 19, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 22:
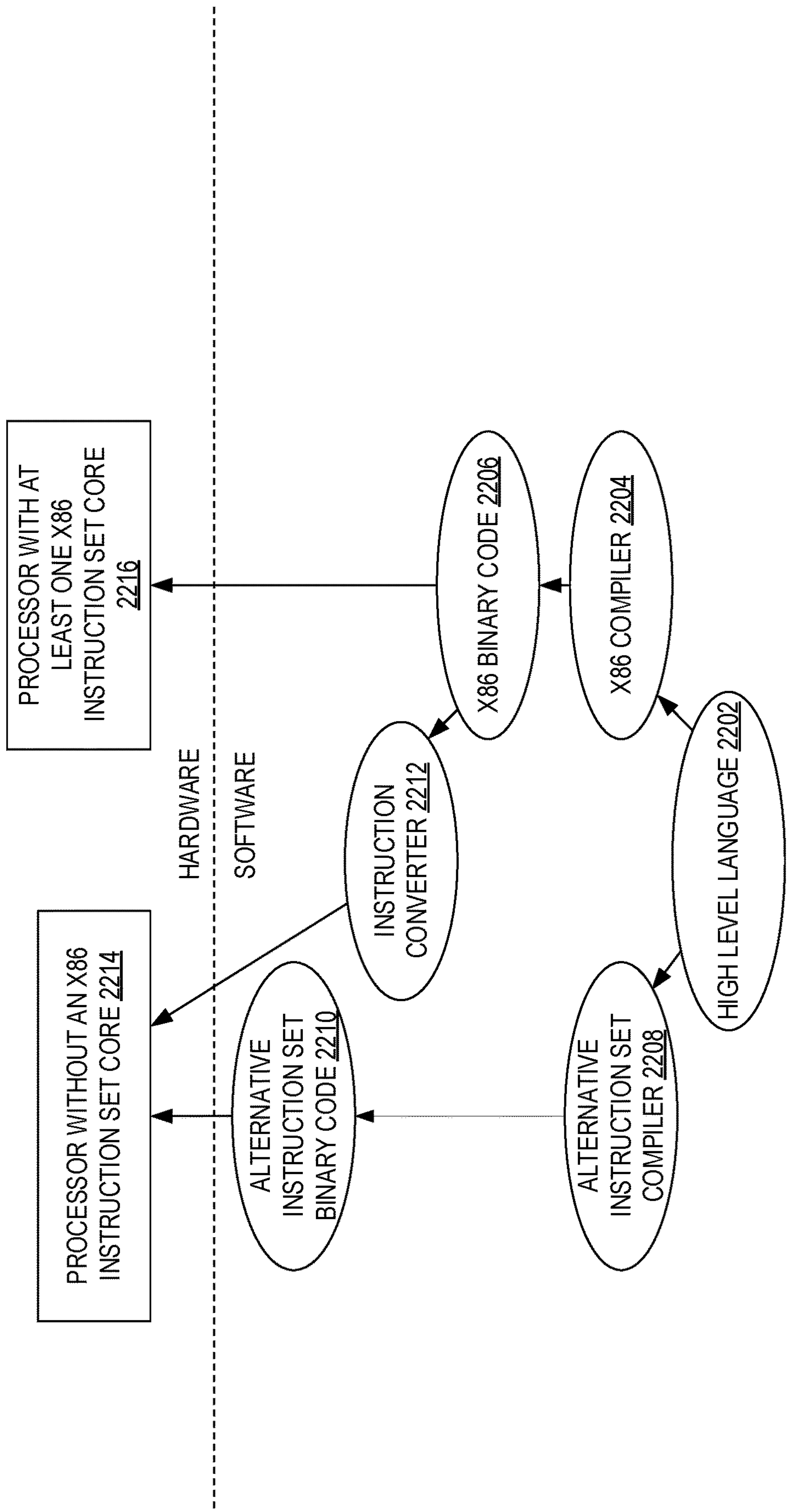
FIG. 22 is a block diagram contrasting the use of a software instruction converter to convert binary instructions in a source instruction set to binary instructions in a target instruction set according to embodiments of the disclosure.

FIG. 22 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 22 shows a program in a high level language 2202 may be compiled using an x86 compiler 2204 to generate x86 binary code 2206 that may be natively executed by a processor with at least one x86 instruction set core 2216. The processor with at least one x86 instruction set core 2216 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2204 represents a compiler that is operable to generate x86 binary code 2206 (e.g., object code) that can, with or without additional linkage processing, be executed on the processor with at least one x86 instruction set core 2216. Similarly, FIG. 22 shows the program in the high level language 2202 may be compiled using an alternative instruction set compiler 2208 to generate alternative instruction set binary code 2210 that may be natively executed by a processor without at least one x86 instruction set core 2214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2212 is used to convert the x86 binary code 2206 into code that may be natively executed by the processor without an x86 instruction set core 2214. This converted code is not likely to be the same as the alternative instruction set binary code 2210 because an instruction converter capable of this is difficult to make; however, the converted code will accomplish the general operation and be made up of instructions from the alternative instruction set. Thus, the instruction converter 2212 represents software, firmware, hardware, or a combination thereof that, through emulation, simulation or any other process, allows a processor or other electronic device that does not have an x86 instruction set processor or core to execute the x86 binary code 2206.

What is claimed is:

1. A processor core comprising:

at least one logical core;

a branch predictor to predict a target instruction of an indirect branch instruction;

an instruction execution pipeline to perform at least one data fetch operation for the target instruction before execution of the target instruction; and a model specific register to store an indirect branch restricted speculation bit for a first logical core of the at least one logical core that, when set to a value after a transition of the first logical core to a more privileged predictor mode, prevents the branch predictor from predicting, based on software executed in a less privileged predictor mode by any of the at least one logical core, the target instruction of the indirect branch instruction for the first logical core, and, when set to the value after the transition of the first logical core to the more privileged predictor mode, allows the branch predictor to predict a second target instruction of a second indirect branch instruction based on software executed in the more privileged predictor mode.

2. The processor core of claim 1, wherein the at least one logical core is a plurality of logical cores, and a respective indirect branch restricted speculation bit being set in the model specific register for a logical core of the plurality of logical cores prevents the branch predictor from predicting the target instruction of the indirect branch instruction for the logical core of the plurality of logical cores based on software executed by the other of the plurality of logical cores.

3. The processor core of claim 1, wherein, when the indirect branch instruction is executed in an enclave, the branch predictor is prevented from predicting the target instruction, for the indirect branch instruction executed in the enclave, based on software executed outside the enclave by any of the at least one logical core.

4. The processor core of claim 1, wherein, when the indirect branch instruction is executed in a system-management mode after a system-management interrupt, the branch predictor is prevented from predicting the target instruction, for the indirect branch instruction executed in the system-management mode after the system-management interrupt, based on software executed in the system-management mode by any of the at least one logical core.

5. The processor core of claim 1, wherein the processor core is to clear the set indirect branch restricted speculation bit for the first logical core in the model specific register prior to entering a sleep state.

6. The processor core of claim 5, wherein the processor core is to re-set the cleared indirect branch restricted speculation bit for the first logical core in the model specific register after wakeup from the sleep state.

7. The processor core of claim 1, wherein the indirect branch restricted speculation bit being set before the transition to the more privileged predictor mode prevents the branch predictor from predicting the target instruction for the first logical core based on software executed, before the transition, in the less privileged predictor mode by any of the at least one logical core.

8. The processor core of claim 1, wherein the indirect branch restricted speculation bit being set after the transition to the more privileged predictor mode also prevents the branch predictor from predicting the target instruction for the first logical core based on software executed in a less privileged predictor mode by any of the at least one logical core for a later, second transition of the first logical core to the more privileged predictor mode.

9. A method comprising:

transitioning a first logical core of at least one logical core of a processor core of a processor to a more privileged predictor mode from a less privileged predictor mode;

setting an indirect branch restricted speculation bit for the first logical core in a model specific register of the processor to a value after the transitioning of the first logical core to the more privileged predictor mode to prevent a branch predictor of the processor from predicting, based on software executed in the less privileged predictor mode by any of the at least one logical core, a target instruction of an indirect branch instruction for the first logical core, and allow the branch predictor to predict a second target instruction of a second indirect branch instruction based on software executed in the more privileged predictor mode when the indirect branch restricted speculation bit is set to the value after the transitioning of the first logical core to the more privileged predictor mode; and performing at least one data fetch operation with an instruction execution pipeline of the processor core for the target instruction before execution of the target instruction by the first logical core.

10. The method of claim 9, wherein the at least one logical core is a plurality of logical cores, further comprising setting a respective indirect branch restricted speculation bit in the model specific register for a logical core of the plurality of logical cores to prevent the branch predictor from predicting the target instruction of the indirect branch instruction for the logical core of the plurality of logical cores based on software executed by the other of the plurality of logical cores.

11. The method of claim 9, further comprising, when the indirect branch instruction is executed in an enclave, preventing the branch predictor from predicting the target instruction, for the indirect branch instruction executed in the enclave, based on software executed outside the enclave by any of the at least one logical core.

12. The method of claim 9, further comprising, when the indirect branch instruction is executed in a system-management mode after a system-management interrupt, preventing the branch predictor from predicting the target instruction, for the indirect branch instruction executed in the system-management mode after the system-management interrupt, based on software executed in the system-management mode by any of the at least one logical core.

13. The method of claim 9, further comprising clearing the set indirect branch restricted speculation bit for the first logical core in the model specific register prior to entering a sleep state.

14. The method of claim 13, further comprising re-setting the cleared indirect branch restricted speculation bit for the first logical core in the model specific register after wakeup from the sleep state.

15. The method of claim 9, wherein the setting of the indirect branch restricted speculation bit in the model specific register after the transitioning to the more privileged predictor mode prevents the branch predictor from predicting the target instruction for the first logical core based on software executed, before the transitioning, in the less privileged predictor mode by any of the at least one logical core.

16. The method of claim 9, wherein the setting of the indirect branch restricted speculation bit in the model specific register after the transitioning to the more privileged predictor mode also prevents the branch predictor from predicting the target instruction for the first logical core based on software executed in a less privileged predictor mode by any of the at least one logical core for a later, second transition of the first logical core to the more privileged predictor mode.

17. A non-transitory machine readable medium that stores code that when executed by a machine causes the machine to perform a method comprising:

transitioning a first logical core of at least one logical core of a processor core of a processor to a more privileged predictor mode from a less privileged predictor mode;

setting an indirect branch restricted speculation bit for the first logical core in a model specific register of the processor to a value after the transitioning of the first logical core to the more privileged predictor mode to prevent, a branch predictor of the processor from predicting, based on software executed in the less privileged predictor mode by any of the at least one logical core, a target instruction of an indirect branch instruction for the first logical core, and allow the branch predictor to predict a second target instruction of a second indirect branch instruction based on software executed in the more privileged predictor mode when the indirect branch restricted speculation bit is set to the value after the transitioning of the first logical core to the more privileged predictor mode; and performing at least one data fetch operation with an instruction execution pipeline of the processor core for the target instruction before execution of the target instruction by the first logical core.

18. The non-transitory machine readable medium of claim 17, wherein the at least one logical core is a plurality of logical cores, and the method further comprises setting of the indirect branch restricted speculation bit in the model specific register for a logical core of the plurality of logical cores to prevent the branch predictor from predicting the target instruction of the indirect branch instruction for the logical core of the plurality of logical cores based on software executed by the other of the plurality of logical cores.

19. The non-transitory machine readable medium of claim 17, wherein the method further comprises, when the indirect branch instruction is executed in an enclave, preventing the branch predictor from predicting the target instruction, for the indirect branch instruction executed in the enclave, based on software executed outside the enclave by any of the at least one logical core.

20. The non-transitory machine readable medium of claim 17, wherein the method further comprises, when the indirect branch instruction is executed in a system-management mode after a system-management interrupt, preventing the branch predictor from predicting the target instruction, for the indirect branch instruction executed in the system-management mode after the system-management interrupt, based on software executed in the system-management mode by any of the at least one logical core.

21. The non-transitory machine readable medium of claim 17, wherein the method further comprises clearing the set indirect branch restricted speculation bit for the first logical core in the model specific register prior to entering a sleep state.

22. The non-transitory machine readable medium of claim 21, wherein the method further comprises re-setting the cleared indirect branch restricted speculation bit for the first logical core in the model specific register after wakeup from the sleep state.

23. The non-transitory machine readable medium of claim 17, wherein the setting of the indirect branch restricted speculation bit in the model specific register after the transitioning to the more privileged predictor mode prevents the branch predictor from predicting the target instruction for the first logical core based on software executed, before the transitioning, in the less privileged predictor mode by any of the at least one logical core.

24. The non-transitory machine readable medium of claim 17, wherein the setting of the indirect branch restricted speculation bit in the model specific register after the transitioning to the more privileged predictor mode also prevents the branch predictor from predicting the target instruction for the first logical core based on software executed in a less privileged predictor mode by any of the at least one logical core for a later, second transition of the first logical core to the more privileged predictor mode.

* * * * *